US010315659B2

(12) United States Patent
Jacoby et al.

(10) Patent No.: US 10,315,659 B2
(45) Date of Patent: Jun. 11, 2019

(54) CLUTCHLESS SHIFTING OF A MANUAL TRANSMISSION

(71) Applicant: Massachusetts Institute of Technology, Cambridge, MA (US)

(72) Inventors: Chad L. Jacoby, Annapolis, MD (US); Jacob M. Jurewicz, Chicago, IL (US); Joshua E. Siegel, Bloomfield Hills, MI (US); Amos G. Winter, V, Somerville, MA (US); Young Suk Jo, Cambridge, MA (US); Patricia Yen, Milpitas, CA (US); Guillermo Pamanes Castillo, Cambridge, MA (US); Daniel Scott Dorsch, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 15/880,366

(22) Filed: Jan. 25, 2018

(65) Prior Publication Data
US 2018/0148065 A1 May 31, 2018

Related U.S. Application Data

(63) Continuation of application No. PCT/US2016/045011, filed on Aug. 1, 2016.
(Continued)

(51) Int. Cl.
*B60K 6/36* (2007.10)
*B60K 6/48* (2007.10)
(Continued)

(52) U.S. Cl.
CPC ............. *B60W 30/19* (2013.01); *B60K 6/36* (2013.01); *B60K 6/44* (2013.01); *B60K 6/48* (2013.01);
(Continued)

(58) Field of Classification Search
CPC . B60K 6/36; B60K 6/38; B60K 6/383; B60K 6/387; B60K 6/40; B60K 6/485;
(Continued)

(56) References Cited

U.S. PATENT DOCUMENTS 4,497,221 A 2/1985 Koser
5,411,450 A 5/1995 Gratton et al.
(Continued)

FOREIGN PATENT DOCUMENTS

CN 1272203 8/2006
JP 3750166 B2 3/2006
(Continued)

OTHER PUBLICATIONS

International Search Report and Written Opinion dated Oct. 14, 2016 for International Application No. PCT/US2016/045011, 19 pages.
(Continued)

Primary Examiner — Yonel Beaulieu
Assistant Examiner — Martin A Weeks
(74) Attorney, Agent, or Firm — Smith Baluch LLP

(57) ABSTRACT

An apparatus for a clutchless manual transmission includes a transmission, a drive shaft, and a motor shaft. The transmission includes an input shaft, an output shaft, and an intermediate gear. The input shaft is coupled to an engine shaft to receive power and the output shaft is coupled to the drive shaft to transmit power to a wheel of a vehicle. The input shaft and output shaft are coupled by a plurality of input and output shaft gears. A first synchronizer is coupled to the output shaft to selectively engage a particular output shaft gear, adjusting the speed of the output shaft relative to the input shaft. The motor shaft receives power from a motor and includes a second synchronizer to selectively engage the engine shaft to the drive shaft via the motor shaft. The
(Continued)

apparatus can be used to reduce acceleration and turbo lag in hybrid and high-performance vehicles.

33 Claims, 28 Drawing Sheets

Related U.S. Application Data

(60) Provisional application No. 62/199,758, filed on Jul. 31, 2015.

(51) Int. Cl.

| | |
|---|---|
| *B60W 30/19* | (2012.01) |
| *B60W 10/02* | (2006.01) |
| *B60W 10/06* | (2006.01) |
| *B60W 10/08* | (2006.01) |
| *B60W 10/11* | (2012.01) |
| *B60W 20/00* | (2016.01) |
| *B60W 20/15* | (2016.01) |
| *B60K 6/44* | (2007.10) |
| *B60K 6/547* | (2007.10) |
| *B60K 6/387* | (2007.10) |

(52) U.S. Cl.
CPC .............. *B60K 6/547* (2013.01); *B60W 10/02* (2013.01); *B60W 10/06* (2013.01); *B60W 10/08* (2013.01); *B60W 10/11* (2013.01); *B60W 20/00* (2013.01); *B60W 20/15* (2016.01); *B60K 6/387* (2013.01); *B60K 2006/4808* (2013.01); *B60K 2006/4816* (2013.01); *B60K 2006/4825* (2013.01); *B60W 2510/1015* (2013.01); *B60W 2520/04* (2013.01); *B60W 2520/10* (2013.01); *B60W 2520/28* (2013.01); *B60W 2710/021* (2013.01); *B60W 2710/0644* (2013.01); *B60W 2710/081* (2013.01); *B60W 2710/1005* (2013.01); *B60W 2710/244* (2013.01); *B60Y 2200/92* (2013.01); *B60Y 2306/11* (2013.01); *Y02T 10/626* (2013.01); *Y02T 10/6221* (2013.01); *Y02T 10/6252* (2013.01); *Y02T 10/6286* (2013.01); *Y10S 903/909* (2013.01); *Y10S 903/919* (2013.01); *Y10S 903/93* (2013.01); *Y10S 903/945* (2013.01)

(58) Field of Classification Search
CPC . B60K 6/50; B60K 6/54; B60K 6/543; B60K 6/547
See application file for complete search history.

(56) References Cited

U.S. PATENT DOCUMENTS

| | | | |
|---|---|---|---|
| 5,445,044 | A | 8/1995 | Lee |
| 6,374,688 | B1 | 4/2002 | Böckmann et al. |
| 7,252,020 | B2 | 8/2007 | Gray, Jr. et al. |
| 8,028,779 | B2 | 10/2011 | Morishita et al. |
| 8,346,446 | B2 | 1/2013 | Liu et al. |
| 8,738,254 | B2 | 5/2014 | Lee et al. |
| 2002/0189397 | A1 | 12/2002 | Sakamoto et al. |
| 2004/0089258 | A1* | 5/2004 | Buglione ................ B60K 6/48 123/179.4 |
| 2004/0251064 | A1 | 12/2004 | Imai |
| 2005/0209036 | A1* | 9/2005 | Cole ........................ B60K 6/48 475/7 |
| 2009/0107270 | A1 | 4/2009 | Krieger et al. |
| 2010/0113202 | A1* | 5/2010 | Treichel ................ B60K 6/365 475/5 |
| 2010/0320016 | A1 | 12/2010 | Wang et al. |
| 2011/0177900 | A1 | 7/2011 | Simon |
| 2011/0263379 | A1 | 10/2011 | Liang et al. |
| 2012/0329593 | A1* | 12/2012 | Larrabee ............... B64C 39/024 475/5 |
| 2014/0000412 | A1 | 1/2014 | Kaltenbach |
| 2014/0283646 | A1 | 9/2014 | Moore et al. |
| 2015/0210262 | A1* | 7/2015 | Mitchell ............. B60W 10/023 701/22 |
| 2015/0258973 | A1* | 9/2015 | Hawkins ............... B60W 10/06 701/22 |
| 2016/0069425 | A1 | 3/2016 | Yang et al. |

FOREIGN PATENT DOCUMENTS

| | | |
|---|---|---|
| KR | 101294090 B1 | 8/2013 |
| WO | 2011088876 A1 | 7/2011 |

OTHER PUBLICATIONS

Alternative Fuels Data Center:Maps and Data. U.S. Department of Energy. Accessed at https://www.afdc.energy.gov/data/ on Nov. 7, 2018. 23 pages.

Barlow et al., A reference book of driving cycles for use in the measurement of road vehicle emissions. Nov. 27, 2009.

Chen et al., Design and Analysis of an Electrical Variable Transmission for a Series-Parallel Hybrid Electric Vehicle. IEEE Transactions on Vehicular Technology, vol. 60(5), Jun. 2011. 10 pages.

Corporate Average Fuel Economy (CAFE) Standards. U.S. Department of Transportation. Updated Aug. 27, 2014. Accessed at https://www.transportation.gov/mission/sustainability/corporate-average-fuel-economy-cafe-standards. 3 pages.

DriverSide Technical Specifications 2012 Ferrari 458 Italia Base 2dr Coupe. Accessed at https://www.driverside.com/specs/ferrri-458_italit-2012-30960-54122-0. 2 pages.

Edenhofer et al., Climate Change 2014: Mitigation of Climate Change, Working Group III Contribution to the Fifth Assessment Report of the Intergovernmental Panel on Climate Change. IPCC 2014. 1454 pages.

Ehsani et al., Modern Electric, Hybrid Electric, and Fuel Cell Vehicles: Fundamentals, theory, and design. CRC Press 2010. 419 pages.

Fabspeed Motorsport, Dynojet Research 2010 Ferrari 458 Stock. Accessed at https://mbworld.org/forums/off-topic/438761-torque-vs-rpm.html on Nov. 7, 2018. 7 pages.

Fan et al., Map-Based Power-Split Strategy Design with Predictive Performance Optimization for Parallel Hybrid Electric Vehicles. Energies 2015, 8(9), 9946-9968.

International Search Report and Written Opinion dated Jul. 20, 2017 from International Application No. PCT/US2017/031157, 18 pages.

Kim et al., Analysis of the shifting behavior of a novel clutchless geared smart transmission. International Journal of Automotive Technology, vol. 15(1), pp. 125-134. Feb. 2014.

Lee et al., Advanced gear shifting and clutching strategy for parallel hybrid vehicle with automated manual transmission. IAS Annual Meeting (IEEE Industry Applications Society), 1709-1713 vol. 3. Nov. 1998. 6 pages.

Mashadi et al., Dual-Mode Power-Split Transmission for Hybrid Electric Vehicles. IEEE Transactions on Vehicular Technology, vol. 59(7), Sep. 2010. 10 pages.

Pratte, Drivetrain Power Loss—The 15% "Rule." 2010. Accessed at http://www.superstreetonline.com/how-to/engine/modp-1005-drivetrain-power-loss/. 15 pages.

Reducing CO2 emissions from passenger cars. European Commission. Accessed Nov. 7, 2018 at https://ec.europa.eu/clima/policies/transport/vehicles/cars_en. 6 pages.

Solberg, The Magic of Tesla Roadster Regenerative Braking, Tesla Motors. Jun. 29, 2007.

Tan, VW phases out automatics; makes way for DSG. Jun. 2006. Available at https://paultan.org/2006/06/26/vw-phases-out-automatics-makes-way-for-dsg/. 5 pages.

US EPA, C.C.D, "Causes of Climate Change." 2017. Accessed at https://19january2017snapshot.epa.gov/climate-change-science/causes-climate-change_.html on Dec. 11, 2018. 14 pages.

(56) References Cited

OTHER PUBLICATIONS

Wu et al., Powertrain architectures of electrified vehicles: Review, classification and comparison. Journal of the Franklin Institute 352(2), Jan. 2014. 25 pages.

Yoon et al., Conceptual design of economic hybrid vehicle system using clutchless geared smart transmission. International Journal of Automotive Technology vol. 14(5), pp. 779-784, Oct. 2013. 6 pages.

Zulkifli et al., Impact of Motor Size & Efficiency on Acceleration, Fuel Consumption & Emissions of Split-Axle Through-the-Road Parallel Hybrid Electric Vehicle. Applied Mechanics and Materials 663:498-503. Oct. 2014. 6 pages.

\* cited by examiner

CLUTCHLESS SHIFTING OF A MANUAL TRANSMISSION

CROSS-REFERENCE TO RELATED APPLICATION

This application is a bypass continuation application of International Patent Application PCT/US2016/045011, entitled "Clutchless Shifting of a Manual Transmission," filed Aug. 1, 2016, which claims priority to and the benefit of U.S. Provisional Patent Application Ser. No. 62/199,758, entitled "Clutchless Shifting of a Manual Transmission," filed Jul. 31, 2015. Each of the foregoing applications is hereby incorporated by reference in its entirety.

BACKGROUND

The embodiments described herein relate generally to the field of transmissions for hybrid vehicles, and more particularly to powertrain systems including a clutchless transmission for improving powertrain performance in high-performance vehicles.

Automotive transmissions are used to transfer power from an engine to the wheels of a vehicle. In particular, known transmissions allow the selection of multiple gear ratios to modulate the power and speed that are applied to the wheels. Known manual transmission and powertrain systems include a clutch to selectively disengage the engine from the transmission to facilitate selection of different gears (i.e., "shifting" of gears). In use, known clutches equalize the speed of the engine and the shafts and/or gears within the transmission during shifting of gears. Known clutches, however, increase the complexity of the powertrain (e.g., by including additional parts) and decrease the overall efficiency of the transmission. For example, the efficiency of known transmissions is generally in the approximate range of 84-92 percent. Moreover, as much as 25 percent of the overall power losses in known transmissions can be attributed to the clutch. As one example, for known wet clutches, some power losses come from the fluid within the case, which form an internal resistance. During operation, the fluid produces a shearing force that generates a drag torque, which becomes a drag loss.

Moreover, although transmissions have been studied and used for decades, there remains a need for improved powertrain systems for gas-electric hybrid vehicles. The development of hybrid vehicles has increased as the impact of anthropogenic climate change has become a global concern. For example, European and American regulators have instituted yearly targets for fuel economy and carbon emissions. Car manufacturers that do not meet these targets face heavy fines. Of additional concern to automobile manufacturers is Corporate Average Fuel Economy (CAFE). CAFE targets in the U.S., and in similar programs around the world, incentivize fuel efficiency and penalize manufacturers that fail to meet emissions goals.

Known hybrid gas-electric vehicles are one solution to meet the demand for greater fuel efficiency and reduced emissions. Specifically, known hybrid gas-electric vehicles can increase fuel economy by leveraging the electric motor when the internal combustion engine (ICE) is not operating efficiently. For example, in known "mild hybrid" configurations, a battery and small electric motor (EM) help power the vehicle so the ICE can shut off when the vehicle stops. Known "full hybrid" configurations use larger EMs and batteries that can independently power the car for short times and often at low speeds. Known hybrid gas-electric vehicles include a variety of different transmissions and/or powertrain configurations to facilitate the use of both the ICE and the EM. For example, some known hybrid vehicles are "parallel hybrid" vehicles, which rely on a mechanical linkage between two power sources (the linkage being located either pre- or post-transmission). The linkage allows either or both power sources to accelerate the vehicle, allows an EM to regenerate upon deceleration, and allows the ICE to charge an EM while stationary. Known parallel hybrid powertrain systems, however, are mechanically complex, have increased mass, and do not facilitate operating the ICE at peak efficiency when compared with other hybrid approaches. Other known hybrid vehicles employ a "series hybrid" powertrain system. Series hybrid systems allow an ICE to operate at its most effective speed, and thus have the benefit of reduced ICE sizing, improved ICE efficiency, and a short charge path. The performance of known series hybrid vehicles, however, is limited by the ability of the batteries and charging circuitry to supply power to the EM. Yet other hybrid vehicles employ a "through the road" (or TTR) powertrain system. Known TTR systems include one driven axle that is motivated by one power source, while the other axle has an alternative power source. In such systems, the road is used as the link between front and rear wheels, thus energy can only be transmitted between axles while the vehicle is moving. Accordingly, one disadvantage of known TTR systems is that the batteries cannot be charged while the vehicle is physically stationary.

Moreover, although there have been advances regarding hybrid gas-electric vehicles, there are concerns about translating conventional hybrid technology to high-performance vehicles. For example, known hybrid systems often include a power-split device (PSD) to allow the ICE and EM to provide power to the wheels simultaneously. One example of a PST is a continuously variable transmission (CVT), which has been used in efficiency-oriented consumer vehicles. However, there are several potential concerns about using PSDs or other CVTs in high-performance applications. For example, in such known systems, it may be difficult to program the controls to maximize power versus torque. Additionally, known systems may produce a poor driver experience due to the loss of the distinct engine scream and gear shifting. Moreover, there may be an increased rate of repair for planetary gears because of the heating and wear of high performance driving and increased frictional losses.

Thus, a need exists for improved systems and methods which can increase fuel economy and improve performance in high-performance vehicles.

SUMMARY

In some embodiments, an apparatus includes a drive shaft, a transmission, and a motor shaft. The drive shaft includes a drive gear and is configured to transmit power to a wheel of a vehicle. The transmission includes an input shaft, an output shaft, and an intermediate gear. The input shaft includes a transmission input gear and a plurality of input shaft gears. The output shaft includes a transmission output gear and a plurality of output shaft gears. The input shaft and the output shaft are aligned such that the input shaft gears mesh with the output shaft gears. The output shaft includes a first shifting element configured to selectively engage an output shaft gear from the plurality of output shaft gears to adjust a ratio between an input shaft speed and an output shaft speed. The transmission output gear is operably coupled to the drive gear such that power is transmitted between the transmission output gear and the drive gear when the output shaft gear is engaged. The transmission input gear is operably coupled to an engine shaft such that a rotation speed of the input shaft is dependent on a rotation speed of the engine shaft when the first shifting element is being shifted. The motor shaft is configured to be coupled to a motor. The motor shaft has a first motor gear and a second motor gear. The first motor gear is operably coupled to the drive gear and the second motor gear is operably coupled to the intermediate gear. The motor shaft includes a second shifting element configured to selectively engage the first motor gear and the second motor gear. The first motor gear is configured to transmit power between the motor shaft and the drive shaft when the second shifting element engages the first motor gear. The intermediate gear is configured to transmit power between the motor shaft and the engine shaft when the second shifting element engages the second motor gear.

DETAILED DESCRIPTION

Figure 1:
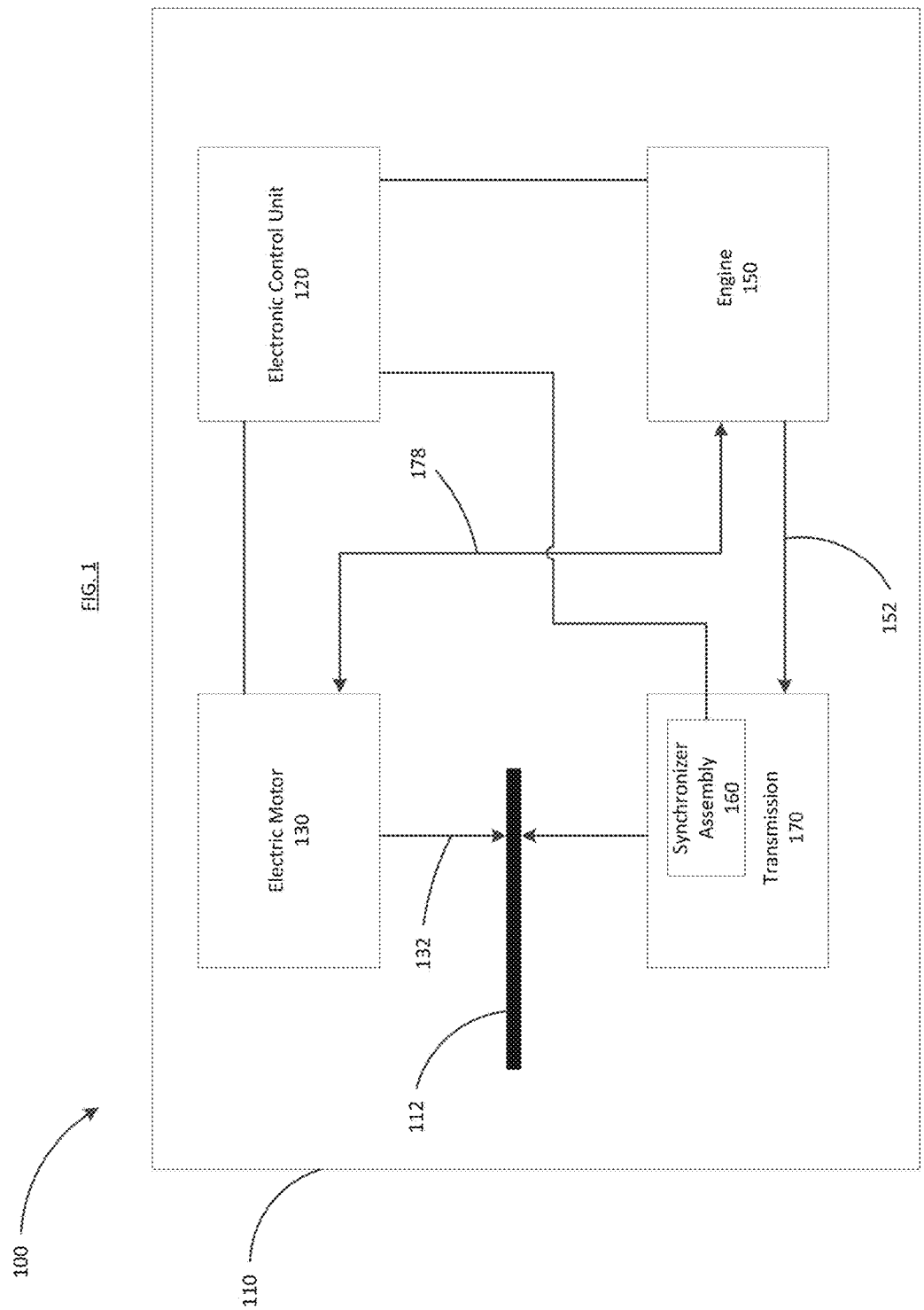
FIG. 1 is a schematic illustration of a powertrain system according to an embodiment.

The embodiments described herein relate to powertrain systems and devices. In some embodiments an apparatus includes a drive shaft, a transmission, and a motor shaft. The drive shaft includes a drive gear and is configured to transmit power to a wheel of a vehicle. The transmission includes an input shaft, an output shaft, and an intermediate gear. The input shaft includes a transmission input gear and a plurality of input shaft gears. The output shaft includes a transmission output gear and a plurality of output shaft gears. The input shaft and the output shaft are aligned such that the input shaft gears mesh with the output shaft gears. The output shaft includes a first shifting element configured to selectively engage an output shaft gear from the plurality of output shaft gears to adjust a ratio between an input shaft speed and an output shaft speed. The transmission output gear is operably coupled to the drive gear such that power is transmitted between the transmission output gear and the drive gear when the output shaft gear is engaged. The transmission input gear is operably coupled to an engine shaft such that a rotation speed of the input shaft is dependent on a rotation speed of the engine shaft when the first shifting element is being shifted. The motor shaft is configured to be coupled to a motor. The motor shaft has a first motor gear and a second motor gear. The first motor gear is operably coupled to the drive gear and the second motor gear is operably coupled to the intermediate gear. The motor shaft includes a second shifting element configured to selectively engage the first motor gear and the second motor gear. The first motor gear is configured to transmit power between the motor shaft and the drive shaft when the second shifting element engages the first motor gear. The intermediate gear is configured to transmit power between the motor shaft and the engine shaft when the second shifting element engages the second motor gear.

In some embodiments an apparatus includes a drive shaft, a transmission, and a motor shaft. The drive shaft includes a drive gear and is configured to transmit power to a wheel of a vehicle. The transmission includes an input shaft, an output shaft and an intermediate gear. The input shaft includes a transmission input gear and a plurality of input shaft gears. The output shaft includes a transmission output gear and a plurality of output shaft gears. The input shaft and the output shaft are aligned such that the input shaft gears mesh with the output shaft gears. The output shaft includes a first shifting element configured to selectively engage an output shaft gear from the plurality of output shaft gears to adjust a ratio between an input shaft speed and an output shaft speed. The first shifting element can be, for example, a synchronizer. The transmission output gear is operably coupled to the drive gear such that power is transmitted between the transmission output gear and the drive gear when the output shaft gear is engaged. The transmission input gear is operably coupled to an engine shaft by a linkage devoid of a friction clutch. A motor shaft is configured to be coupled to a motor. The motor shaft has a first motor gear and a second motor gear. The first motor gear is operably coupled to the drive gear and the second motor gear is operably coupled to the intermediate gear. The motor shaft includes a second shifting element configured to selectively engage the first motor gear and the second motor gear. The first motor gear is configured to transmit power between the motor shaft and the drive shaft when the second shifting element engages the first motor gear. The second shifting element can be, for example, a synchronizer. The intermediate gear is configured to transmit power between the motor shaft and the engine shaft when the second shifting element engages the second motor gear.

In some embodiments, an apparatus includes a drive shaft, a transmission, a first motor shaft, and a second motor shaft. The drive shaft includes a drive gear and is configured to transmit power to a wheel of a vehicle. The transmission includes an input shaft, an output shaft and an intermediate gear-set. The input shaft includes a transmission input gear and a plurality of input shaft gears. The output shaft includes a transmission output gear and a plurality of output shaft gears. The input shaft and the output shaft are aligned such that the input shaft gears mesh with the output shaft gears. The output shaft includes a first shifting element configured to selectively engage an output shaft gear from the plurality of output shaft gears to adjust a ratio between an input shaft speed and an output shaft speed. The first shifting element can be, for example, a synchronizer. The transmission output gear is operably coupled to the drive gear such that power is transmitted between the transmission output gear and the drive gear when the output shaft gear is engaged. The transmission input gear is operably coupled to an engine shaft. The first motor shaft is configured to be coupled to a first motor, and has a first motor gear and a second motor gear. The first motor gear is operably coupled to the drive gear. The second motor gear is operably coupled to a first intermediate gear of the intermediate gear-set. The first motor shaft includes a second shifting element configured to selectively engage the first motor gear and the second motor gear. The second shifting element can be, for example, a synchronizer. The first motor gear is configured to transmit power between the first motor shaft and the drive shaft when the second shifting element engages the first motor gear. The intermediate gear-set is configured to transmit power between the first motor shaft and the engine shaft when the second shifting element engages the second motor gear. The second motor shaft is configured to be coupled to a second motor. The second motor shaft has a third motor gear operably coupled to a second intermediate gear of the intermediate gear-set. The intermediate gear-set is configured to transmit power between the second motor shaft and at least one of the engine shaft or the first motor shaft.

In some embodiments, an apparatus includes a controller configured to be operably coupled to a motor, an engine, and a transmission. The transmission includes an input shaft, an output shaft, and an intermediate gear. The input shaft includes a transmission input gear and a plurality of input shaft gears. The output shaft includes a transmission output gear and a plurality of output shaft gears. The input shaft and the output shaft are aligned such that the input shaft gears mesh with the output shaft gears. The output shaft includes a first shifting element configured to selectively engage an output shaft gear from the plurality of output shaft gears to adjust a ratio between an input shaft speed and an output shaft speed. The first shifting element can be, for example, a synchronizer. The transmission output gear is operably coupled to a drive shaft to transmit power therebetween when the first shifting element is engaged with the output shaft gear. The motor includes a motor shaft having a first motor gear and a second motor gear. The first motor gear is operably coupled to the drive shaft. The second motor gear is operably coupled to the intermediate gear. The motor shaft includes a second shifting element configured to selectively engage the first motor gear and the second motor gear. The second shifting element can be, for example, a synchronizer. The first motor gear is configured to transmit power between the motor shaft and the drive shaft when the second shifting element engages the first motor gear. The intermediate gear is configured to transmit power between the motor shaft and the engine shaft when the second shifting element engages the second motor gear. The controller is implemented in at least one of a memory or a processor. The controller includes a speed matching module configured to produce a control signal to adjust at least one of a speed of the engine shaft or a speed of the motor shaft when the first shifting element is being shifted.

In some embodiments, a method includes shifting a motor synchronizer to engage a motor gear coupled to a motor shaft such that the motor gear transmits power between the motor shaft and a drive shaft. The drive shaft is configured to transmit power to a wheel of a vehicle. The shifting the motor synchronizer is performed when an engine synchronizer is disengaged from a transmission input gear to interrupt engine power transmission between an engine output shaft and an input shaft of a transmission. The input shaft includes a plurality of input shaft gears meshed with a plurality of output shaft gears. Next, the engine synchronizer is shifted to engage the transmission input gear to transmit engine power from the engine output shaft to the input shaft of the transmission. The speed of the engine shaft is adjusted to match a speed of an output shaft gear from the plurality of output shaft gears to a speed of a corresponding input shaft gear from the plurality of input shaft gears. The adjusting is performed while engine power is continuously transmitted from the engine shaft to the input shaft. Next, after the adjusting and while engine power is continuously transmitted from the engine shaft to the input shaft, a transmission synchronizer is shifted to engage the output shaft gear such that engine power is transferred via the output shaft gear and the output shaft to the drive shaft.

In some embodiments, a non-transitory processor readable medium storing code representing instructions to be executed by a processor includes code comprising code to cause the processor to transmit a first synchronizer control signal to cause a motor synchronizer to engage a motor gear coupled to a motor shaft such that the motor gear transmits power between the motor shaft and a drive shaft. The drive shaft is configured to transmit power to a wheel of a vehicle. The processor is configured to transmit the first synchronizer control signal when an engine synchronizer is disengaged from a transmission input gear to interrupt engine power transmission between an engine output shaft and an input shaft of a transmission. The input shaft including a plurality of input shaft gears meshed with a plurality of output shaft gears. Next, a second synchronizer control signal is transmitted to cause the engine synchronizer to engage the transmission input gear to transmit engine power from the engine output shaft to the input shaft of the transmission. A speed matching signal is transmitted to match a speed of an output shaft gear from the plurality of output shaft gears to a speed of a corresponding input shaft gear from the plurality of input shaft gears. The speed is matched while engine power is continuously transmitted from the engine shaft to the input shaft. After the transmission of the speed matching signal and while engine power is continuously transmitted from the engine shaft to the input shaft, a third synchronizer control signal is transmitted to cause a transmission synchronizer to engage the output shaft gear such that engine power is transferred via the output shaft gear and the output shaft to the drive shaft.

As used herein, the singular forms "a," "an", and "the" include plural referents unless the context clearly dictates otherwise. Thus, for example, the term "a member" is intended to mean a single member or a combination of members, "a material" is intended to mean one or more materials, or a combination thereof.

As used herein, a "set" can refer to multiple features or a singular feature with multiple parts. For example, when referring to set of walls, the set of walls can be considered as one wall with distinct portions, or the set of walls can be considered as multiple walls.

As used herein, the terms "about" and "approximately" generally mean plus or minus 10% of the value stated. For example, about 0.5 would include 0.45 and 0.55, about 10 would include 9 to 11, about 1000 would include 900 to 1100.

FIG. 1 is a schematic illustration of a powertrain system 100 according to an embodiment. The system 100 is included within a vehicle 110, which can be any suitable vehicle. The vehicle 110 can be, for example, a four-wheeled vehicle including a chassis to which the system 100 and any other suitable components can be mounted. As shown, the vehicle 110 includes a drive shaft 112, which can be coupled via a differential (not shown) to an axle (not shown) to transmit power (or torque) to one or more wheels (not shown).

Figure 28:
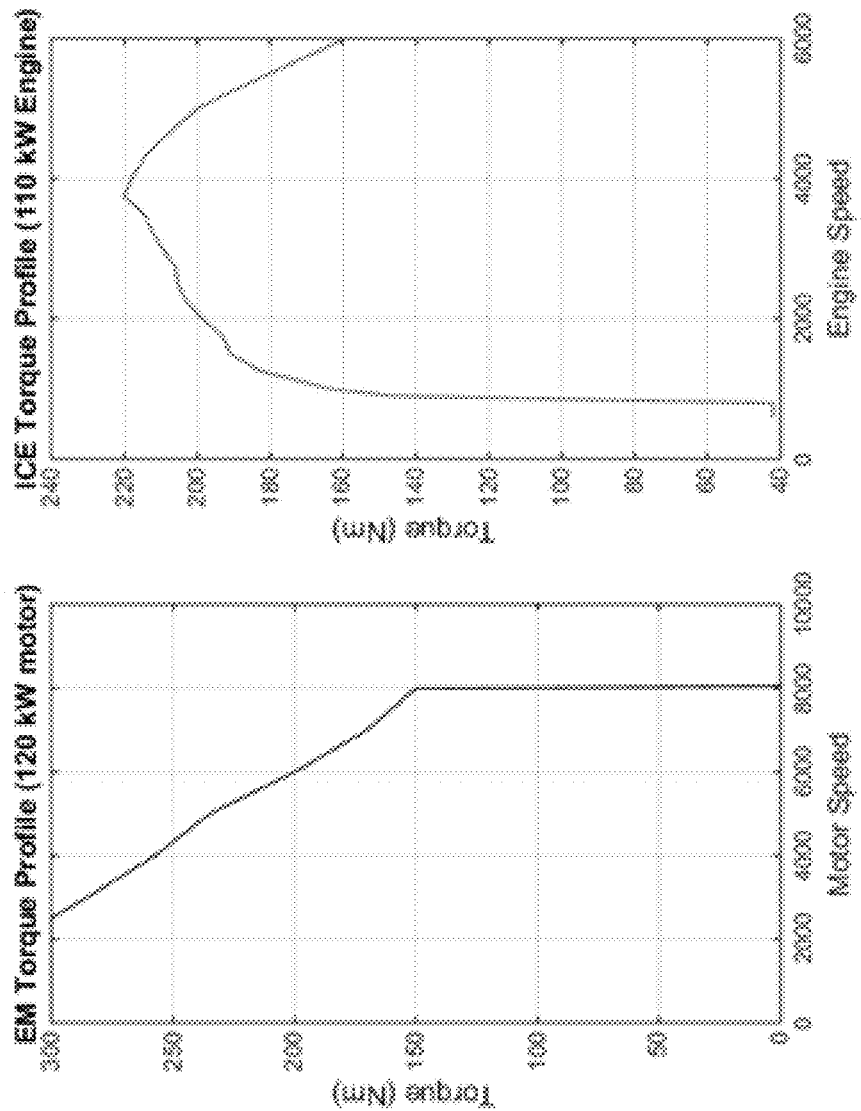
FIG. 28 includes diagrams of torque profiles for an electric motor and an engine.

The powertrain system 100 contains an electronic control unit 120, an electric motor 130, an engine 150, and a transmission 170. The electric motor 130, and any of the electric motors described herein can be any suitable electric motor that produces power for and/or absorbs power from the wheels of the vehicle and/or the engine 150. For example, in some embodiments, the electric motor 130 (and any of the electric motors described herein) can be a 120 kW electric motor. The electric motor 130 is operatively coupled to the drive shaft 112, as shown schematically in FIG. 1 by the arrow 132. In some embodiments, the electric motor 130 can include an input/output shaft that is coupled to the drive shaft 112 via mating gears, a belt drive, a concentric coupling, or the like. In some embodiments, the electric motor 130 can include an input/output shaft that is indirectly coupled to the drive shaft 112 (i.e., the input/output shaft that is coupled to the drive shaft 112 via intervening structure). FIG. 28 shows a representative torque curve for the electric motor 130 and for the engine 150. The torque curves of FIG. 28 show that torque is available at "zero speed" from an electric motor. Accordingly, as described herein, the system 100 (and any of the systems described herein) can use an electric motor to provide power to the vehicle wheels in a clutchless system to move the vehicle from a standstill.

The engine 150, and any of the engines described herein, can be any suitable engine that produces power for and/or absorbs power from the wheels of the vehicle and/or the motor 130. In some embodiments, the engine 150 can be an internal combustion engine, such as a gasoline engine, a diesel engine, a natural gas-powered engine or the like. The engine 150 is operatively coupled to the transmission 170, as shown schematically in FIG. 1 by the arrow 152. In some embodiments, the engine 150 can include an input/output shaft that is coupled to the transmission 170 via mating gears, a belt drive, a concentric coupling, or the like. Moreover, as shown schematically in FIG. 1 by the arrow 178, the engine 150 is operably coupled to the motor 130 such that power can be transmitted between the motor 130 and the engine 150, as discussed below. In this manner, for example, the engine 150 can supply power to the motor 130 to charge a battery (not shown), the motor 130 can supply power to the engine 150 to start the engine 150, or the like. The engine 150 can be operably coupled to the motor 130 by any suitable mechanism, such as, for example, a selective coupling (e.g., to allow the engine 150 to be disconnected from and/or to operate independently of the motor 130). The transmission 170 includes multiple sets of mating gears (not shown) and a shifting assembly 160. The transmission 170 can be shifted between the different sets of mating gears to modulate the engine power and speed applied to the drive shaft 112 (and vehicle wheels). The shifting assembly 160 includes any suitable number of shifting elements (not shown). Each shifting element of the shifting assembly can be any suitable mechanism that matches the speed of a free-spinning gear (of the mating gear-set) to the speed of the rotating shaft about which the free spinning gear is rotated. In this manner, the shifting element facilitates shifting into (or the selection of) the gear during a gear shift operation of the transmission. In some embodiments, the shifting element (or any of the shifting elements shown herein) can be a synchronizer that includes a blocker ring and one or more conical-shaped collars, each of which is coupled to and axially movable along a transmission shaft. As the synchronizer is moved axially along the shaft into engagement with the target gear, the blocker ring prevents engagement between the synchronizer and the target gear until the shaft and the target gear have reached a sufficiently similar or substantially identical rotational speed. Said another way, the blocker ring prevents teeth associated with the synchronizer from grinding with teeth associated with the target gear. To reach a sufficiently similar or substantially identical rotational speed, the conical-shaped collar can gradually contact a mating conical opening of the target gear. In this manner, the friction between the synchronizer (which does not rotate relative to the shaft) and the target gear (which, until the synchronizer is fully engaged, rotates relative to the shaft) brings the shaft and the target gear to the same rotational speed. Said another way, the synchronizer "matches" the rotational speed of the shaft and the target gear to facilitate the selection of the target gear. When the rotational speeds are sufficiently similar or substantially identical, the blocker ring can allow for engagement between the synchronizer and the target gear. Moreover, when the synchronizer is disengaged from the selected gear, the torque or "load" across the synchronizer must be reduced and/or have a magnitude of zero. In this manner, the dog teeth (or other suitable engaging structures between the synchronizer and the engaged gear) can be "unloaded" to allow disengagement.

In other embodiments, the shifting element (or any of the shifting elements and/or synchronizers described herein) need not include a conical-shaped portion or any other structure that produces friction during the engagement (i.e., a "frictional element"). For example, in some embodiments, a shifting element and/or synchronizer can include any suitable movable coupling that can move relative to a shaft to engage and/or disengage a gear.

As shown schematically by the arrow 152, the engine 150 is operatively coupled to the transmission 170 such that engine power is continuously transmitted from the engine 150 to the transmission 170 when the synchronizer assembly 160 is being shifted to engage and/or select one of the sets of mating gears. In other words, a transmission input gear is operably coupled to an engine shaft such that a rotation speed of the input shaft is dependent on a rotation speed of an engine shaft when a synchronizer is being shifted to engage and/or select one of the sets of mating gears. Similarly stated, the engine 150 is operatively coupled to the transmission 170 by a linkage that is devoid of a clutch (e.g., a friction clutch). By eliminating the clutch, the powertrain system 100 can operate with improved efficiency and higher performance than a system that includes a clutch. Selecting or "shifting" between gears within the clutchless transmission 170 is facilitated by the electronic control unit 120 that controls (or adjusts) any one of the engine speed, the speed of any of the shafts within the transmission 170 and/or the motor speed to match a speed of the target gear to a speed of a corresponding (or mating) gear or shaft when the synchronizer assembly 160 is being shifted. As described below, in some embodiments, the electronic control unit 120 includes a speed matching module 124 that produces an engine control signal to adjust an engine speed to match a speed of a gear or shaft within the transmission 170 to a speed of a corresponding gear or shaft during shifting.

Depending on the positions of the synchronizers of the synchronizer assembly 160, the components of the powertrain system 100 can be operatively coupled in various configurations to improve efficiency and/or performance of the vehicle 100. For example, in some embodiments, the electric motor 130 can be configured to rotate the drive shaft 112. Such a "motor only" configuration enables the clutchless transmission design by allowing the electric motor 130 to move the vehicle 100 from a standstill. In contrast, movement of the vehicle 100 from a standstill would not be possible with the engine 150 coupled to the transmission 170 via a linkage devoid of a clutch because of the low engine torque produced at low (or zero) engine speed.

In other embodiments, the electric motor 130 can be configured to crank (or start) the engine 150. In some embodiments, the engine 150 can be configured to drive the clutchless transmission 170 to rotate the drive shaft 112, as described above. Additionally, the engine 150 can be configured to drive the clutchless transmission 170 to charge an energy storage device (e.g. a battery bank) associated with the electric motor 130. In some configurations, the engine 150 only charges the energy storage device (e.g. "park and charge" mode). In other configurations, the engine 150 charges the energy storage device while simultaneously rotating the drive shaft 112 (e.g. "drive and charge" mode).

Figure 2:
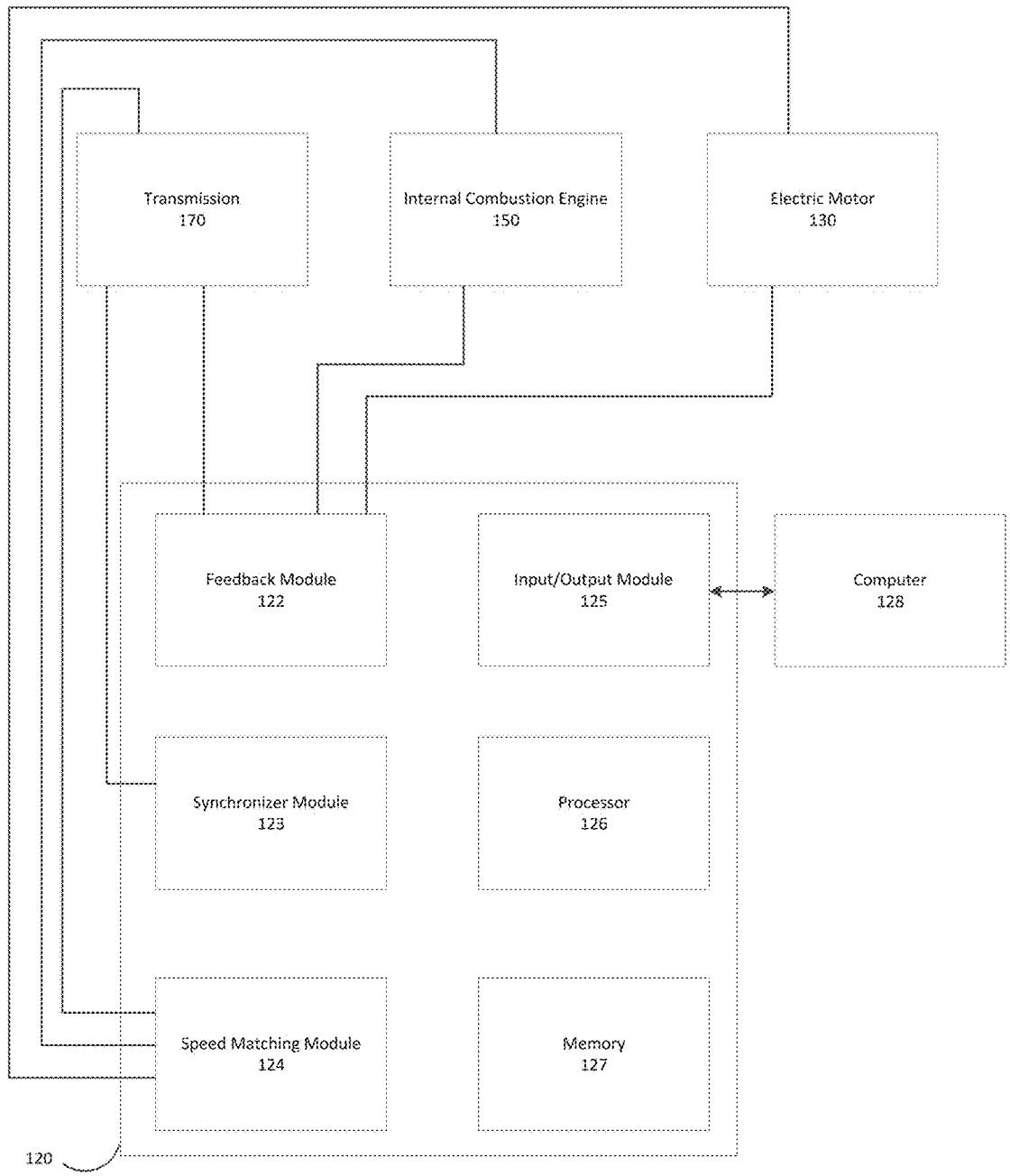
FIG. 2 is a schematic illustration of an electronic control unit of the powertrain system of FIG. 1.

The electronic control unit 120 is configured to control the electric motor 130, the engine 150, and the synchronizer assembly 160 to operate the system 100 as described herein. The electronic control unit 120 (or "controller") can control the speed matching of drivetrain components, selection of gears in the transmission 170, shifting of synchronizers (e.g., within the synchronizer unit), and any other functions as described herein. In some embodiments, the electronic control unit 120 (and any of the controllers described herein) can include one or more modules to perform the functions described herein. For example, FIG. 2 is a schematic illustration of the electronic control unit 120. The electronic control unit 120 is coupled to a computer 128 or other processing device, such as a vehicle control module, a service computer, or the like. As shown above in FIG. 1, the electronic control unit 120 is also coupled to the transmission 170, the engine 150 and the motor 130.

The electronic control unit 120 (or any of the controllers described herein) can include a memory 127, a processor 126, and an input/output module (or interface) 125. The electronic control unit 120 can also include a feedback module 122, a synchronizer module 123, and a speed matching module 124. The electronic control unit 120 is coupled to the computer 128 or other input/output device or other input/output device via the input/output module (or interface) 125.

The processor 126 can be any processor configured to, for example, write data into and read data from the memory 127, and execute the instructions and/or methods stored within the memory 127. Furthermore, the processor 126 can be configured to control operation of the other modules within the controller (e.g., the synchronizer module 123, the feedback module 122, and the speed matching module 124). Specifically, the processor 126 can receive a signal including user input, shaft speed data, vehicle speed or the like and determine a value for one or more control signals to control the powertrain based on the signal. In other embodiments, the processor 126 can be, for example, an application-specific integrated circuit (ASIC) or a combination of ASICs, which are designed to perform one or more specific functions. In yet other embodiments, the processor 126 can be an analog or digital circuit, or a combination of multiple circuits.

The memory device 127 can be any suitable device such as, for example, a read only memory (ROM) component, a random access memory (RAM) component, electronically programmable read only memory (EPROM), erasable electronically programmable read only memory (EEPROM), registers, cache memory, and/or flash memory. Any of the modules (the synchronizer module 123, the feedback module 122, and the speed matching module 124) can be implemented by the processor 126 and/or stored within the memory 127.

The speed matching module 124 of the electronic control unit 120 includes circuitry, components and/or code to produce and/or deliver one or more control signals associated with one or more shafts and/or components in the powertrain system 100. The signals (represented as a solid line between the various vehicle components and the electronic control unit 120) can be any signal of the types shown and described herein. In some embodiments, the speed matching module 124 receives input from other portions of the system, and can therefore send the control signals to the appropriate subset of components.

In some embodiments, the speed matching module 124 is configured to produce an engine control signal to adjust an engine speed such that a speed of an output shaft is matched to a speed of a corresponding input shaft during a gear shift operation. Such engine control signals can be delivered to an engine control module, and can include signals to adjust the throttle position, fueling, timing or any other aspect of the engine performance that will adjust the engine speed. In some embodiments, the speed matching module 124 is configured to produce a motor control signal to adjust a speed of a motor shaft such that a speed of an output shaft gear is matched to a speed of a corresponding input shaft during a gear shift operation. In other embodiments, the speed matching module 124 is configured to produce a motor control signal to adjust a speed of a motor shaft when the motor is operably coupled to engine such that the electric motor controls the speed of the engine such that a speed of an output shaft gear is matched to a speed of a corresponding input shaft during a gear shift operation. Specifically, in such a speed matching configuration, the motor can add power to the engine shaft (when the engine speed is lower than desired) and can absorb power from the engine shaft (i.e., acting like a brake; when the engine speed is greater than desired). In this manner, the electric motor provides another and/or an alternative method for controlling the engine (in addition to directly adjusting the fueling, timing, valve events or the like).

The electronic control unit 120 includes the synchronizer module 123. The synchronizer module 123 includes circuitry, components and/or code to produce one or more control signals (identified as the solid lines to the transmission 170) that can be delivered to the synchronizers (not shown) to facilitate shifting, as described herein.

In some embodiments, the electric motor 130 is configured to transmit power between a motor shaft of the electric motor 130 and the drive shaft 112 when a synchronizer is being shifted to engage and/or select one of the sets of mating gears to prevent acceleration lag. This can be referred to as "torque fill." For example, when no synchronizer is in engagement with a set of mating gears, the power from the engine 150 is, at least temporarily, not transmitted from the input transmission shaft to the output transmission shaft. As a result, the power from the engine is not transmitted to the drive shaft 112. During this shifting period, the electric motor 130 can apply torque to the drive shaft 112 to prevent acceleration lag. After a synchronizer on the output transmission shaft engages with a set of mating gears and power is transmitted from the engine 150 to the drive shaft 112, the electric motor 130 can continue to transmit additional power to the drive shaft 112. Alternatively, the electric motor 130 can disengage from the drive shaft 112 until the next gear shifting period.

Figure 3:
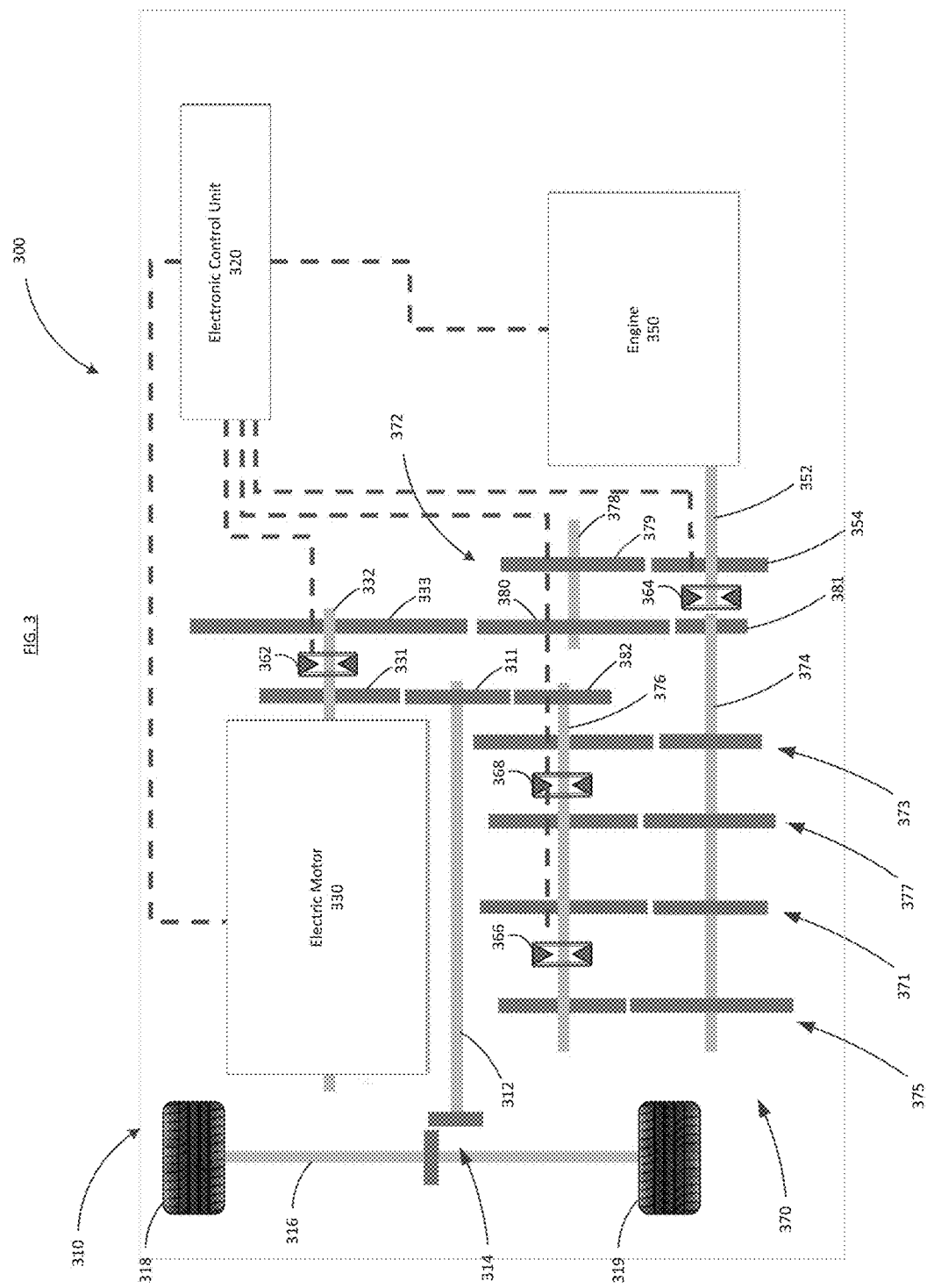
FIG. 3 is a schematic illustration of a powertrain system according to an embodiment.

FIG. 3 is a schematic illustration of a powertrain system 300 according to an embodiment that has a single electric motor. The system 300 is included within a vehicle 310. The vehicle 310 includes a drive shaft 312. The drive shaft 312 has a first end fixedly coupled to a drive shaft gear 311 and a second end configured to be coupled via a differential 314 to an axle 316. The axle 316 includes a first end coupled to a first wheel 318 and a second end coupled to a second wheel 319. The vehicle 310 can also include a chassis and any other suitable components. Although shown as driving two wheels (i.e., as part of a four-wheeled vehicle), in other embodiments, the vehicle 310 and any of the vehicles described herein can have any number of wheels and drive configurations. Moreover, although shown as including a drive shaft 312 that is substantially perpendicular to the axle 316, in other embodiments, the drive shaft 312 can have any relationship and/or connection to the wheels 318, 319 (e.g., a transverse mounted, front-wheel drive system, a rear-wheel drive system, an all-wheel drive system, or the like).

The powertrain system 300 contains an electronic control unit 320, an electric motor 330, an internal combustion engine 350, and a clutchless transmission 370. The electric motor 330 is configured to rotate and/or receive rotation power from an electric motor shaft 332. The electric motor 330, and any of the electric motors described herein can be any suitable electric motor that produces power for and/or absorbs power from the wheels of the vehicle 310 and/or the engine 350. For example, in some embodiments, the electric motor 330 (and any of the electric motors described herein) can be a 120 kW electric motor.

As shown, the electric motor 330 is operatively coupled to the drive shaft 312 by the electric motor shaft 332. Specifically, a first electric motor gear 331 and a second electric motor gear 333 are coupled to the electric motor shaft 332. The first electric motor gear 331 is configured to be operatively coupled to, engaged with and/or meshed with the drive shaft gear 311. The second electric motor gear 333 is configured to be operatively coupled to, engaged with and/or meshed with a second intermediate gear 380. As described in more detail below, the first electric motor gear 331 and the second electric motor gear 333 can each be moved between a "free running" configuration about the electric motor shaft 332 and a fixed configuration, in which the gear does not rotate relative to the electric motor shaft 332. The configuration of the first electric motor gear 331 and the second electric motor gear 333 is controlled by the synchronizer (or shifting element) 362 of the synchronizer (or shifting) assembly, as discussed below. In this manner, the operational configuration (or "mode") of the system can be changed to allow various routes of power transfer between the electric motor 330, the engine 350 and the wheels 318, 319. For example, when the first electric motor gear 331 is in the fixed configuration relative to the electric motor shaft 332, the electric motor 330 can be configured to rotate the drive shaft 312 via the electric motor shaft 332, the electric motor gear 331, and the drive shaft gear 311. Conversely, when the first electric motor gear 331 is in the free running configuration about the electric motor shaft 332, no power is transferred between the electric motor 330 and the drive shaft 312, even though the first electric motor gear 331 remains operably coupled to and/or meshed with the drive shaft gear 311. Although the second electric motor gear 333 is shown as being larger than the first electric motor gear 331, the first electric motor gear 331 and the second electric motor gear 333 can each be any suitable size. FIG. 28 shows a representative torque curve for the electric motor 330 and for the engine 350.

The internal combustion engine 350, and any of the engines described herein, can be any suitable engine that produces power for and/or absorbs power from the wheels 318, 319 and/or the motor 330. The engine 350 is configured to rotate and/or be rotated by an internal combustion engine shaft 352. An internal combustion engine gear 354 and a synchronizer (or shifting element) 364 are each coupled to the internal combustion engine shaft 352. As shown, the internal combustion engine gear 354 is operably coupled to the second electric motor gear 333 via an intermediate gear-set 372. Specifically, the intermediate gear-set 372 includes a first intermediate gear 379 and a second intermediate gear 380 fixedly coupled to an intermediate shaft 378. As shown, the internal combustion engine gear 354 is operably coupled to, engaged with and/or meshed with the first intermediate gear 379, which is fixedly coupled to the second intermediate gear 380 via the intermediate shaft 378. The second intermediate gear 380 is, in turn, operably coupled to, engaged with and/or meshed with the second electric motor gear 333. As described in more detail below, the internal combustion engine gear 354 can be moved between a "free running" configuration about the shaft 352 and a fixed configuration, in which the internal combustion engine gear 354 does not rotate relative to the shaft 352. The configuration of the internal combustion engine gear 354 (and the transmission input gear 381, described below) is controlled by the synchronizer 364 of the synchronizer assembly.

As a result, depending on the configuration of the synchronizer assembly (i.e., the synchronizer 364 and the synchronizer 362), the electric motor 330 can be configured to crank (or transmit power to) the internal combustion engine 350 through rotation of the internal combustion engine shaft 352. Additionally, when the internal combustion engine gear 354 and the second electric motor gear 333 are each in the fixed configuration, the internal combustion engine 350 can be configured to charge an energy storage device (not shown) associated with the electric motor 330 through the rotation of the electric motor shaft 332. The energy storage device can include a battery bank. In some embodiments, the energy storage device can be a component of the electric motor 330. In other embodiments, the energy storage device can be a separate component that is electrically coupled to the electric motor 330.

The clutchless transmission 370 includes a transmission input shaft 374 and a transmission output shaft 376. A transmission input gear 381 is coupled to the transmission input shaft 374, and a transmission output gear 382 is fixedly coupled to the transmission output shaft 376. The transmission output gear 382 is operably coupled to, engaged with and/or meshed with the drive shaft gear 311. Because the drive shaft gear 311 is fixedly coupled to (i.e., cannot rotate relative to) the drive shaft 312 and the transmission output gear 382 is fixedly coupled to the transmission output shaft 376, rotation of the wheels 318, 319 and/or the drive shaft 312 produces rotation of the output shaft 376, and vice-versa.

The transmission input gear 381 can be moved between a "free running" configuration about the shaft 374 and a fixed configuration, in which the transmission input gear 381 does not rotate relative to the shaft 374. The configuration of the transmission input gear 381 is controlled by the synchronizer 364 of the synchronizer assembly. In this manner, as described below, the engine shaft 352 can be decoupled from the transmission 370 when the powertrain system 300 is in, for example, an "electric motor only" drive configuration, a "charging" configuration, or the like. As described in more detail below, however, the engine power is continuously transmitted from the engine 350 and/or the engine shaft 352 to the transmission 370 (via the transmission input shaft 374) when the synchronizer assembly is actuated to shift between the mating gear-sets within the transmission 370. Said another way, the rotation speed of the input shaft 374 is dependent on a rotation speed of the engine shaft 352 when a synchronizer (such as the third synchronizer 366, described below) associated with a gear-set (such as the first transmission gear-set 371, described below) is being shifted into engagement with the gear-set. Similarly stated, the engine 350 and/or the engine shaft 352 is operatively coupled to the transmission 370 and/or the transmission input shaft 374 by a linkage that is devoid of a clutch (e.g., a friction clutch or a torque converter). Similarly stated, the transmission 370 is a manual transmission that is coupled to the engine 350 via a linkage that is devoid of a clutch or a torque converter. Such a manual transmission can include, for example, a "fully manual" or driver manipulated transmission or an automated manual transmission or "AMT," which has the similar structure and gearing as a manual, but with electronic actuation. Thus, the powertrain 300 is described as including a clutchless transmission 370.

The transmission input shaft 374 and the transmission output shaft 376 are operably coupled together by a number of gear-sets. The clutchless transmission 370 can include, for example, four gear-sets, as shown in FIG. 3. For example, the clutchless transmission 370 can include a first transmission gear-set 371 associated with first and fifth gear, a second transmission gear-set 373 associated with second and sixth gear, a third transmission gear-set 375 associated with third and seventh gear, and a fourth transmission gear-set 377 associated with fourth and eighth gear. Each gear-set includes an input gear fixedly coupled to the transmission input shaft 374 and an output gear rotatably coupled to the transmission output shaft 376. Alternatively, the system 300 and the clutchless transmission 370 can be configured to include any number of gear-sets arranged in any functional way to modulate power and/or speed when rotating the drive shaft 312.

The synchronizer assembly can include, for example, a first synchronizer (or shifting element) 362, a second synchronizer (or shifting element) 364, a third synchronizer (or shifting element) 366, and a fourth synchronizer (or shifting element) 368. As described above, the first synchronizer 362 is located on the electric motor shaft 132, and is capable of moving between engagement with the first electric motor gear 331 and engagement with the second electric motor gear 333. The second synchronizer 364 is located on the internal combustion engine shaft 352, and is capable of moving between engagement with the internal combustion engine gear 354 and the transmission input gear 381. The third synchronizer 366 is located on the transmission output shaft 376, and is capable of moving between the first transmission gear-set 371 and the third transmission gear-set 375. The fourth synchronizer 368 is located on the transmission output shaft 376, and is capable of moving between the second transmission gear-set 373 and the fourth transmission gear-set 377. Alternatively, the synchronizer assembly can be configured to include any number of synchronizers suitable to control any number of gear-sets arranged in the clutchless transmission 370.

The synchronizers are operably coupled to the electronic control unit 320 (and any associated actuators, not shown in FIG. 3) so that the electronic control unit 320 can selectively slide the synchronizers along their respective shafts to move a gear between the free running configuration and the fixed configuration. The synchronizers can be any suitable mechanism that matches the speed of a free-spinning gear to the speed of the rotating shaft about which the free spinning gear is rotated. In this manner, the synchronizer facilitates shifting into (or the selection of) the gear during a gear shift operation (e.g., within the transmission 370, the electric motor shaft 332, and/or the engine shaft 352). In some embodiments, each synchronizer includes a conical-shaped collar (or set of collars) that is coupled to and axially movable along the shaft. The synchronizer, however is coupled to the shaft such that the conical-shaped collar cannot rotate relative to the shaft (e.g., the synchronizer can be coupled to the shaft via a spline coupling). When a synchronizer is positioned on a shaft so that the synchronizer is not in coupled engagement with a target gear, the gear can rotate freely about the shaft (i.e., the gear is in a "free running" configuration). Thus, although the gear (and any gears meshed thereto) are rotating, no power is being transferred between the respective shafts. For example, when the first synchronizer 362 is positioned on the electric motor shaft 332 so that it is not in coupled engagement with the first electric motor gear 331 or the second electric motor gear 333, the electric motor shaft 332 can rotate, but does not rotate either the first electric motor gear 331 or the second electric motor gear 333. When a synchronizer is positioned on a shaft so that the synchronizer is in coupled engagement with a gear (i.e., placing the gear in a locked configuration), the previously freely rotating gear is rotationally fixed relative to the rotating shaft. For example, when the first synchronizer 362 is moved along the electric motor shaft 332 into coupled engagement with the first electric motor gear 331, the first electric motor gear 331 becomes rotationally fixed relative to the electric motor shaft 332. In this configuration, the electric motor shaft 332 is configured to rotate the electric motor gear 331, which rotates (or is rotated by) the drive shaft gear 311 and the drive shaft 312.

When the synchronizer is moved axially along the shaft into engagement with the target gear, the conical-shaped portion can gradually contact a mating conical opening of the target gear. In this manner, the friction between the synchronizer (which does not rotate relative to the shaft) and the target gear (which, until the synchronizer is fully engaged, rotates relative to the shaft) brings the shaft and the target gear to the same rotational speed. Said another way, the synchronizer "matches" the rotational speed of the shaft and the target gear to facilitate the selection of the target gear.

In other embodiments, the synchronizers can be any suitable shifting element as described herein. Such shifting elements need not include a frictional element to match the speeds of the shafts and/or gears.

The electronic control unit 320 is configured to control the electric motor 330, the internal combustion engine 350, and the synchronizer assembly 360 to operate the system 300. The electronic control unit 320 is configured to use speed-matching so that changes in the gear configuration of the clutchless transmission 370 can be made in a manner that limits damage and/or excessive wear (e.g., to the dog-teeth). Specifically, changing the gear configuration includes both shifting into gear (i.e., the selection or engagement of a gear) and shifting out of gear (i.e. the deselection or disengagement of a gear). Accordingly, the "speed matching" described herein (for any of the powertrain systems) can be used to enable shifting into gear, and also can be used to "match" the torque between engaged components to allow those components to be disengaged.

For example, in some embodiments, any of the speed matching systems and algorithms described herein can be used during a gear deselection to "zero" the torque across such components. Specifically, in some embodiments, the electronic control unit 320 (or any of the electronic control units or controllers described herein) can modulate the torque within the drivetrain to allow deselection of gears (e.g., via control of the engine or electric motor).

Accordingly, the electronic control unit 320 can be configured to have precise, closed-loop control over the speed of the internal combustion engine 350, the speed of the electric motor 330, and the position of the synchronizers of the synchronizer assembly. This configuration gives the electronic control unit control over the speed of all shafts and gears in the clutchless transmission 370. In some embodiments, the electronic control unit 320 (and any of the controllers described herein) can include one or more modules to perform the functions described herein. For example, in some embodiments, the electronic control unit 320 can be similar to the electronic control unit 120 described above.

As shown in FIG. 3, the transmission input shaft 374 can be connected to the internal combustion engine 350 at two different gear-ratios, reducing the number of gear-sets within the transmission 370. Depending on the position of the second synchronizer 364, the internal combustion engine 350 can either drive the transmission input shaft 374 directly or drive the transmission input shaft 374 via the intermediate gear-set (also referred to as a "speed-up" gear) 372. The intermediate gear-set 372 can include a first intermediate gear 379 and a second intermediate gear 380 fixedly coupled to an intermediate shaft 378. For example, if the second synchronizer 364 is shifted along the internal combustion engine shaft 352 to the left and into locking engagement with the transmission input gear 381, the internal combustion engine 350 is configured to directly rotate the transmission input shaft 374 and the transmission 370 is configured to transition through gears one through four. In this second synchronizer 364 position, the intermediate gear-set 372 will be rotated by the transmission input gear 381, but it will be under no load because both the internal combustion engine gear 354 and the second electric motor gear 333 are freely rotatable around the internal combustion engine shaft 352 and the first electric motor shaft 332, respectively. Alternatively, if the second synchronizer 364 is shifted to the right and into locking engagement with internal combustion gear 354, the load from the internal combustion engine 350 will travel through the intermediate gear-set 372 and to the transmission input gear 381, and the transmission 370 is configured to transition through gears five through eight.

Although the gear shifting configurations are described below in a sequential manner, it is understood that the system 300 (and any of the systems described herein) can enable shifting in any sequence. For example, in some embodiments, the gears can be shifted between first and third, third and eighth, etc. In other embodiments, the shifting into any gear can employ shifting of the intermediate gear-set 372. For example, in some embodiments, the shifting of the intermediated gear-set 372 (to either engage or disengaged the engine gear 354 and the intermediate gear-set 372) can occur between and/or in conjunction with every shifting operation. In yet other embodiments, any of the powertrain systems shown herein need not include an intermediate gear-set 372.

Selecting or "shifting" between gears within the clutchless powertrain system 300 is facilitated by the electronic control unit 320 that controls (or adjusts) any one of the engine speed, the speed of any of the shafts within the transmission 370 and/or the motor speed to match a speed of the target gear to a speed of a corresponding (or mating) gear or shaft when the synchronizer assembly is being shifted. In some embodiments, the electronic control unit 320 (or controller) can include a speed matching module that produces an engine control signal to adjust an engine speed to match a speed of a gear or shaft within the transmission 370 to a speed of a corresponding gear or shaft during shifting. Specifically, when it is necessary to mesh two gears (and/or shafts) moving at different angular speeds, the electronic control unit 320 can be configured to use either the internal combustion engine 350 or the electric motor 330 to increase the speed of the slower spinning gear and/or shaft to match the speed of the faster spinning gear. Once the two gears are spinning at the same speed, the electronic control unit 320 can produce a signal to shift an associated transmission synchronizer to mate the two gears. For example, when shifting between gear-sets within the transmission 370, the appropriate synchronizer (e.g., synchronizer 366) is shifted to match the speed of a free running gear (e.g., of gear-set 371) to the speed of the output shaft 376. Because the output shaft 376 is coupled the input shaft 374 by the gear-sets, and because the engine shaft 352 remains coupled to the input shaft 374 (either directly or via the intermediate gear-set 372), differences between the speed of the engine shaft 352 (i.e., the engine speed) and the transmission shafts are undesirable and limit the ability of the shifting to occur. In traditional manual transmissions, a clutch is used to temporarily disengage the engine shaft from the transmission shaft. In the powertrain system 300 described herein, the electronic control unit 320 can adjust or "match" the shaft speeds to facilitate the desired shifting while a rotation speed of the input shaft is dependent on a rotation speed of the engine shaft. This arrangement eliminates the need for a friction clutch and also eliminates the lag in acceleration that is traditionally associated with shifting gears because clutchless shifting allows torque and acceleration to be transmitted from the engine 350 to the transmission 370 (and, in turn, to the drive shaft 312) throughout the entire shifting process. Moreover, for any brief period of "zero torque" transmission, which occurs at the instant of gear shifting, the electric motor 330 can supply power (or "torque fill") to the drive shaft 312.

Specifically, the electric motor 330 is configured to transmit power between the electric motor shaft 332 and the drive shaft 312 when a synchronizer is being shifted to engage and/or select one of the sets of mating gears (i.e. torque fill) to prevent acceleration lag. For example, when neither the third synchronizer 366 nor the fourth synchronizer 368 is in engagement with a set of mating gears, the power from the engine 350 is not transmitted from the transmission input shaft 374 to the transmission output shaft 376 (even though the rotation speed of the input shaft 374 may still be dependent upon the rotation of the engine shaft 352). As a result, the power from the engine 350 is not transmitted to the drive shaft 312. During this shifting period, the electric motor 330 can apply torque to the drive shaft 312 to prevent acceleration lag. After the third synchronizer 366 or the fourth synchronizer 368 on the transmission output shaft 376 engages with a set of mating gears and power is transmitted from the engine 350 to the drive shaft 312, the electric motor 330 can continue to transmit additional power to the drive shaft 312. Alternatively, the electric motor 330 can disengage from the drive shaft 312 until the next gear shifting period.

In some embodiments, the electronic control module 320 can include a feedback module (e.g., similar to the feedback module 122 described above) to receive input from sensors configured to monitor the torque and/or speed of the transmission input shaft 374 and the transmission output shaft 376. The electronic control module 320 and/or the feedback module can also be configured to monitor the torque of the first electric motor shaft 332 and the internal combustion engine shaft 352. The electronic control module 320 is configured to process the torque signals and other input, and produce and/or transmit control signals to actuate the appropriate synchronizer combination in order to achieve a particular required function. For example, in some embodiments, the electronic control module 320 can include a speed matching module configured to produce an engine control signal based on the input received by the feedback module. The speed matching module can, for example, adjust an engine speed such that a speed of the engine shaft 352 and/or engine shaft gear 354 is matched to a speed of transmission input shaft 374 during a gear shift operation. Such engine control signals can be delivered to an engine control module, and can include signals to adjust the throttle position, fueling, timing or any other aspect of the engine performance that will adjust the engine speed. In other embodiments, the electronic control module 320 and/or the speed matching module are configured to produce a motor control signal to adjust a speed of a motor shaft such that a speed of the transmission output shaft gear 382 is matched to a speed of the transmission input shaft 374 during a gear shift operation.

In some embodiments, the electronic control module 320 can include a feedback module (e.g., similar to the feedback module 122 described above) to receive input from sensors configured to monitor (or calculate) the torque of any components within the drive train to facilitate deselection of a gear. Specifically, the electronic control module 320 can adjust or "zero" the torque across engaged components. In some embodiments, the feedback module can sense and/or calculate torque based on torque sensor (e.g., strain gauge sensors on a shaft), calculated engine load (e.g., from a fueling/throttle map) and/or a load sensor outside of the drivetrain (e.g., an engine mount sensor). In some embodiments, the feedback module can sense and/or calculate torque based on the current associated with (e.g., drawn from or supplied to) the electric motor 330.

In some embodiments, the engine shaft can include a synchronizer configured to selectively disengage the transmission input gear to interrupt power transmission between the engine output shaft and the input shaft of the transmission. The controller can include a synchronizer module configured to produce a synchronizer control signal associated with a motor drive configuration. When in the motor drive configuration, the synchronizer is disengaged from the transmission input gear and the first motor gear transmits power from the motor shaft to the drive shaft. In some embodiments, the feedback module of the electronic control unit 320 is configured to receive a vehicle speed signal associated with a wheel speed, and the synchronizer module is configured to produce the synchronizer control signal when the wheel speed is zero.

For example, to begin moving the first wheel 318 and the second wheel 319 from a total stop (i.e., a vehicle wheel speed of zero), the electric motor 330 will rotate the drive shaft 312 to rotate the axle 316. In some embodiments, the synchronizer assembly can be used to transmit some power from the electric motor 330 to crank (or start) the internal combustion engine 350. As the electronic control unit 320 speed-matches the internal combustion engine shaft 352 with the transmission input shaft 374, it will modulate the second synchronizer 364 to load the transmission input shaft 374 by friction until the speed of the transmission input shaft 374 and the speed of the internal combustion engine shaft 352 is matched. This modulation procedure is performed while one gear-set is preselected in the transmission output shaft 376.

To disengage the gear-set, the electronic control unit 320 sends a control signal to regulate fuel flow to (or any other performance characteristic of) the internal combustion engine 350 to unload the transmission input shaft 374 as the first electric motor 330 fills to provide torque to the drive shaft 312. Similar to the launching procedure, a modulated actuation of the synchronizer assembly 360 needs to be included in the software of the electronic control unit 320 to command disengagement once each shaft is unloaded. The disengagement or "torque zeroing" can be based on feedback or torque calculations, as described above. In other embodiments, the electronic control unit 320 sends a control signal to apply a nominal force to the synchronizer that is engaged. When the engaged elements are at or close to "zero" torque, the magnitude of the nominal force is sufficient to disengage the components.

Figure 4:
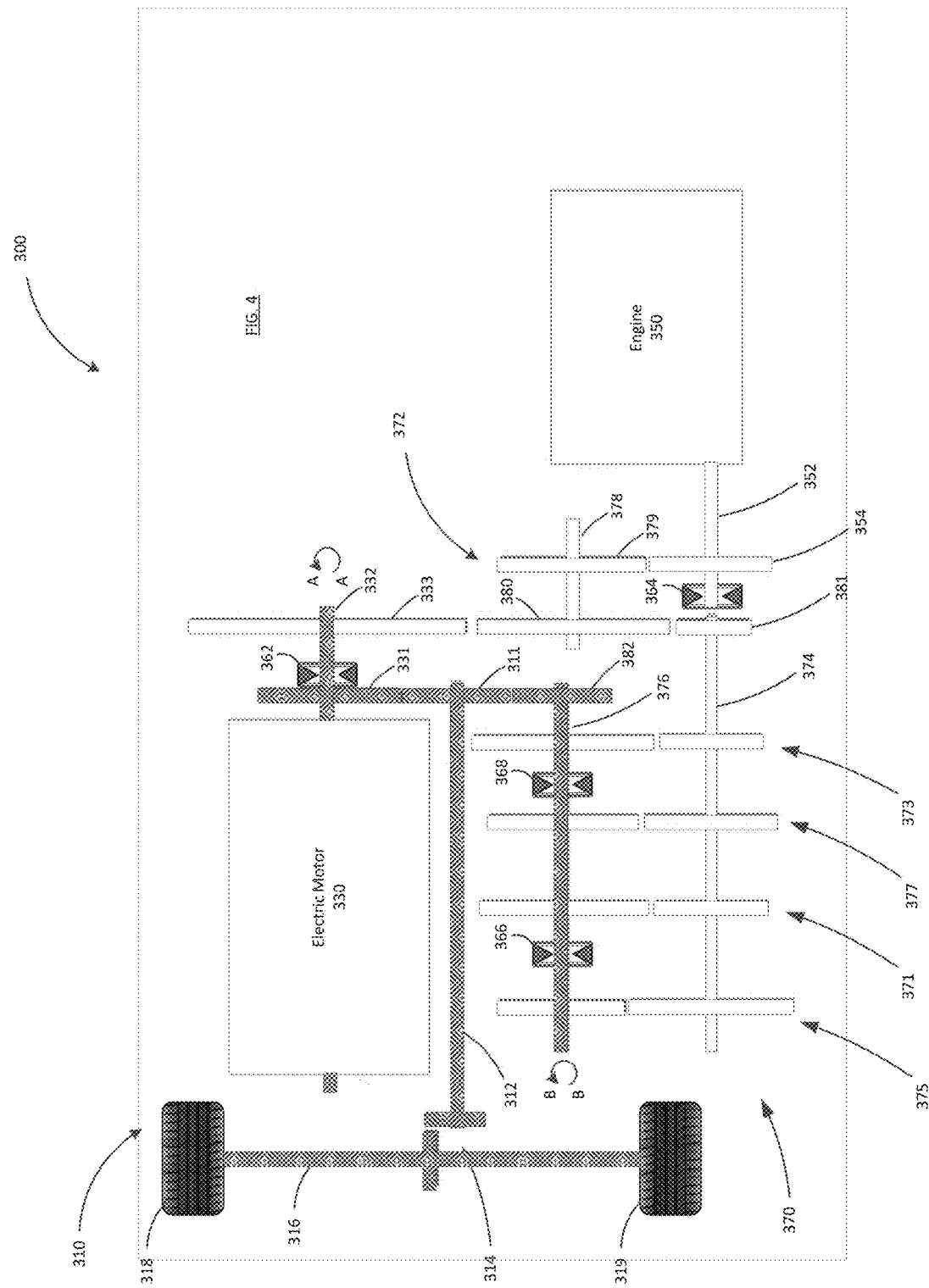
FIG. 4 is a schematic illustration of the powertrain system of FIG. 3 in an "all electric" configuration.
Figure 5:
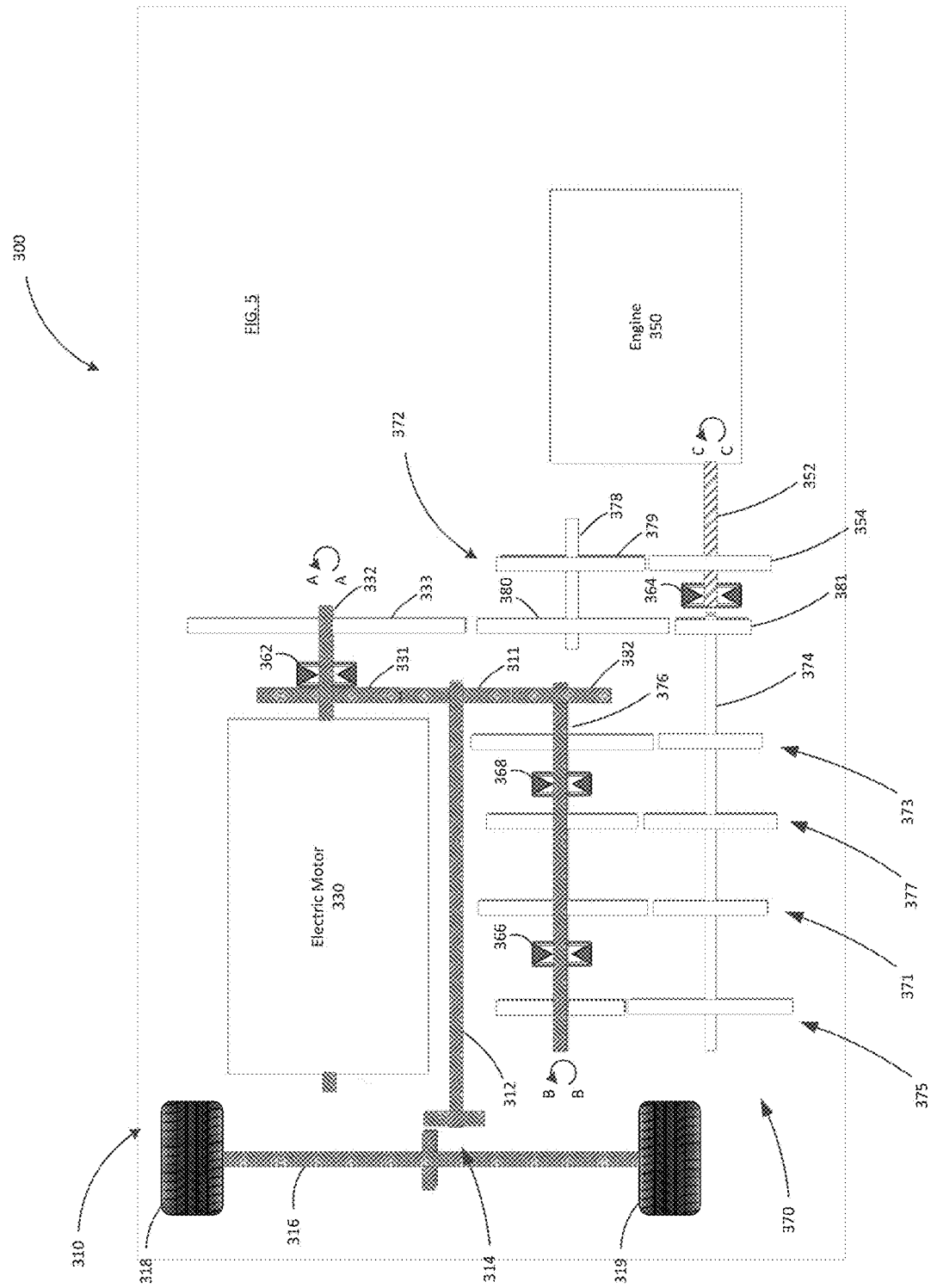
FIG. 5 is a schematic illustration of the powertrain system of FIG. 3 in a transitioning configuration.

FIG. 4 is a partial view of system 300 with the electronic control unit 320 not shown. In FIGS. 4-18, components rotating under the control of the electric motor 330, the engine 350, and/or the wheels 318, 319, but that are not under load (i.e. not transferring power), are indicated by a hatched pattern (i.e., a series of lines in a single, diagonal direction). Alternatively, components rotating under the control of the electric motor 330, the engine 350, and/or the wheels 318, 319, but that are under load (i.e. transferring power), are indicated by a cross-hatched pattern (i.e., as series of hatching lines that intersect each other). Components that are not rotating under the control of the electric motor 330, the engine 350, and/or the wheels 318, 319, or under any of the other components of the system 300, are shown with no pattern.

In the configuration of FIG. 4, the system 300 is in an electric mode. To perform low speed maneuvering, the electronic control unit 320 shifts the first synchronizer 362 to the left along the electric motor shaft 332 to lock the electric motor shaft 332 into engagement with the electric motor gear 331. Next, the electronic control unit 320 actuates the electric motor 330 and signals the electric motor 330 to rotate the electric motor shaft 332, as indicated by arrow AA. As a result, as indicated by the cross-hatched pattern, the electric motor gear 331 and the drive shaft gear 311 rotate under the control of and/or are powered by the electric motor shaft 332, causing the drive shaft 312 to be rotated. The rotation of the drive shaft 312 causes the differential 314 to rotate the axle 316. Due to the engagement between the drive shaft gear 311 and the transmission output gear 382, the transmission output gear 382 and the transmission output shaft 376 also rotate under control of the electric motor shaft 332, as indicated by arrow BB. Because the synchronizers 366 and 368 are disengaged from the gears on the transmission output shaft 376, no power is transmitted from the transmission output shaft 376 to the transmission input shaft 374. This is indicated by the lack of pattern of the gear-sets and the transmission input shaft 374. In this manner, when in the "electric only" mode, the frictional losses within the transmission are minimized. The vehicle 310 can be moved in a forward or reverse direction depending on the rotational direction of the electric motor shaft 332. Thus, this arrangement eliminates the need for a mechanical reverse gear in the transmission 370. In the electric mode, the internal combustion engine 350 does not need to be running.

If an accelerator (not shown) of the vehicle 310 is depressed by a driver, requesting a speed higher than the optimum speed range of the electric motor 330, the electric control unit 320 starts the engine 350. Once the engine 350 is started, the engine shaft 352 will spin, as indicated by arrow CC in FIG. 5. As indicated by the hatch pattern, the engine shaft 352 will not transmit power to the transmission input gear 381 or the internal combustion engine gear 354 in this configuration. The engine 350 can be started, for example, by the electric motor 330. In other embodiments, the engine 350 can be started by a separate starter motor (not shown). In yet other embodiments, the engine 350 may be already running at idle, and is disconnected from the transmission 370.

In some embodiments, the electric motor 330 can be used to start the engine 350 when the vehicle 310 is in motion, similar to a push start or a bump start in a typical clutched manual transmission vehicle. For example, the powertrain system 300 can be configured such that the motion of the wheels 318, 319 and the drive shaft 312 causes the engine 350 to turn over (i.e., the crankshaft rotates and the pistons cycle). In some embodiments, the electric motor 330 can be used to start the engine 350 when the vehicle 310 accelerates from rest via a power path through the transmission 370. For example, the third synchronizer 366 or the fourth synchronizer 368 can be translated to shift the powertrain system 300 into first gear or second gear, respectively, and the second synchronizer 364 can be shifted along the internal combustion engine shaft 352 to the left and into locking engagement with the transmission input gear 381. The first synchronizer 362 can be engaged with the first electric motor gear 331. The electric motor 330 can then be used to power the drive shaft 312 such that the vehicle 310 begins to move. As a result of the engagement between the drive shaft 312, the transmission 370, and the engine shaft 352, the internal combustion engine 350 can be turned over by the rotation of the internal combustion engine shaft 352. When the engine 350 is spinning at a sufficient speed to run, the electronic control unit 320 can initiate fuel injection and spark. In some embodiments, the engine 350 can include electronically controlled valves. In such embodiments, the valves can be in a first configuration when the engine 350 is "free wheeling" (e.g., when a crankshaft of the engine is rotating but the engine is not running) and in a second configuration when the engine is running. In some embodiments, during the "free wheeling" configuration, fuel is not injected into the engine 350 and/or a spark is not initiated such that the engine 350 is spinning but a combustion cycle does not occur.

In some embodiments, the electric motor 330 can be used to rotate the drive shaft 312 to move the vehicle 310 and the engine 350 can be off. The engine 350 can be started while the vehicle 310 is moving forward by disengaging the electric motor 330 from the wheels 318, 319 (i.e., shift the first synchronizer 362 out of engagement with the first electric motor gear 331) such that the vehicle 310 is coasting (i.e., the wheels 318, 319 continue to spin and cause the drive shaft 312 to rotate, but the drive shaft 312 is not under power from the electric motor 330 or the engine 350). The electric motor 330 can then be used to start the engine 350. For example, with the drive shaft 312 rotating as a result of being operatively coupled to the rotating wheels 318, 319 (and the transmission output shaft 376 rotating due to the engagement between the drive shaft gear 311 and the transmission output gear 382), the first synchronizer 362 can be shifted into engagement with the second electric motor gear 333 and the second synchronizer 364 can be shifted into engagement with the internal combustion engine gear 354 such that the electric motor 330 can rotate the engine shaft 352 via a power path including the electric motor shaft 332, the intermediate gear-set 372, the internal combustion engine gear 354, and the engine shaft 352. The rotation of the engine shaft 352 by the electric motor 330 can cause the engine 350 to be turned over. When the engine 350 is spinning at a sufficient speed to run, the electronic control unit 320 can initiate fuel injection and spark.

Figure 6:
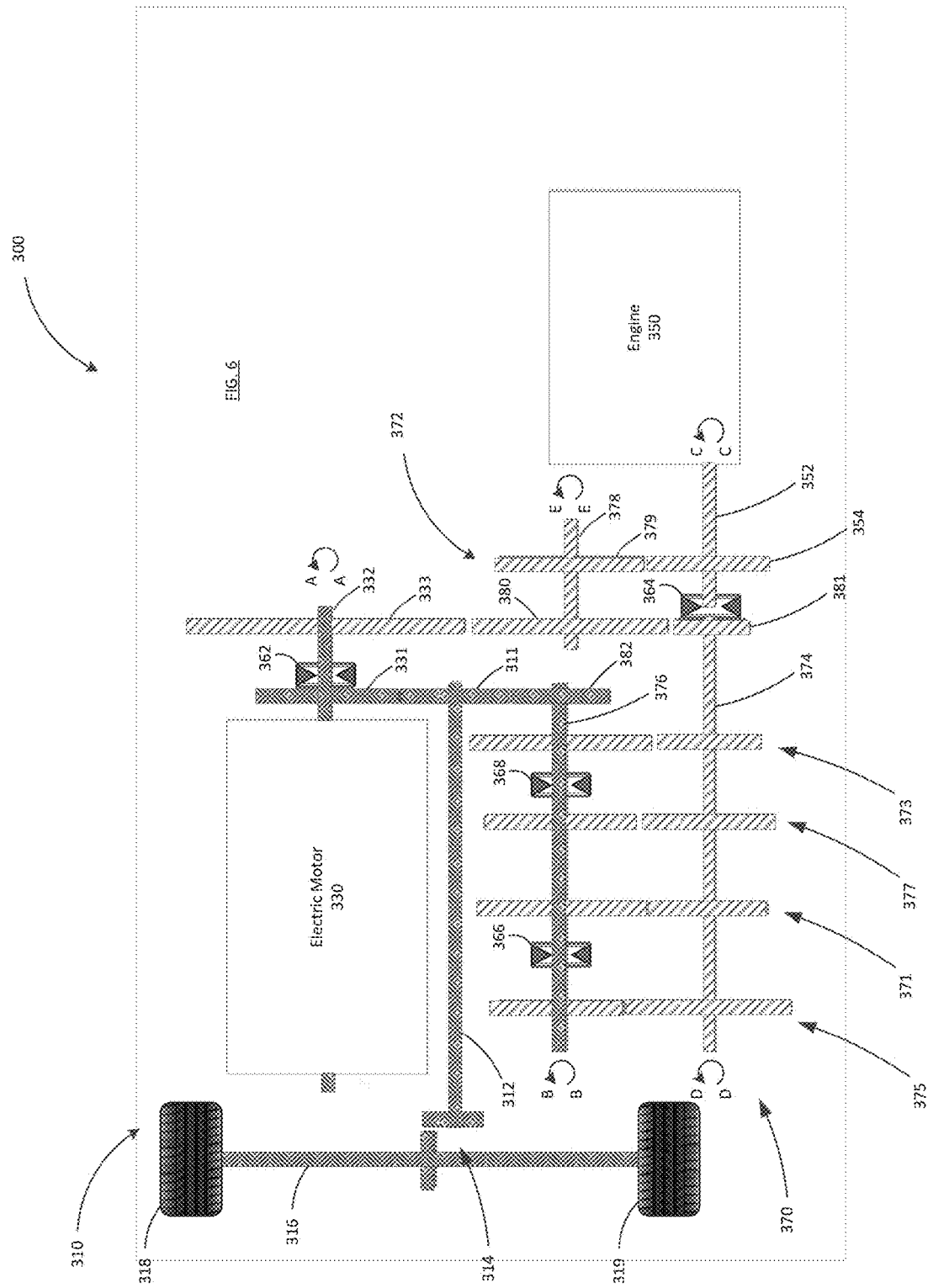
FIG. 6 is a schematic illustration of the powertrain system of FIG. 3 in a transitioning configuration.
Figure 7:
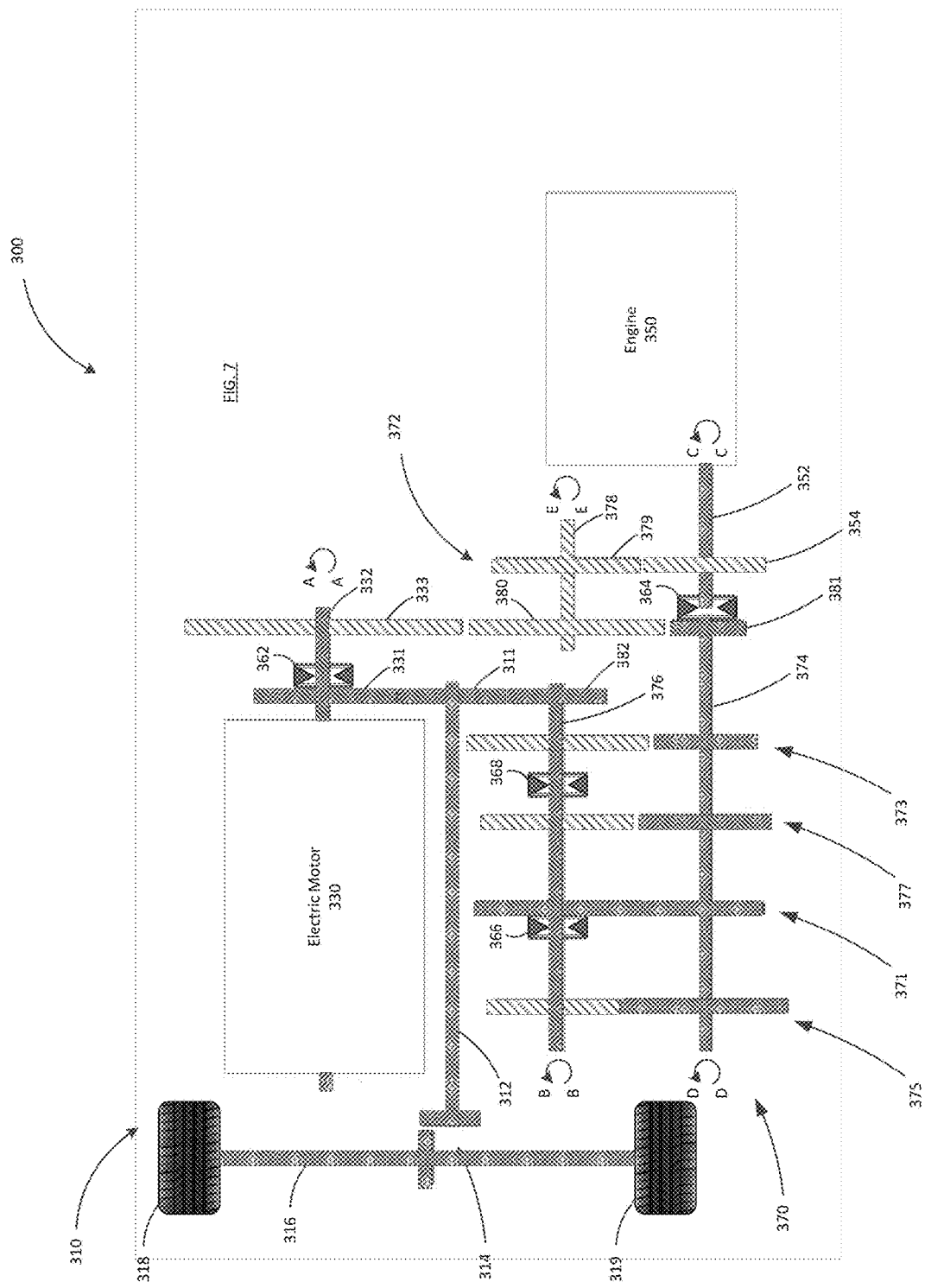
FIG. 7 is a schematic illustration of the powertrain system of FIG. 3 in an "engine drive" configuration, with the transmission in first gear.
Figure 8:
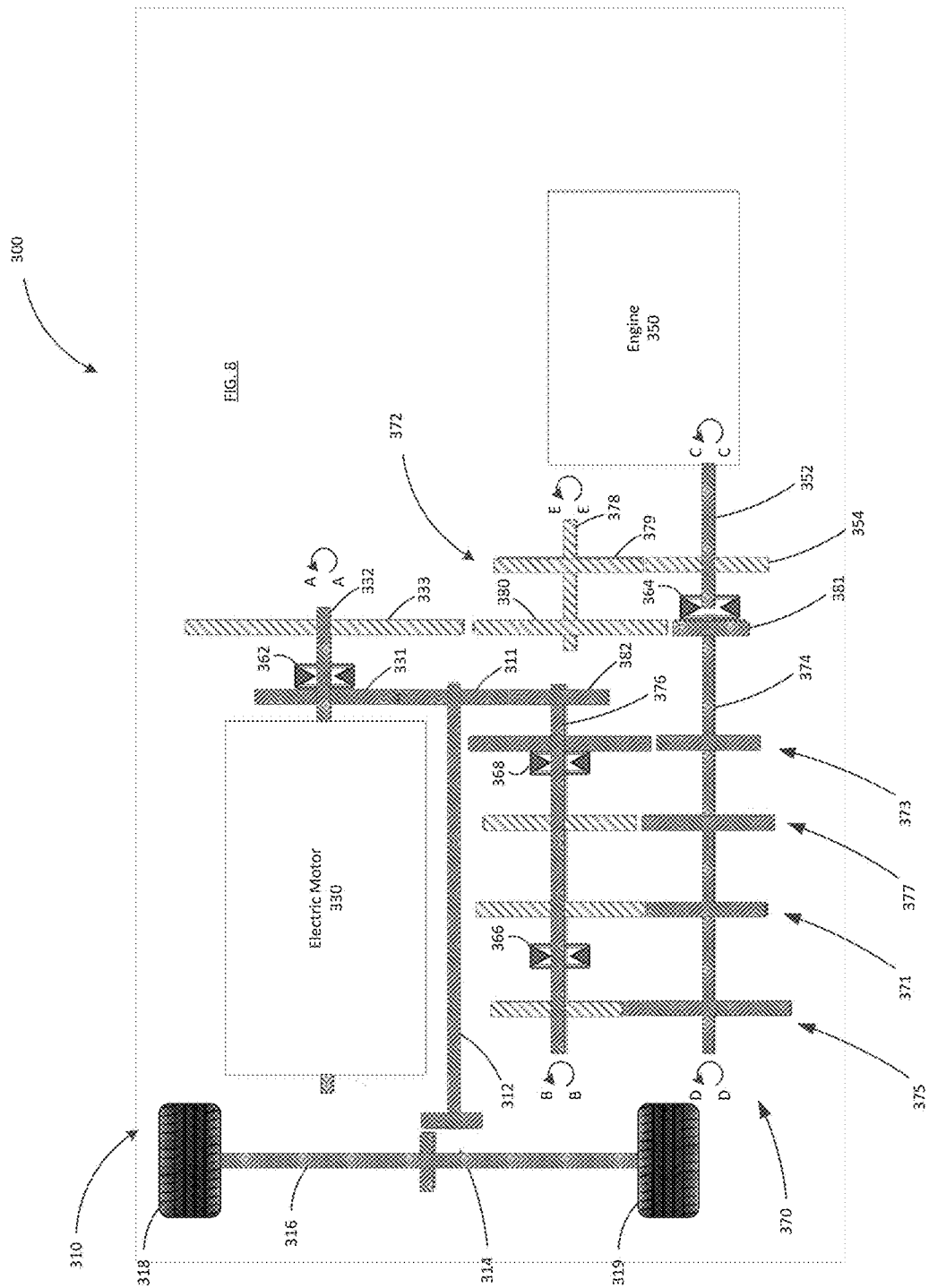
FIG. 8 is a schematic illustration of the powertrain system of FIG. 3 in the "engine drive" configuration, with the transmission in second gear.
Figure 9:
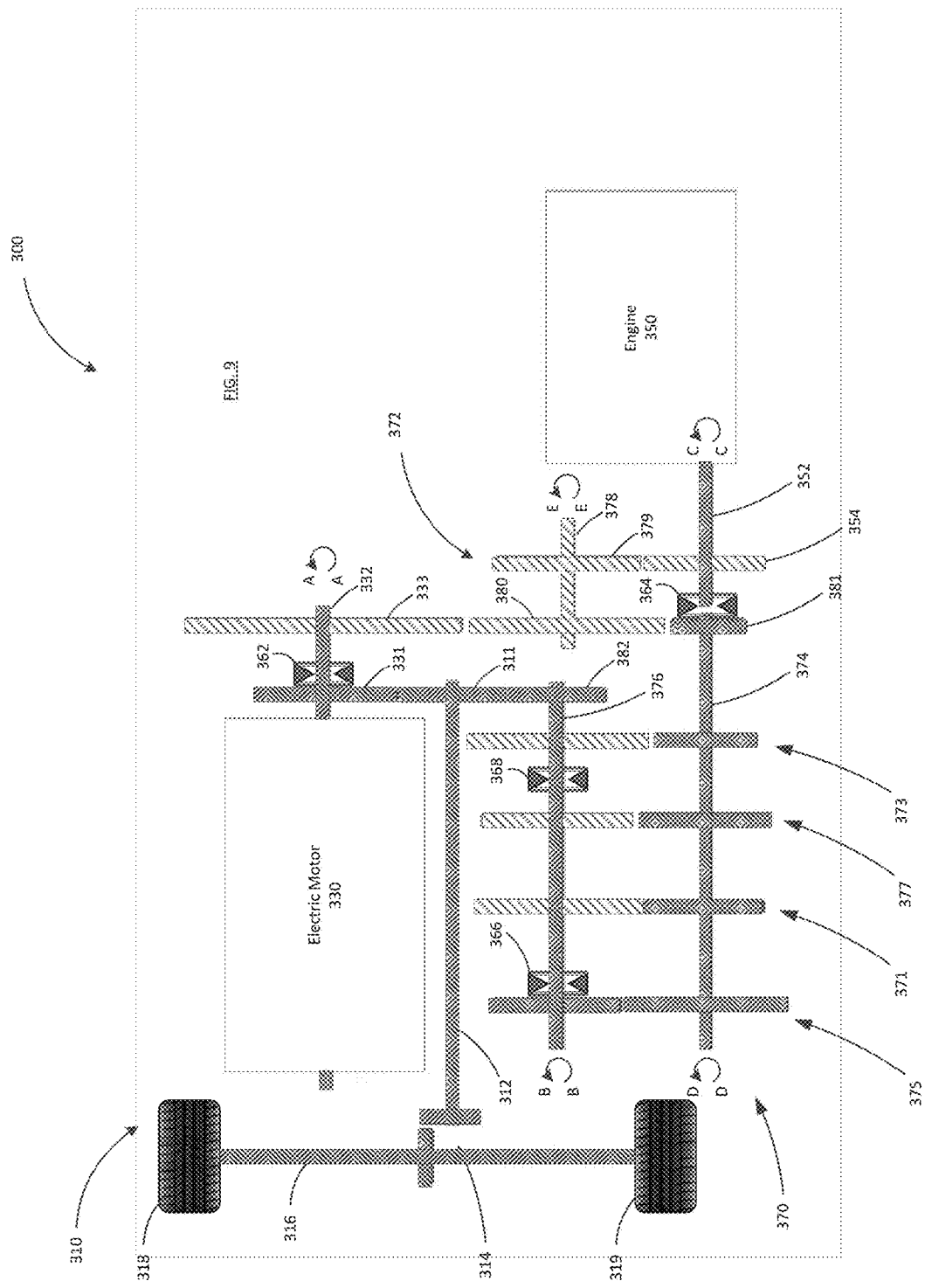
FIG. 9 is a schematic illustration of the powertrain system of FIG. 3 in the "engine drive" configuration, with the transmission in third gear.
Figure 10:
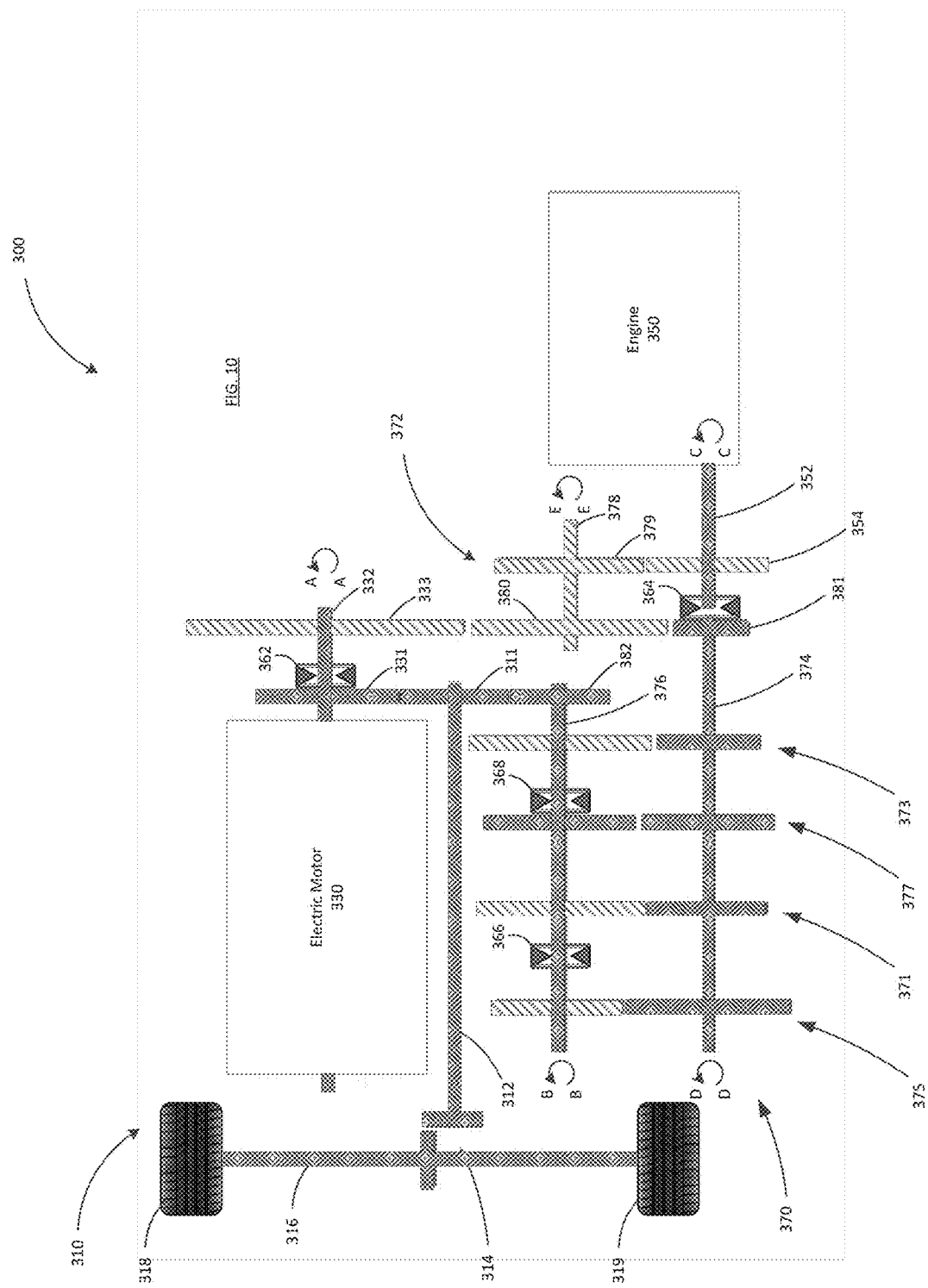
FIG. 10 is a schematic illustration of the powertrain system of FIG. 3 in the "engine drive" configuration, with the transmission in fourth gear.
Figure 11:
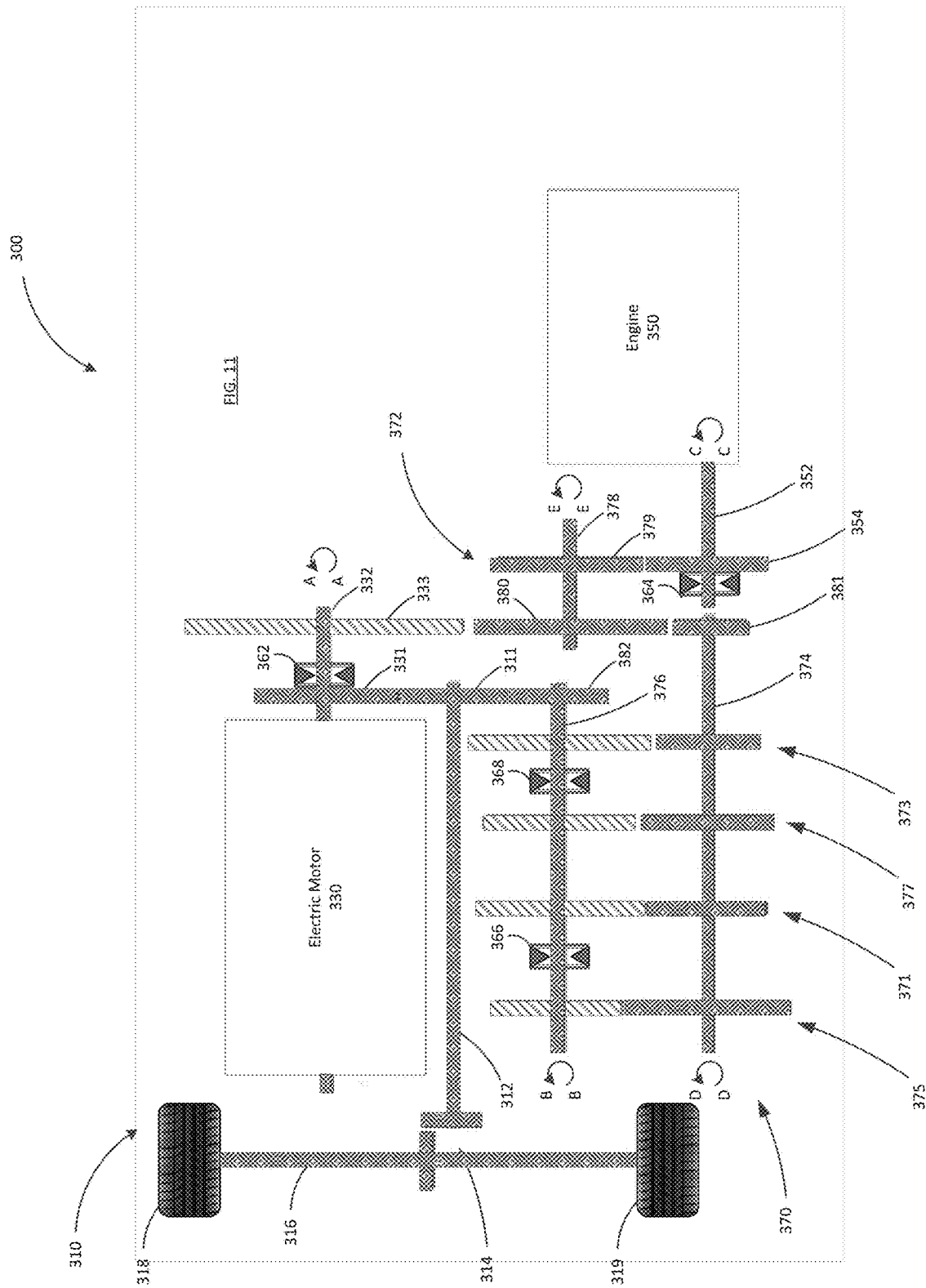
FIG. 11 is a schematic illustration of the powertrain system of FIG. 3 in a transitioning configuration.
Figure 12:
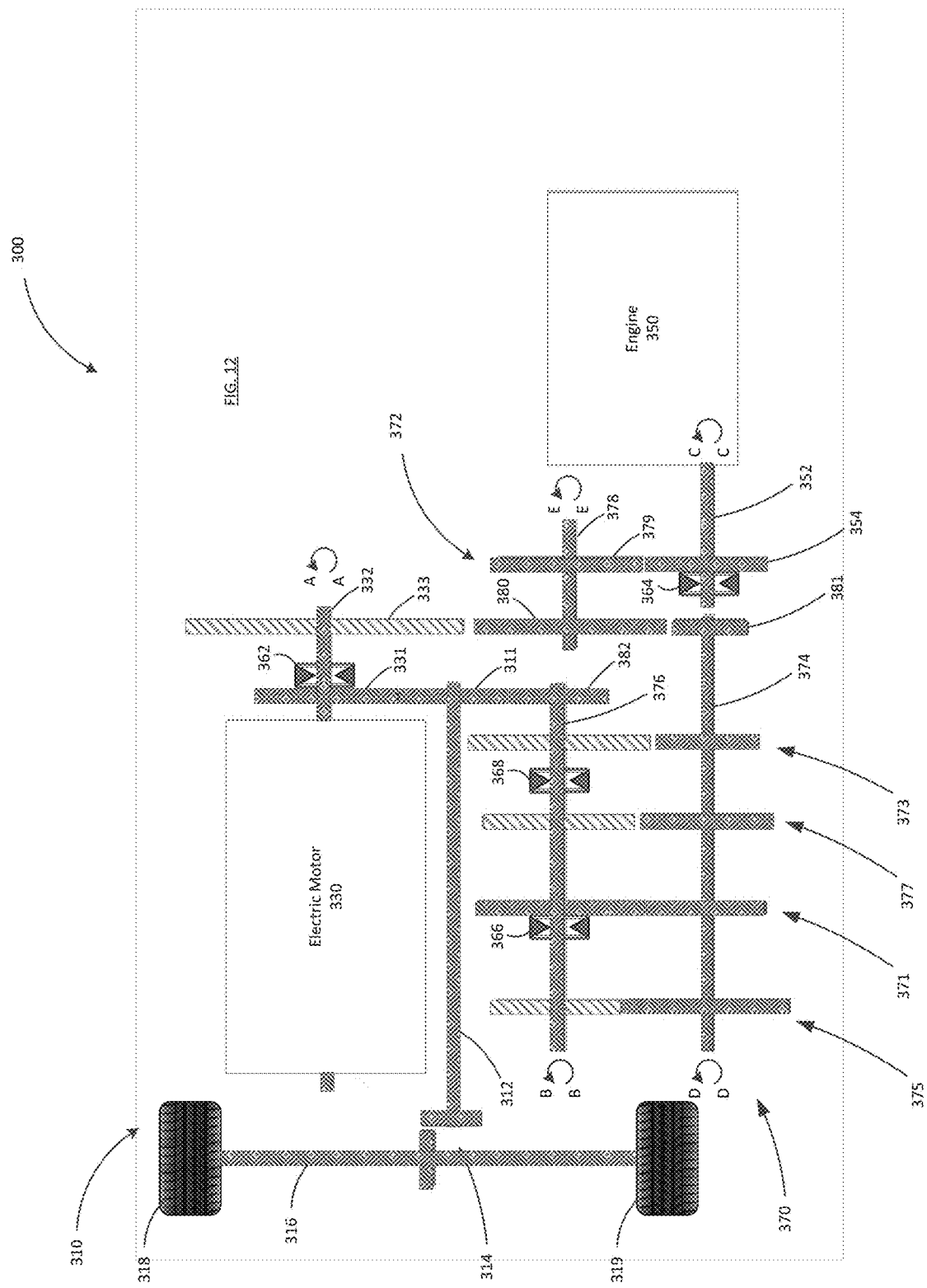
FIG. 12 is a schematic illustration of the powertrain system of FIG. 3 in a transitioning configuration.

Next, the electronic control unit 320 signals the electric motor 330 to accelerate the drive shaft 312 while simultaneously shifting the second synchronizer 364 to connect the engine 350 with the transmission input shaft 374. As shown in FIG. 6, the second synchronizer 364 is shifted to the left along the internal combustion engine shaft 352 to lockingly engage the internal combustion engine shaft 352 with the transmission input gear 381. The engagement between the second synchronizer 364 and the transmission input gear 381 causes the transmission input shaft 374 to rotate under the control of the internal combustion engine shaft 352, as indicated by arrow DD. The rotation of the transmission input shaft 374 causes the associated gear-sets 371, 373, 375, and 377 to rotate. However, since none of the gear-sets 371, 373, 375, and 377 are lockingly engaged with the transmission output shaft 376, no power is transmitted, as indicated by the hatched pattern. The rotation of the transmission input gear 381 also causes the intermediate gear-set 372 to rotate, as indicated by arrow EE, which causes the second electric motor gear 333 and the internal combustion engine gear 354 to "free run" on the electric motor shaft 332 and the internal combustion engine shaft 352, respectively, as indicated by the hatched pattern gear-set The electronic control unit 320 then performs speed matching between the first transmission gear-set 371 and the transmission output shaft 376. In other words, the electronic control unit 320 changes (e.g., increases) the speed (i.e., the RPMs) of the internal combustion engine 350 to change (e.g., increase) the speed of the first transmission gear-set 371 until the speed of the first transmission gear-set 371 matches the speed of the transmission output shaft 376, which is under the control of the electric motor 330. Once the first gear-set 371 and the transmission output shaft 376 are rotating at the same speed, the electronic control unit 320 shifts the third synchronizer 366 to the right along the transmission output shaft 376 to couple the output gear of the first transmission gear-set 371 in locking engagement with the transmission output shaft 376. As shown in FIG. 7, upon coupling the first transmission gear-set 371 and the transmission output shaft 376 in locking engagement, the engine 350 transmits power through the first transmission gear-set 371, the transmission output shaft 376, and the transmission output gear 382, causing the drive shaft gear 311 to be rotated partially under the control of the engine 350, as shown by the hatched pattern. The rotation of gear 311 rotates the drive shaft 312 and causes movement of the vehicle 310. Because the third synchronizer 366 is disengaged from the third gear-set 375 and the fourth synchronizer 368 is disengaged from the second gear-set 373 and the fourth gear-set 377, no power is transmitted from the transmission output shaft 376 to the transmission input shaft 374 via the second gear-set 373, the third gear-set 375, or the fourth gear-set 377, as indicated by the hatched pattern. In this configuration, both the electric motor 330 and the engine 350 are providing power to the drive shaft 312. This configuration corresponds with first gear. The system 300 can continue to accelerate by increasing fuel flow to the internal combustion engine 350. Moreover, after the motor 330 has completed any "torque fill" and/or speed matching, the synchronizer 362 can be shifted such that the vehicle is in an "engine only" mode (i.e., with the electric motor 330 not producing any power into the drive shaft 312). Thus, although FIG. 7 and other figures described herein may be described as being in an "engine drive" configuration, such figures may also show the electric motor contributing power to the drive shaft. It should be understood that the system can also be placed into an "engine only" mode where applicable. For example, in some embodiments, the system 300 may be configured to be a "motor drive" configuration at low speeds and an "engine drive" configuration at high speeds.

If the driver depresses the accelerator of the vehicle 310 to request a speed higher than the optimum speed range of the first transmission gear-set 371 and desires to shift to second gear, the electronic control unit 320 uses the electric motor 330 to maintain power to the drive shaft 312 (i.e. torque fill) and decreases the speed of the engine 350. When the torque across the first transmission gear-set 371 drops to zero, the electronic control unit 320 disengages the third synchronizer 366 from locking engagement with the first transmission gear-set 371 so that the output gear of the first transmission gear-set 371 rotates freely relative to transmission output shaft 376. The electronic control unit 320 then reduces the speed of the engine 350 to match the second transmission gear-set 373. The electronic control unit 320 then shifts the fourth synchronizer 368 to the right along the transmission output shaft 376 to couple the output gear of the second transmission gear-set 373 in locking engagement with the transmission output shaft 376. As indicated by the cross-hatched shading in FIG. 8, upon coupling the second transmission gear-set 373 and the transmission output shaft 376 in locking engagement, the engine 350 transmits power through the second transmission gear-set 373, the transmission output shaft 376, and the transmission output gear 382, causing the drive shaft gear 311 to rotate. The rotation of the drive shaft gear 311 transmits power to and rotates the drive shaft 312, causing movement of the wheels 318, 319. Because the third synchronizer 366 is disengaged from the first gear-set 371 and the third gear-set 375 and the fourth synchronizer 368 is disengaged from the fourth gear-set 377, no power is transmitted from the transmission output shaft 376 to the transmission input shaft 374 via the first gear-set 371, the third gear-set 375, or the fourth gear-set 377, as indicated by the hatched pattern. In this configuration, both the electric motor 330 and the engine 350 are providing power to the drive shaft 312. This configuration corresponds with second gear. The system 300 can continue to accelerate by increasing fuel flow to the engine 350.

If the driver depresses the accelerator of the vehicle 310 to request a speed higher than the optimum speed range of the second transmission gear-set 373 (prompting another gear shift), the electronic control unit 320 uses the electric motor 330 to maintain power to the drive shaft 312 (i.e., torque fill) and decreases the speed of the engine 350. When the torque across the second transmission gear-set 373 drops to zero, the electronic control unit 320 disengages the fourth synchronizer 368 from locking engagement with the second transmission gear-set 373 so that the output gear of the second transmission gear-set 373 rotates freely relative to transmission output shaft 376. The electronic control unit 320 then reduces the speed of the engine 350 to match the third transmission gear-set 375. The electronic control unit 320 then shifts the third synchronizer 366 to the left along the transmission output shaft 376 to couple the output gear of the third transmission gear-set 375 in locking engagement with the transmission output shaft 376. As indicated by the cross-hatched shading in FIG. 9, upon coupling the third transmission gear-set 375 and the transmission output shaft 376 in locking engagement, the engine 350 transmits power through the third transmission gear-set 375, the transmission output shaft 376, and the transmission output gear 382, causing the drive shaft gear 311 to rotate. The rotation of the drive shaft gear 311 transmits power to and rotates the drive shaft 312, causing movement of the wheels 318, 319. Because the third synchronizer 366 is disengaged from the first gear-set 371 and the fourth synchronizer 368 is disengaged from the second gear-set 373 and the fourth gear-set 377, no power is transmitted from the transmission output shaft 376 to the transmission input shaft 374 via the first gear-set 371, the second gear-set 373, or the fourth gear-set 377, as indicated by the hatched pattern. In this configuration, both the electric motor 330 and the engine 350 are providing power to the drive shaft 312. This configuration corresponds with third gear. The system 300 can continue to accelerate by increasing fuel flow to the engine 350.

If the driver depresses the accelerator of the vehicle 310 to request a speed higher than the optimum speed range of the third transmission gear-set 375 (prompting a gear shift), the electronic control unit 320 uses the electric motor 330 to maintain power to the drive shaft 312 (i.e. torque fill) and decreases the speed of the engine 350. When the torque across the third transmission gear-set 375 drops to zero, the electronic control unit 320 disengages the third synchronizer 366 from locking engagement with the third transmission gear-set 375 so that the output gear of the third transmission gear-set 375 rotates freely relative to transmission output shaft 376. The electronic control unit 320 then reduces the speed of the engine 350 to match the fourth transmission gear-set 377. The electronic control unit 320 then shifts the fourth synchronizer 368 to the left along the transmission output shaft 376 to couple the output gear of the fourth transmission gear-set 377 in locking engagement with the transmission output shaft 376. As indicated by the cross-hatched shading in FIG. 10, upon coupling the fourth transmission gear-set 377 and the transmission output shaft 376 in locking engagement, the engine 350 transmits power through the fourth transmission gear-set 377, the transmission output shaft 376, and the transmission output gear 382, causing the drive shaft gear 311 to rotate. The rotation of the drive shaft gear 311 transmits power to and rotates the drive shaft 312, causing movement of the wheels 318, 319. Because the third synchronizer 366 is disengaged from the first gear-set 371 and the third gear-set 375 and the fourth synchronizer 368 is disengaged from the second gear-set 373, no power is transmitted from the transmission output shaft 376 to the transmission input shaft 374 via the first gear-set 371, the second gear-set 373, or the third gear-set 375, as indicated by the hatched pattern. In this configuration, both the electric motor 330 and the engine 350 are providing power to the drive shaft 312. This configuration corresponds with fourth gear. The system 300 can continue to accelerate by increasing fuel flow to the engine 350.

If the driver depresses the accelerator of the vehicle 310 to request a speed higher than the optimum speed range of the fourth transmission gear-set 377 (prompting a gear shift), the electronic control unit 320 uses the electric motor 330 to maintain power to the drive shaft 312 (i.e. torque fill) and decreases the speed of the engine 350. When the torque across the fourth transmission gear-set 377 drops to zero, the electronic control unit 320 shifts the fourth synchronizer 368 out of locking engagement the fourth transmission gear-set 377 so that the output gear of the fourth transmission gear-set 377 rotates freely relative to the transmission output shaft 376. The electronic control unit 320 then shifts the second synchronizer 364 to the right along the internal combustion engine shaft 352 to couple the internal combustion engine gear 354 in locking engagement with the internal combustion engine shaft 352. As indicated by the cross-hatched shading in FIG. 11, this causes the engine 350 to transmit power through the intermediate gear-set 372 to the transmission input gear 381 and transmission input shaft 374. Because the third synchronizer 366 is disengaged from the first gear-set 371 and the third gear-set 375 and the fourth synchronizer 368 is disengaged from the second gear-set 373 and the fourth gear-set 377, no power is transmitted from the transmission output shaft 376 to the transmission input shaft 374, as indicated by the hatched pattern on the output gears of the gear-sets. This configuration of the second synchronizer 364 corresponds with gears five to eight.

Next, to move into a configuration corresponding with fifth gear, with the second synchronizer 364 locking the internal combustion engine shaft 352 to the internal combustion engine gear 354, the electronic control unit 320 uses the electric motor 330 to maintain power to the drive shaft (i.e. torque fill) and decreases the speed of the engine 350 until the speed of the first transmission gear-set 371 matches the speed of the transmission output shaft 376, which is under the control of the electric motor 330. Once the first gear-set 371 and the transmission output shaft 376 are rotating at the same speed, the electronic control unit 320 shifts the third synchronizer 366 to the right along the transmission output shaft 376 to couple the output gear of the first transmission gear-set 371 in locking engagement with the transmission output shaft 376. As indicated by the hatched shading in FIG. 12, upon coupling the first transmission gear-set 371 and the transmission output shaft 376 in locking engagement, the engine 350 transmits power through the first transmission gear-set 371, the transmission output shaft 376, and the transmission output gear 382, causing the drive shaft gear 311 to rotate partially under the control of the engine 350. The rotation of the drive shaft gear 311 transmits power to and rotates the drive shaft 312, causing movement of the wheels 318, 319. Because the third synchronizer 366 is disengaged from the third gear-set 375 and the fourth synchronizer 368 is disengaged from the second gear-set 373 and the fourth gear-set 377, no power is transmitted from the transmission output shaft 376 to the transmission input shaft 374 via the second gear-set 373, the third gear-set 375, or the fourth gear-set 377, as indicated by the hatched pattern. In this configuration, both the electric motor 330 and the engine 350 are providing power to the drive shaft 312. This configuration corresponds with fifth gear. The system 300 can continue to accelerate by increasing fuel flow to the engine 350.

Figure 13:
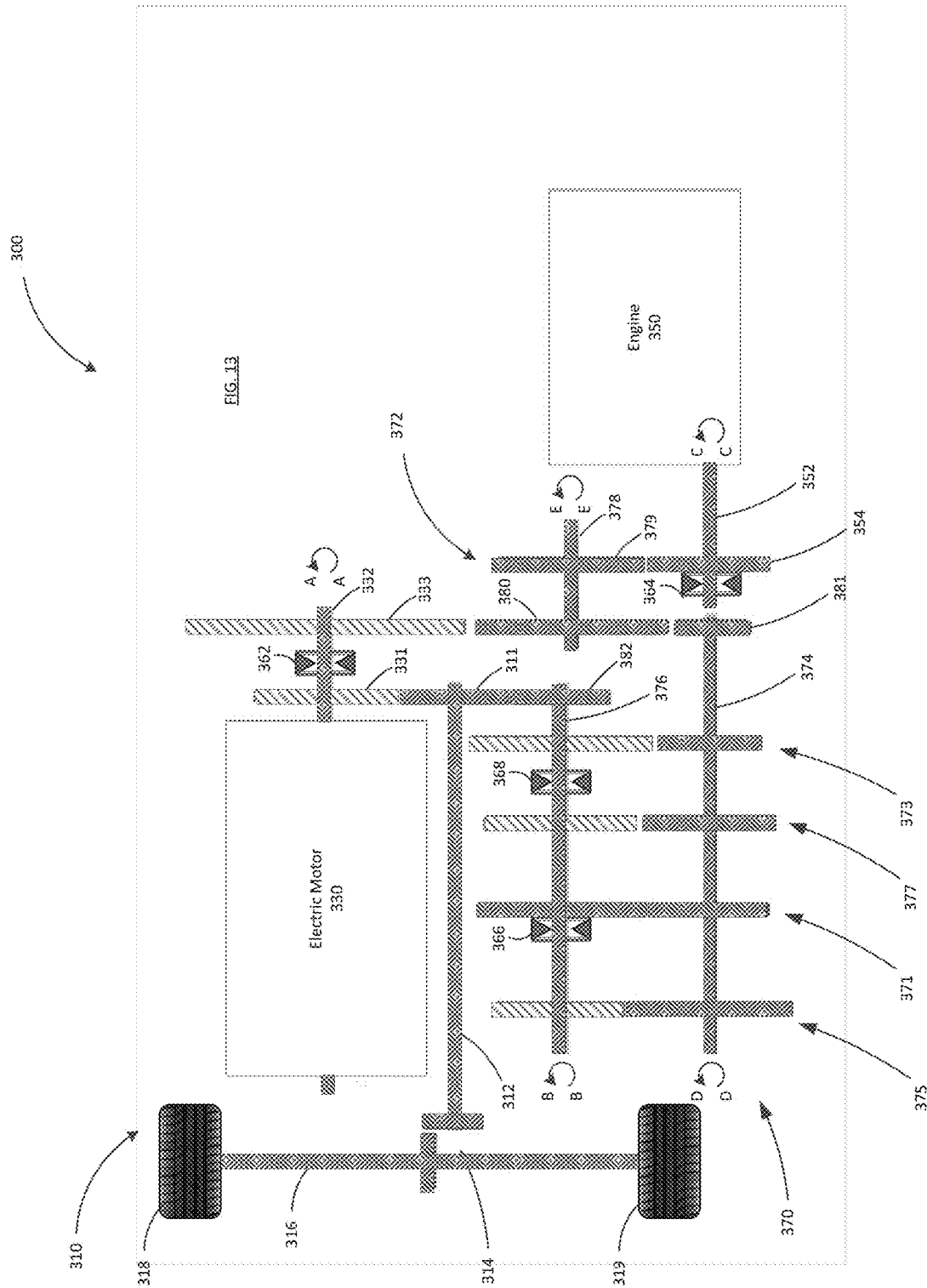
FIG. 13 is a schematic illustration of the powertrain system of FIG. 3 in the "engine drive" configuration, with the transmission in fifth gear.
Figure 14:
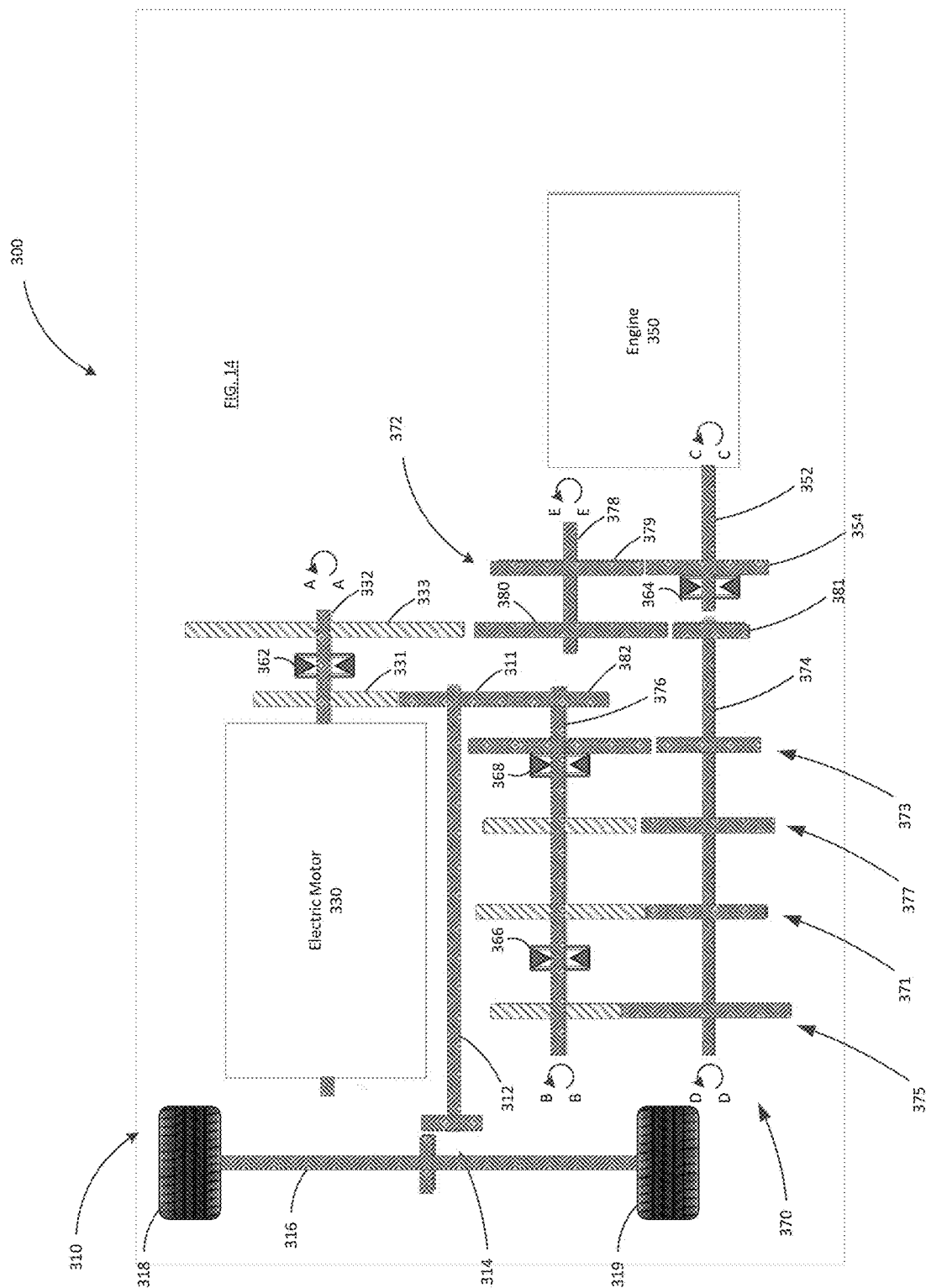
FIG. 14 is a schematic illustration of the powertrain system of FIG. 3 in the "engine drive" configuration, with the transmission in sixth gear.
Figure 15:
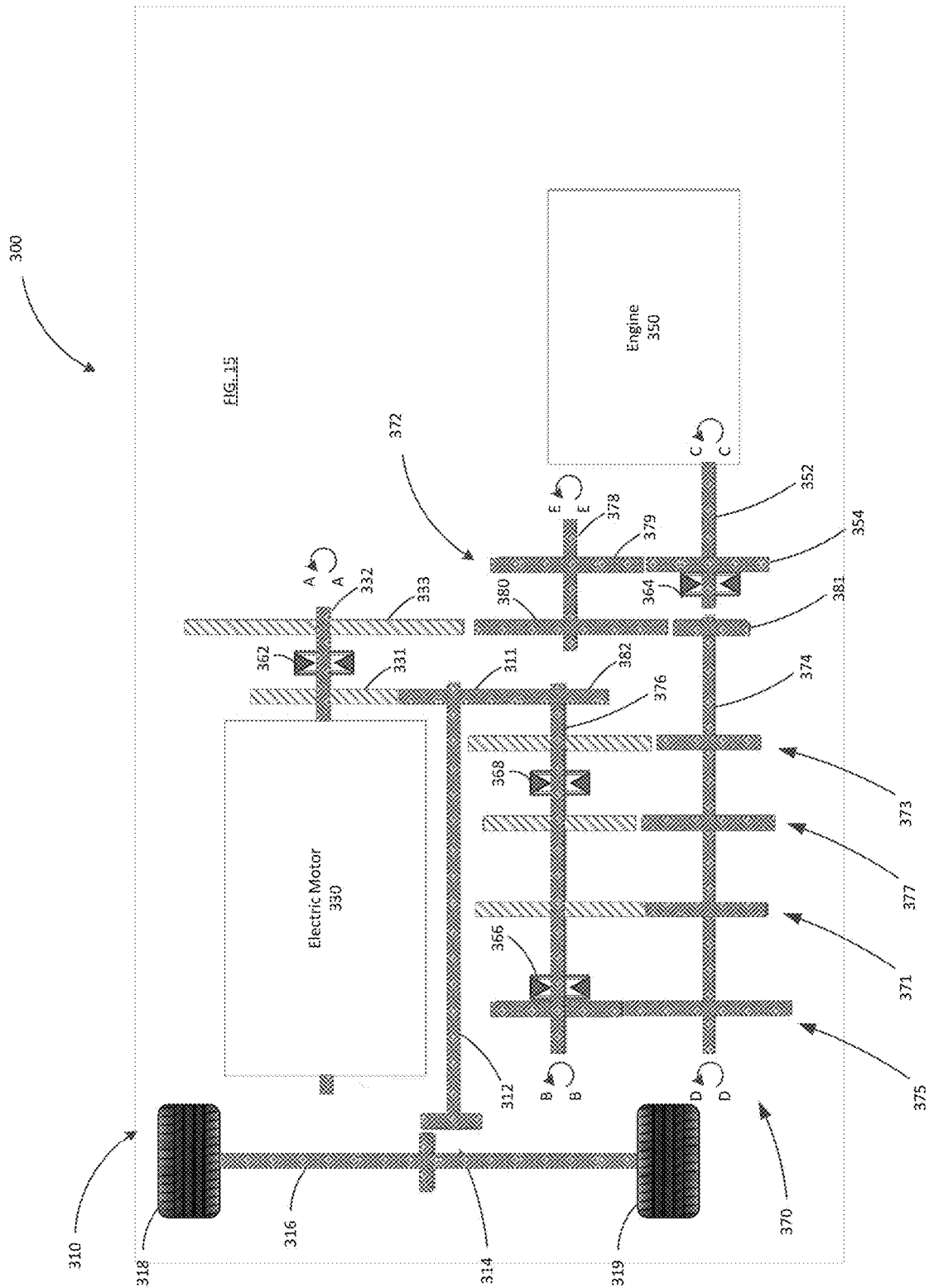
FIG. 15 is a schematic illustration of the powertrain system of FIG. 3 in the "engine drive" configuration, with the transmission in seventh gear.
Figure 16:
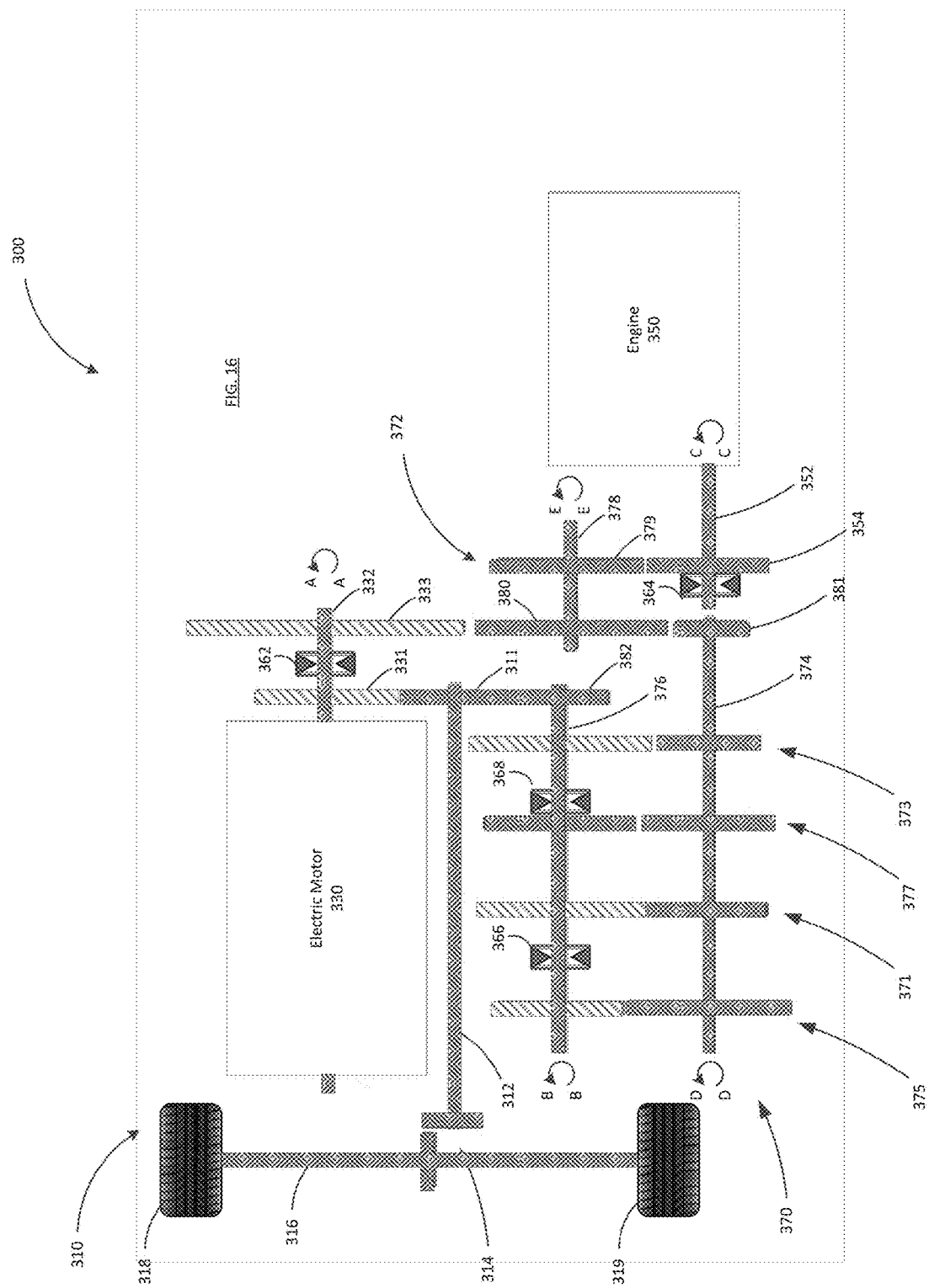
FIG. 16 is a schematic illustration of the powertrain system of FIG. 3 in the "engine drive" configuration, with the transmission in eighth gear.

After the electronic control unit 320 moves the system 300 into a configuration corresponding with fifth gear, the electronic control unit 320 can shift the first synchronizer 362 to the right so that the first electric motor gear 331 and the electric motor shaft 332 are no longer in locking engagement, as shown in FIG. 13. In this configuration, the first electric motor gear 331 "free runs" relative to the electric motor shaft 332. As a result, the drive shaft 312 is driven by only the engine 350. Alternatively, the first synchronizer 362 can remain in the left-most position to maintain the first electric motor gear 331 and the electric motor shaft 332 in locking engagement so that the electric motor 330 can continue to transmit power to the drive shaft 312 via the first electric motor gear 331. In other embodiments, the electronic control unit 320 can shift the first synchronizer 362 into locking engagement with the first electric motor gear 331 and the electric motor shaft 332 to provide torque to the drive shaft 312 during period when the system 300 is not configured to transmit power from the engine 350 to the drive shaft 312. In other words, the electric motor 330 can be configured to transmit power (i.e. torque fill) to the drive shaft 312 during periods where the system 300 is shifting gears in order to prevent an acceleration lag.

Although the "torque fill" by the electric motor 330 is shown as being supplied via the gear 331 in engagement with the gear 311, in other embodiments, the electric motor 330 can supply torque to the drive shaft 312 by any suitable linkage. For example, in some embodiments, the electric motor 330 can be operably connected to (and can supply torque to the drive shaft) indirectly via the gear 333 and/or the intermediate gear-set 372.

If the driver depresses the accelerator of the vehicle 310 to request a speed higher than the optimum speed range of the first transmission gear-set 371 in combination with the intermediate gear-set 372 (prompting a gear shift), the electronic control unit 320 decreases the speed of the engine 350. When the torque across the first transmission gear-set 371 drops to zero, the electronic control unit 320 disengages the third synchronizer 366 from locking engagement with the first transmission gear-set 371 so that the output gear of the first transmission gear-set 371 rotates freely relative to transmission output shaft 376. The electronic control unit 320 then reduces the speed of the engine 350 to match the second transmission gear-set 373. The electronic control unit 320 then shifts the fourth synchronizer 368 to the right along the transmission output shaft 376 to couple the output gear of the second transmission gear-set 373 in locking engagement with the transmission output shaft 376. As indicated by the hatched shading in FIG. 14, upon coupling the second transmission gear-set 373 and the transmission output shaft 376 in locking engagement, the engine 350 transmits power through the second transmission gear-set 373, the transmission output shaft 376, and the transmission output gear 382, causing the drive shaft gear 311 to rotate. The rotation of the drive shaft gear 311 transmits power to and rotates the drive shaft 312, causing movement of the wheels 318, 319. Because the third synchronizer 366 is disengaged from the first gear-set 371 and the third gear-set 375 and the fourth synchronizer 368 is disengaged from the fourth gear-set 377, no power is transmitted from the transmission output shaft 376 to the transmission input shaft 374 via the first gear-set 371, the third gear-set 375, or the fourth gear-set 377, as indicated by the hatched pattern. In this configuration, only the engine 350 is providing power to the drive shaft 312. This configuration corresponds with sixth gear. The system 300 can continue to accelerate by increasing fuel flow to the engine 350.

If the driver depresses the accelerator of the vehicle 310 to request a speed higher than the optimum speed range of the second transmission gear-set 373 (prompting a gear shift), the electronic control unit 320 uses the electric motor 330 to maintain power to decrease the speed of the engine 350. When the torque across the second transmission gear-set 373 drops to zero, the electronic control unit 320 disengages the fourth synchronizer 368 from locking engagement with the second transmission gear-set 373 so that the output gear of the second transmission gear-set 373 rotates freely relative to transmission output shaft 376. The electronic control unit 320 then reduces the speed of the engine 350 to match the third transmission gear-set 375. The electronic control unit 320 then shifts the third synchronizer 366 to the left along the transmission output shaft 376 to couple the output gear of the third transmission gear-set 375 in locking engagement with the transmission output shaft 376. As indicated by the cross-hatched shading in FIG. 15, upon coupling the third transmission gear-set 375 and the transmission output shaft 376 in locking engagement, the engine 350 transmits power through the third transmission gear-set 375, the transmission output shaft 376, and the transmission output gear 382, causing the drive shaft gear 311 to rotate. The rotation of the drive shaft gear 311 transmits power to and rotates the drive shaft 312, causing movement of the wheels 318, 319. Because the third synchronizer 366 is disengaged from the first gear-set 371 and the fourth synchronizer 368 is disengaged from the second gear-set 373 and the fourth gear-set 377, no power is transmitted from the transmission output shaft 376 to the transmission input shaft 374 via the first gear-set 371, the second gear-set 373, or the fourth gear-set 377, as indicated by the hatched pattern. In this configuration, only the engine 350 provides power to the drive shaft 312. This configuration corresponds with seventh gear. The system 300 can continue to accelerate by increasing fuel flow to the engine 350.

If the driver depresses the accelerator of the vehicle 310 to request a speed higher than the optimum speed range of the third transmission gear-set 375 (prompting a gear shift), the electronic control unit 320 uses the electric motor 330 to decrease the speed of the engine 350. When the torque across the third transmission gear-set 375 drops to zero, the electronic control unit 320 disengages the third synchronizer 366 from locking engagement with the third transmission gear-set 375 so that the output gear of the third transmission gear-set 375 rotates freely relative to transmission output shaft 376. The electronic control unit 320 then reduces the speed of the engine 350 to match the fourth transmission gear-set 377. The electronic control unit 320 then shifts the fourth synchronizer 368 to the left along the transmission output shaft 376 to couple the output gear of the fourth transmission gear-set 377 in locking engagement with the transmission output shaft 376. As indicated by the cross-hatched shading in FIG. 16, upon coupling the fourth transmission gear-set 377 and the transmission output shaft 376 in locking engagement, the engine 350 transmits power through the fourth transmission gear-set 377, the transmission output shaft 376, and the transmission output gear 382, causing the drive shaft gear 311 to rotate. The rotation of the drive shaft gear 311 transmits power to and rotates the drive shaft 312, causing movement of the wheels 318, 319. Because the third synchronizer 366 is disengaged from the first gear-set 371 and the third gear-set 375 and the fourth synchronizer 368 is disengaged from the second gear-set 373, no power is transmitted from the transmission output shaft 376 to the transmission input shaft 374 via the first gear-set 371, the second gear-set 373, or the third gear-set 375, as indicated by the hatched pattern. In this configuration, only the engine 350 provides power to the drive shaft 312. This configuration corresponds with eighth gear. The system 300 can continue to accelerate by increasing fuel flow to the engine 350.

Figure 17:
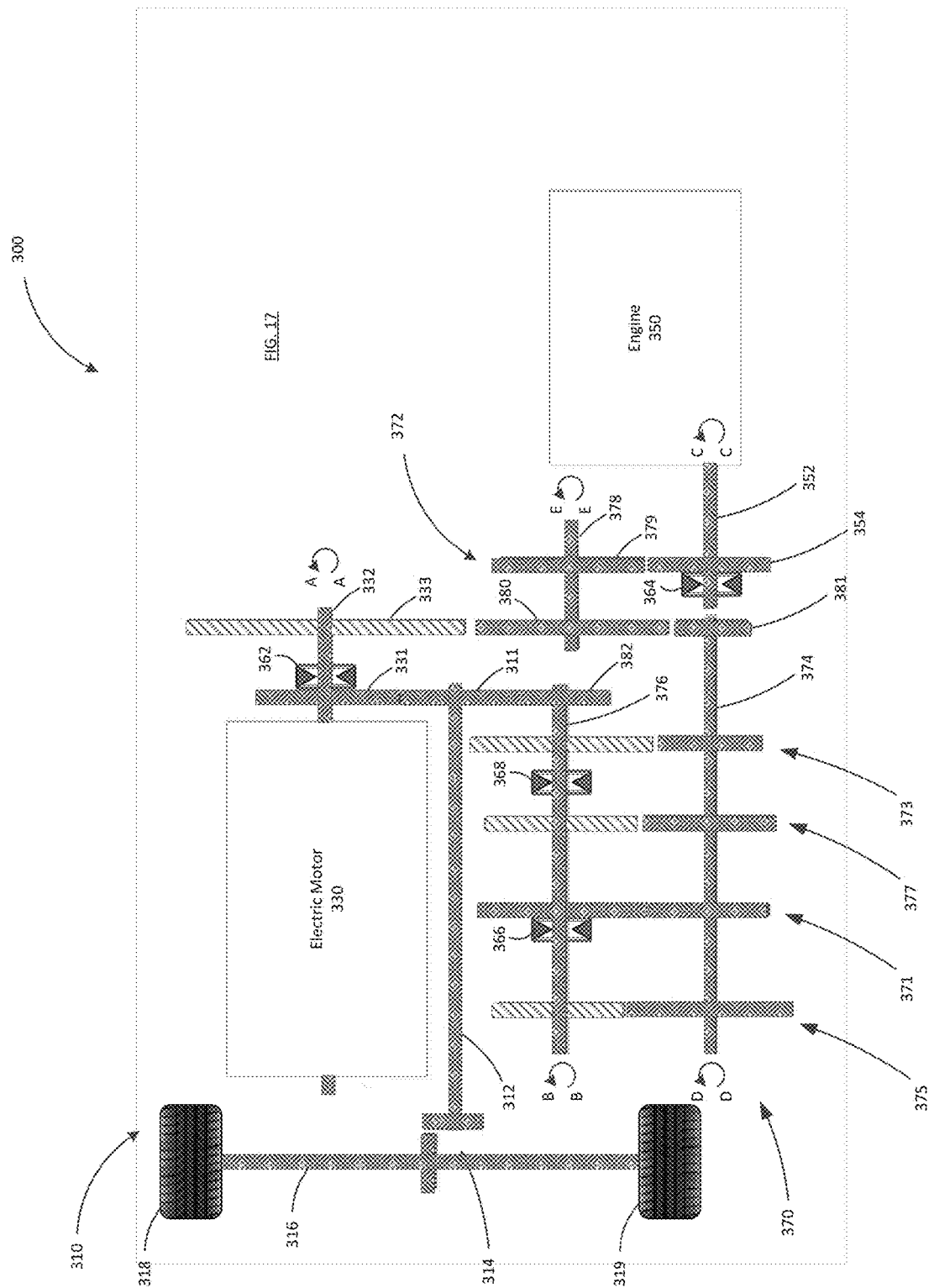
FIG. 17 is a schematic illustration of the powertrain system of FIG. 3 in an "all drive" configuration.
Figure 18:
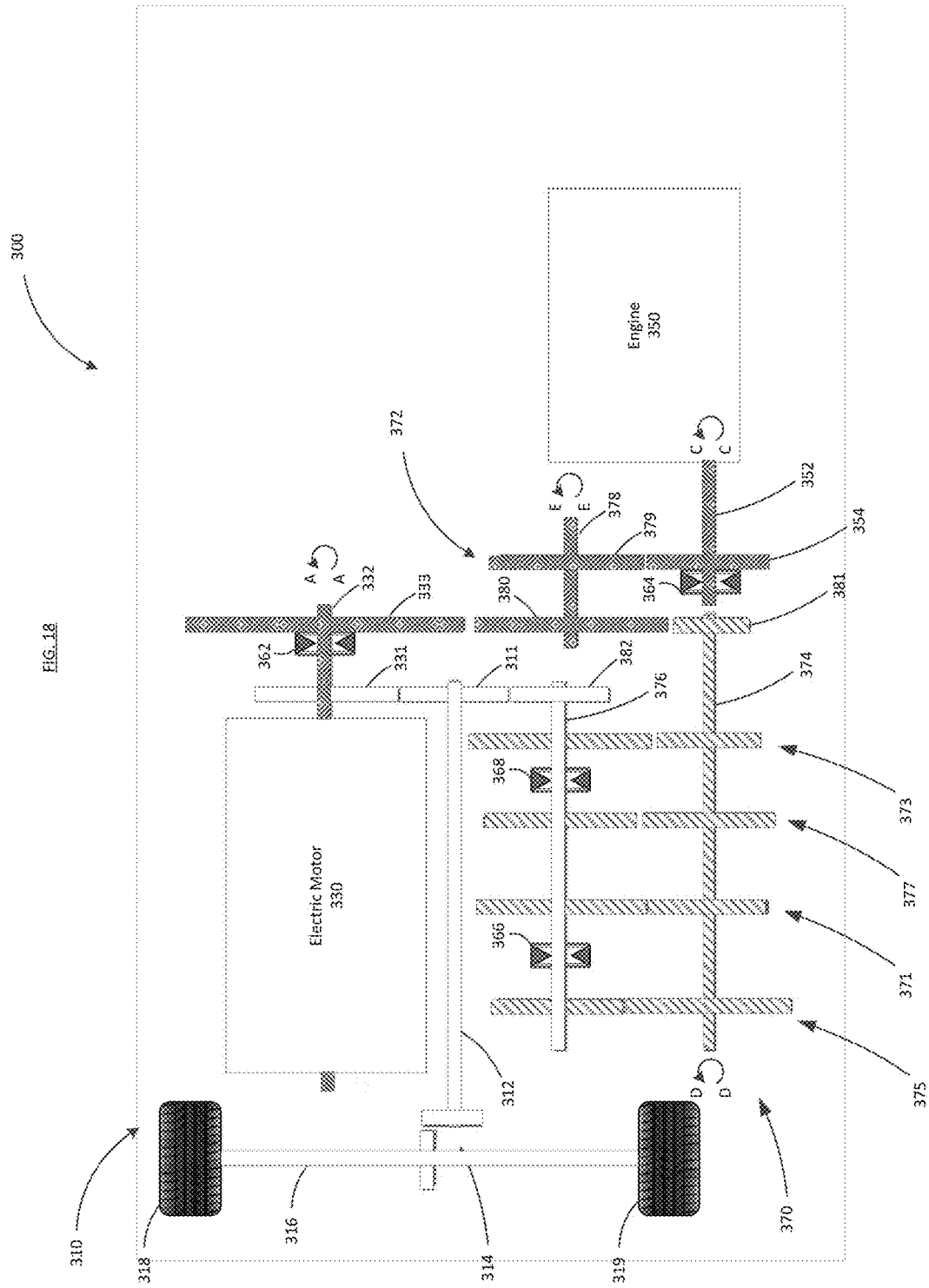
FIG. 18 is a schematic illustration of the powertrain system of FIG. 3 in a "park and charge" configuration.

In order to charge the energy storage device while the vehicle 310 is moving, the system 300 can be configured to operate in a "drive and charge" mode in which the engine 350 controls the rotation of the drive shaft 312 as described above with reference to gears five through eight and FIGS. 13-16. In "drive and charge" mode, as shown in FIG. 17, the electronic control unit 320 shifts the first synchronizer 362 to the left along the electric motor shaft 332 to couple the electric motor shaft 362 to the electric motor gear 331. The electronic control unit 320 signals the electric motor 330 to be charged through rotation of the electric motor gear 331 and the electric motor shaft 332 by the drive shaft gear 311. As indicated by the hatched pattern, the second electric motor gear 333 and the unselected gear-sets 373, 375, 377 are in a "free running" configuration. The other shafts and gears of the system are in a configuration to transmit power, as indicated by the cross-hatched pattern. Additionally, in some embodiments, the system 300 can be configured such that the system 300 transitions into the "drive and charge" mode only when the system 300 is not shifting between gears. For example, when the system 300 is shifting between two gears (and the third synchronizer 366 and the fourth synchronizer 368 are not engaged with a gear-set), the electric motor 330 can be used for speed-matching of the transmission output shaft 376 to a gear-set or for torque filling. When either the third synchronizer 366 or the fourth synchronizer 368 is engaged with a gear-set, the electric motor 330 can transition into the "drive and charge" mode such that the electric motor 330 is charged through rotation of the electric motor gear 331 and the electric motor shaft 332 by the drive shaft gear 311. If the system 300 begins to shift gears such that the third synchronizer 366 and the fourth synchronizer 368 are again not engaged with a gear-set, the electric motor 330 can transition out of "drive and charge" mode and be available for speed-matching and torque filling.

In order to charge the energy storage device while the vehicle 310 is stationary, the system 300 can be configured in a "park and charge" mode in which the engine 350 charges the energy storage device associated with the electric motor 330 while the vehicle 310 is stationary. Similarly stated in the "park and charge" mode, power is transferred from the engine 350 via the intermediate gear-set 372 and to the electric motor 330, which functions as a generator to charge the batteries. The configuration depicted in FIG. 18 can also support an "engine start" mode, during which power is transferred from the electric motor 330 via the intermediate gear-set 372 and to the engine 350 to start or "crank" the engine. To transition into "park and charge" (or "engine start") mode, the electronic control unit 320 shifts the first synchronizer 362 to the right along the electric motor shaft 332 and the second synchronizer 364 to the right along the internal combustion engine shaft 352. A speed matching module of the electronic control unit 320 can produce a speed control signal to adjust at least one of a speed of the engine shaft 352 or a speed of the motor shaft 332 when the first synchronizer 362 is being shifted to engage the second electric motor gear 333 and the second synchronizer 364 is being shifted to engage the engine gear 354. Upon matching the speeds of the engine shaft 352 or the motor shaft 332 with the engine gear 354, the electric motor shaft 332 can be coupled to the second electric motor gear 333 and the internal combustion engine shaft 352 can be coupled to the internal combustion engine gear 354. The electronic control unit 320 then starts the engine 350, which causes the internal combustion engine shaft 352 to rotate. Due to this rotation, as indicated by the cross-hatched pattern components in FIG. 18, the internal combustion engine gear 354, the intermediate gear-set 378, the second electric motor gear 333, and the electric motor shaft 332 all rotate under the power of the engine 350. The electronic control unit 320 configures the electric motor 330 so that the rotation of the electric motor shaft 332 can charge the energy storage device. As indicated by the hatched pattern, the transmission input shaft 374 and associated gears will "free run" as a result of being operatively coupled to the second intermediate gear 380.

In some embodiments, the electric motor 330 can be used to speed match in combination with the engine 350. For example, the engine 350 can be used for course speed matching control and the electric motor 330 can be used for finer speed matching control. With the first synchronizer 362 shifted to engage the second motor gear 333 and the second synchronizer 364 shifted to engage either the engine gear 354 or the transmission input gear 381, both the electric motor 330 and the engine 350 can contribute power to increasing the rotational speed of the transmission input shaft 374 and, thus, the gear-sets 371, 373, 375, and 377. Additionally, in some embodiments, the electric motor 330 can be configured to provide power to the drive shaft 312 via the gear-sets 371, 373, 375, and 377. For example, with the first synchronizer 362 shifted to engage the second motor gear 333, the electric motor 330 can be configured to control the rotation of the intermediate gear-set 372, the transmission input gear 381, the transmission input shaft 374, and the gear-sets 371, 373, 375, 377. When the third synchronizer 366 or the fourth synchronizer 368 are shifted into engagement with a target gear, the electric motor 330 can also control the rotation of the transmission output shaft 376 and, thus, the drive shaft 312.

In some embodiments, the system 300 can include a sport mode. If the operator of the system 300 selects the sport mode, the electronic control unit 320 starts the engine 350 in advance of the engine 350 being needed to provide power to the drive shaft 312 and maintains the engine 350 idling at a high speed so that the engine 350 is ready to be speed matched and engaged with a transmission gear-set. In some embodiments, the engine can be maintained at a fixed speed (e.g., 3000 rpm). After the target gear to be engaged reaches the desired rotation speed of the shaft (and that corresponds to the fixed engine speed), the synchronizer can then be shifted. Accordingly, the system 300 can be said to be in a "passive speed matching" mode, where the engine speed is not changed, but rather the controller monitors the components and executes a shift at the time when the speeds are matched. In sport mode, the electronic control unit 320 is configured to respond more quickly to acceleration requests. However, the system 300 will have reduced fuel efficiency and increased emissions.

In some embodiments, the electric motor 330 and the engine 350 can be disposed in the rear of the vehicle 310 such that the electric motor 330 and the engine 350 are operatively coupled to the rear axle (e.g., axle 316). Although the system 300 is shown as being rear wheel drive with the axle 316 being a rear axle, in some embodiments the axle 316 can be a front axle. In some embodiments, the system 300 can be all-wheel drive. For example, in some embodiments, both a front axle and a rear axle can be coupled to the drive shaft 312 such that both the front and rear axle are driven by the drive shaft 312. In some embodiments, the system 300 can have two wheels, three wheels, or any suitable number of wheels.

Although shown as separate components, in some embodiments the electronic control unit 320 can be part of the transmission 370. In some embodiments, the electronic control unit 320 can be part of the overall vehicle control module.

Figure 19:
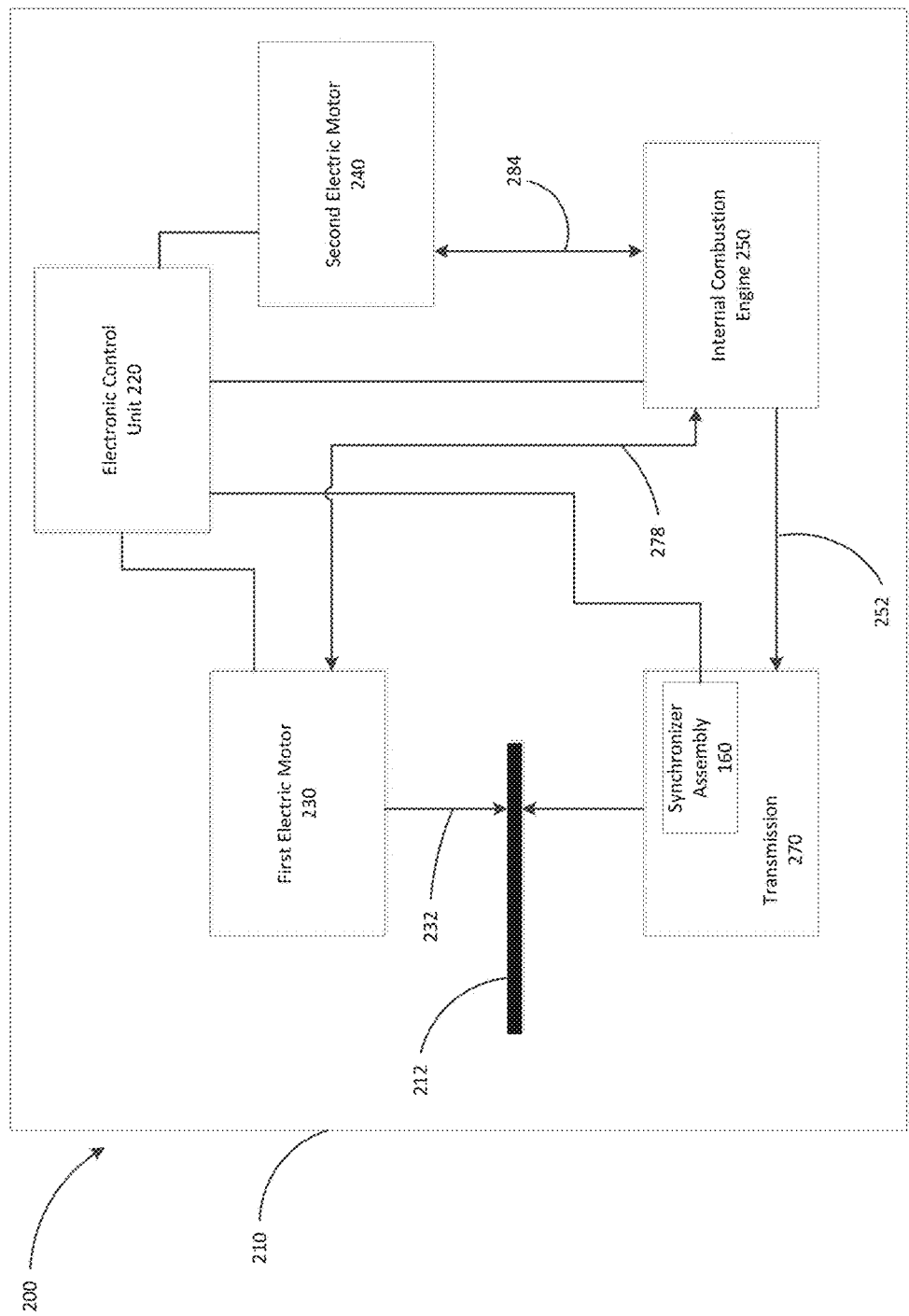
FIG. 19 is a schematic illustration of a powertrain system according to an embodiment.

FIG. 19 is a schematic illustration of a powertrain system 200 according to an embodiment with two electric motors. The system 200 is included within a vehicle 210, which can be any suitable vehicle. The vehicle 210 can be, for example, a four-wheeled vehicle including a chassis to which the system 200 and any other suitable components can be mounted. As shown, the vehicle 210 includes a drive shaft 212, which can be coupled via a differential (not shown) to an axle (not shown) to transmit power (or torque) to one or more wheels (not shown).

The powertrain system 200 contains an electronic control unit 220, a first electric motor 230, a second electric motor 240, an engine 250, and a transmission 270. The first electric motor 230, the second electric motor 240, and any of the electric motors described herein can be any suitable electric motor that produces power for and/or absorbs power from the wheels of the vehicle and/or the engine 250. For example, in some embodiments, the first electric motor 230 and/or the second electric motor 240 (and any of the electric motors described herein) can be a 120 kW electric motor. The first electric motor 230 is operatively coupled to the drive shaft 212, as shown schematically in FIG. 19 by the arrow 232. In some embodiments, the first electric motor 230 can include an input/output shaft that is coupled to the drive shaft 212 via mating gears, a belt drive, a concentric coupling, or the like. In some embodiments, the first electric motor 230 can include an input/output shaft that is indirectly coupled to the drive shaft 212 (i.e., the input/output shaft that is coupled to the drive shaft 212 via intervening structure). In some embodiments, the second electric motor 240 can include an input/output shaft that is coupled to the engine 250, as shown schematically by arrow 284.

The engine 250, and any of the engines described herein, can be any suitable engine that produces power for and/or absorbs power from the wheels of the vehicle and/or the motor 230. In some embodiments, the engine 250 can be an internal combustion engine, such as a gasoline engine, a diesel engine, a natural gas-powered engine or the like. The engine 250 is operatively coupled to the transmission 270, as shown schematically in FIG. 19 by the arrow 252. In some embodiments, the engine 250 can include an input/output shaft that is coupled to the transmission 270 via mating gears, a belt drive, a concentric coupling, or the like. Moreover, as shown schematically in FIG. 19 by the arrow 278, the engine 250 is operably coupled to the first motor 230 such that power can be transmitted between the first motor 230 and the engine 250, as discussed below. In this manner, for example, the engine 250 can supply power to the first motor 230 to charge a battery or capacitor (not shown), the first motor 230 can supply power to the engine 250 to start the engine 250, or the like. The engine 250 can be operably coupled to the first motor 230 by any suitable mechanism, such as, for example, a selective coupling (e.g., to allow the engine 250 to be disconnected from and/or to operate independently of the first motor 230). Similarly, as shown schematically in FIG. 19 by the arrow 284, the engine 250 is also operably coupled to the second motor 240 such that power can be transmitted between the second motor 240 and the engine 250, as discussed below. In this manner, for example, the engine 250 can supply power to the second motor 240 to charge a battery or capacitor (not shown), the second motor 240 can supply power to the engine 250 to start the engine 250, or the like. The engine 250 can be operably coupled to the second motor 240 by any suitable mechanism, such as, for example, a selective coupling (e.g., to allow the engine 250 to be disconnected from and/or to operate independently of the second motor 240).

The transmission 270 includes an input shaft (not shown), an output shaft (not shown), and an intermediate gear set (not shown). The input shaft and the output shaft are configured to be coupled by multiple sets of mating gears (not shown) and a synchronizer assembly 260. The transmission 270 can be shifted between the different sets of mating gears to modulate the engine power and speed applied to the drive shaft 212 (and vehicle wheels). The synchronizer assembly 260 includes any suitable number of synchronizers (not shown). Each synchronizer of the synchronizer assembly 260 can be any suitable mechanism that matches the speed of a free-spinning gear (of the mating gear-set) to the speed of the rotating shaft about which the free spinning gear is rotated. In this manner, the synchronizer facilitates shifting into (or the selection of) the gear during a gear shift operation of the transmission. In some embodiments, the synchronizer (or any of the synchronizers shown herein) can include a conical-shaped collar that is coupled to and axially movable along a transmission shaft. As the synchronizer is moved axially along the shaft into engagement with the target gear, the conical-shaped portion can gradually contact a mating conical opening of the target gear. In this manner, the friction between the synchronizer (which does not rotate relative to the shaft) and the target gear (which, until the synchronizer is fully engaged, rotates relative to the shaft) brings the shaft and the target gear to the same rotational speed. Said another way, the synchronizer "matches" the rotational speed of the shaft and the target gear to facilitate the selection of the target gear.

As shown schematically by the arrow 252, the engine 250 is operatively coupled to the transmission 270 such that engine power can be continuously transmitted from the engine 250 to the transmission 270 when the synchronizer assembly 260 is being shifted to engage and/or select one of the sets of mating gears. In other words, a transmission input gear is operably coupled to an engine shaft such that a rotation speed of the input shaft is dependent on a rotation speed of an engine shaft when a synchronizer is being shifted to engage and/or select one of the sets of mating gears. Similarly stated, the engine 250 is operatively coupled to the transmission 270 by a linkage that is devoid of a clutch (e.g., a friction clutch). By eliminating the clutch, the powertrain system 200 can operate with improved efficiency and higher performance than a system that includes a clutch. Selecting or "shifting" between gears within the clutchless transmission 270 is facilitated by the electronic control unit 220 that controls (or adjusts) any one of the engine speed, the speed of any of the shafts within the transmission 270, the speed of the first motor 230, and/or the speed of the second motor 240 to match a speed of the target gear to a speed of a corresponding (or mating) gear or shaft when the synchronizer assembly 260 is being shifted. As described below, in some embodiments, the electronic control unit 220 includes a speed matching module 224 that produces an engine control signal to adjust an engine speed to match a speed of a gear or shaft within the transmission 270 to a speed of a corresponding gear or shaft during shifting.

Depending on the positions of the synchronizers of the synchronizer assembly 260, the components of the powertrain system 200 can be operatively coupled in various configurations to improve efficiency and/or performance of the vehicle 200. For example, in some embodiments, the first electric motor 230 can be configured to rotate the drive shaft 212. Such a "motor only" configuration enables the clutchless transmission design by allowing the first electric motor 230 to move the vehicle 200 from a standstill. In contrast, movement of the vehicle 200 from a standstill would not be possible with the engine 250 coupled to the transmission 270 via a linkage devoid of a clutch because of the low engine torque produced at low (or zero) engine speed.

In other embodiments, the first electric motor 230 or the second electric motor 240 can be configured to crank (or start) the internal combustion engine 250. In some embodiments, the internal combustion engine 250 can be configured to drive the clutchless transmission 270 to rotate the drive shaft 212, as described above. Additionally, the internal combustion engine 250 can be configured to drive the clutchless transmission 270 to charge an energy storage device (e.g. a battery bank) associated with the first electric motor 230 or the second electric motor 240. In some configurations, the internal combustion engine 250 only charges the energy storage device (e.g. "park and charge" mode). In other configurations, the internal combustion engine 250 charges the energy storage device while simultaneously rotating the drive shaft 212 (e.g. "drive and charge" mode).

The electronic control unit 220 is configured to control the first electric motor 230, the second electric motor 240, the internal combustion engine 250, and the synchronizer assembly 260 to operate the system 200 as described herein. The electronic control unit 220 (or "controller") can control the speed matching of powertrain components, selection of gears in the transmission 270, shifting of synchronizers (e.g., within the synchronizer unit), and any other functions as described herein. In some embodiments, the electronic control unit 220 (and any of the controllers described herein) can include one or more modules to perform the functions described herein. The electronic control unit 220 can be coupled to a computer 228 or other processing device, such as a vehicle control module, a service computer, or the like. The electronic control unit 220 can also be coupled to the transmission 270, the engine 250, the first motor 230, and the second motor 240.

Similarly to the electronic control unit 120 described above, the electronic control unit 220 (or any of the controllers described herein) can include a memory, a processor, and an input/output module (or interface). The electronic control unit 220 can also include a feedback module, a synchronizer module, and a speed matching module. The electronic control unit 220 is coupled to the computer or other input/output device or other input/output device via the input/output module (or interface).

The processor can be any processor configured to, for example, write data into and read data from the memory, and execute the instructions and/or methods stored within the memory. Furthermore, the processor can be configured to control operation of the other modules within the controller (e.g., the synchronizer module, the feedback module, and the speed matching module). Specifically, the processor can receive a signal including user input, shaft speed data, vehicle speed or the like and determine a value for one or more control signals to control the powertrain based on the signal. In other embodiments, the processor can be, for example, an application-specific integrated circuit (ASIC) or a combination of ASICs, which are designed to perform one or more specific functions. In yet other embodiments, the processor can be an analog or digital circuit, or a combination of multiple circuits.

The memory device can be any suitable device such as, for example, a read only memory (ROM) component, a random access memory (RAM) component, electronically programmable read only memory (EPROM), erasable electronically programmable read only memory (EEPROM), registers, cache memory, and/or flash memory. Any of the modules (the synchronizer module, the feedback module, and the speed matching module) can be implemented by the processor and/or stored within the memory.

The speed matching module of the electronic control unit 220 includes circuitry, components and/or code to produce and/or deliver one or more control signals associated with one or more shafts and/or components in the powertrain system 200. The signals can be any signal of the types shown and described herein. In some embodiments, the speed matching module receives input from other portions of the system, and can therefore send the control signals to the appropriate subset of components.

In some embodiments, the speed matching module is configured to produce an engine control signal to adjust an engine speed such that a speed of an output shaft is matched to a speed of a corresponding input shaft during a gear shift operation. Such engine control signals can be delivered to an engine control module, and can include signals to adjust the throttle position, fueling, timing or any other aspect of the engine performance that will adjust the engine speed. In some embodiments, the speed matching module is configured to produce a motor control signal to adjust a speed of a motor shaft such that a speed of an output shaft gear is matched to a speed of a corresponding input shaft during a gear shift operation.

The electronic control unit 220 includes the synchronizer module. The synchronizer module includes circuitry, components and/or code to produce one or more control signals that can be delivered to the synchronizers to facilitate shifting, as described herein.

In some embodiments, to prevent acceleration lag, the first electric motor 230 is configured to transmit power (i.e. torque fill) between a motor shaft of the first electric motor 230 and the drive shaft 212 when a synchronizer is being shifted to engage and/or select one of the sets of mating gears and the second electric motor 240 is performing speed-matching. For example, when no synchronizer is in engagement with a set of mating gears and the second electric motor 240 is speed-matching the input transmission shaft to the output transmission shaft, the power from the engine 250 is not transmitted from the input transmission shaft to the output transmission shaft. As a result, the power from the engine is not transmitted to the drive shaft 212. During this shifting period, the first electric motor 230 can apply torque to the drive shaft 212 to prevent acceleration lag.

Figure 20:
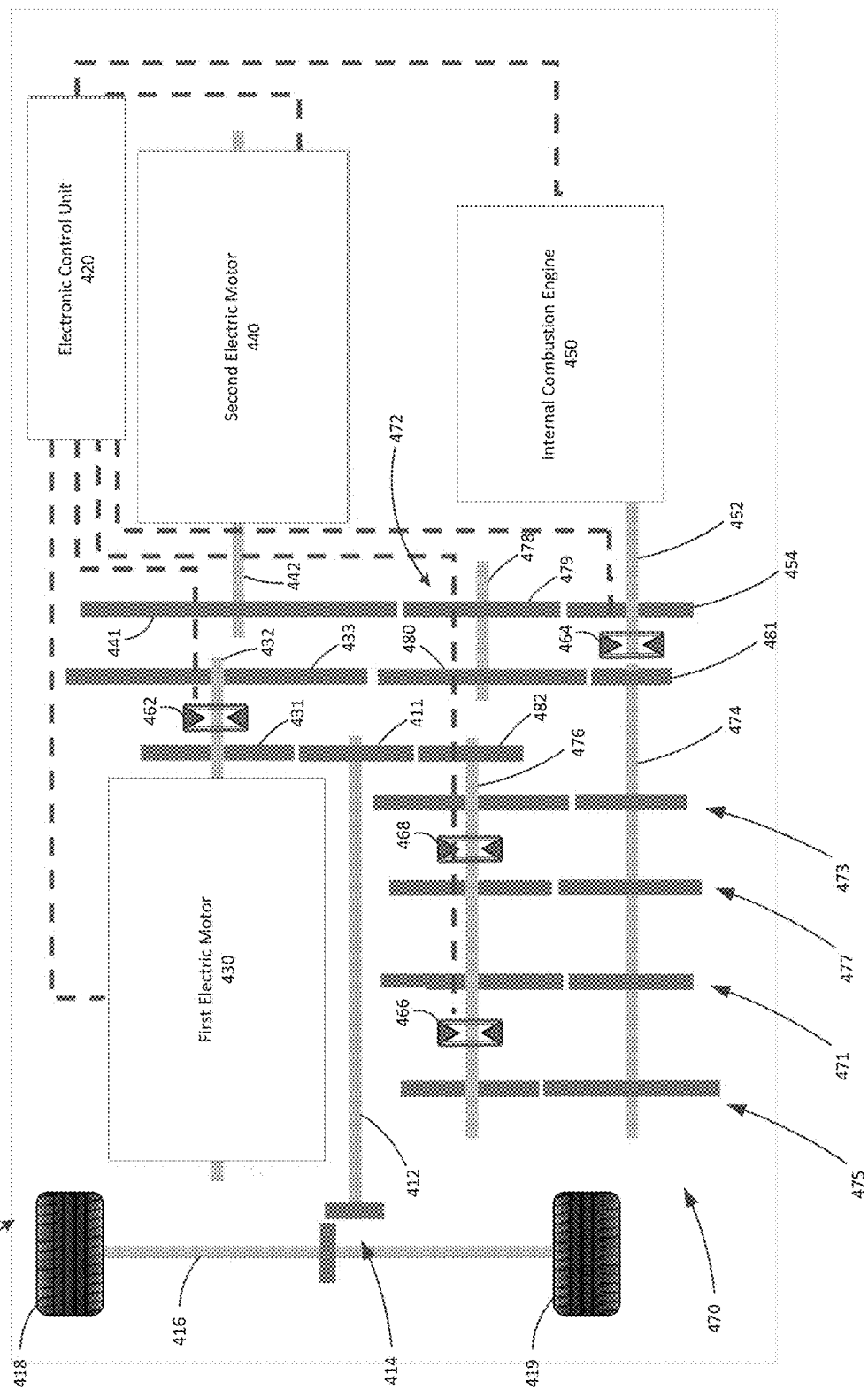
FIG. 20 is a schematic illustrating of a powertrain system according to an embodiment.

FIG. 20 is a schematic illustration of a powertrain system 400 according to an embodiment that has two electric motors. The system 400 is included within a vehicle 410. The vehicle 410 includes a drive shaft 412. The drive shaft 412 has a first end fixedly coupled to a drive shaft gear 411 and a second end configured to be coupled via a differential 414 to an axle 416. The axle 416 includes a first end coupled to a first wheel 418 and a second end coupled to a second wheel 419. The vehicle 410 can also include a chassis and any other suitable components. Although shown as driving two wheels (i.e., as part of a four-wheeled vehicle), in other embodiments, the vehicle 410 and any of the vehicles described herein can have any number of wheels and drive configurations. Moreover, although shown as including a drive shaft 412 that is substantially perpendicular to the axle 416, in other embodiments, the drive shaft 412 can have any relationship and/or connection to the wheels 418, 419 (e.g., a transverse mounted, front-wheel drive system, a rear-wheel drive system, an all-wheel drive system, or the like).

The powertrain system 400 contains an electronic control unit 420, a first electric motor 430, a second electric motor 440, an internal combustion engine 450, and a clutchless transmission 470. The first electric motor 430 is configured to rotate and/or receive rotation power from a first electric motor shaft 432 and/or a second electric motor shaft 442. The first electric motor 430, the second electric motor 440, and any of the electric motors described herein can be any suitable electric motors that produce power for and/or absorb power from the wheels of the vehicle 410 and/or the engine 450. For example, in some embodiments, the first electric motor 430 and/or the second electric motor 440 (and any of the electric motors described herein) can be a 120 kW electric motor.

As shown, the first electric motor 430 is operatively coupled to the drive shaft 412 by the electric motor shaft 432. Specifically, a first electric motor gear 431 and a second electric motor gear 433 are coupled to the first electric motor shaft 432. The first electric motor gear 431 is configured to be operatively coupled to, engaged with and/or meshed with the drive shaft gear 411. The second electric motor gear 433 is configured to be operatively coupled to, engaged with and/or meshed with a second intermediate gear 480. As described in more detail below, the first electric motor gear 431 and the second electric motor gear 433 can each be moved between a "free running" configuration about the electric motor shaft 432 and a fixed configuration, in which the gear does not rotate relative to the first electric motor shaft 432. The configuration of the first electric motor gear 431 and the second electric motor gear 433 is controlled by the synchronizer 462 of the synchronizer assembly, as discussed below. In this manner, the operational configuration (or "mode") of the system can be changed to allow various routes of power transfer between the first electric motor 430, the engine 450 and the wheels 418, 419. For example, when the first electric motor gear 431 is in the fixed configuration relative to the first electric motor shaft 432, the first electric motor 430 can be configured to rotate the drive shaft 412 via the first electric motor shaft 432, the electric motor gear 431, and the drive shaft gear 411. Conversely, when the first electric motor gear 431 is in the free running configuration about the first electric motor shaft 432, no power is transferred between the first electric motor 430 and the drive shaft 412, even though the first electric motor gear 431 remains operably coupled to and/or meshed with the drive shaft gear 431. Although the second electric motor gear 433 is shown as being larger than the first electric motor gear 431, the first electric motor gear 431 and the second electric motor gear 433 can each be any suitable size. FIG. 28 shows a representative torque curve for the first electric motor 430 and for the engine 450.

The internal combustion engine 450, and any of the engines described herein, can be any suitable engine that produces power for and/or absorbs power from the wheels 418, 419 and/or the motor 430. The engine 450 is configured to rotate and/or be rotated by an internal combustion engine shaft 452. An internal combustion engine gear 454 and a synchronizer 464 are each coupled to the internal combustion engine shaft 452. As shown, the internal combustion engine gear 454 is operably coupled to the second electric motor gear 433 via an intermediate gear-set 472. Specifically, the intermediate gear-set 472 includes a first intermediate gear 479 and a second intermediate gear 480 fixedly coupled to an intermediate shaft 478. As shown, the internal combustion engine gear 454 is operably coupled to, engaged with and/or meshed with the first intermediate gear 479, which is, in turn, operably coupled to, engaged with and/or meshed with the second electric motor gear 433. As described in more detail below, the internal combustion engine gear 454 can be moved between a "free running" configuration about the shaft 452 and a fixed configuration, in which the internal combustion engine gear 454 does not rotate relative to the shaft 452. The configuration of the internal combustion engine gear 454 (and the transmission input gear 481, described below) is controlled by the synchronizer 464 of the synchronizer assembly.

As shown, the second electric motor 440 is operatively coupled to internal combustion engine 450 by the second electric motor shaft 442. Specifically, a third electric motor gear 441 is coupled to the second electric motor shaft 442. The third electric motor gear 441 is configured to be operatively coupled to, engaged with and/or meshed with the first intermediate gear 479. The third electric motor gear 441 is in a fixed configuration about the second electric motor shaft 442, in which the gear does not rotate relative to the second electric motor shaft 442. As described above, the internal combustion engine gear 454 is operably coupled to, engaged with and/or meshed with the first intermediate gear 479, which is, in turn, operably coupled to, engaged with and/or meshed with the third electric motor gear 441. As described in more detail below, the internal combustion engine gear 454 can be moved between a "free running" configuration about the shaft 452 and a fixed configuration, in which the internal combustion engine gear 454 does not rotate relative to the shaft 452. The configuration of the internal combustion engine gear 454 (and the transmission input gear 481, described below) is controlled by the synchronizer 464 of the synchronizer assembly. FIG. 28 shows a representative torque curve for the second electric motor 440 and for the engine 450.

As a result, depending on the configuration of the synchronizer assembly (i.e., the synchronizer 464 and the synchronizer 462), the first electric motor 430 can be configured to crank (or transmit power to) the internal combustion engine 450 through rotation of the internal combustion engine shaft 452. Additionally, when the internal combustion engine gear 454 and the second electric motor gear 433 are each in the fixed configuration, the internal combustion engine 450 can be configured to charge an energy storage device (not shown) associated with the first electric motor 430 through the rotation of the first electric motor shaft 432. The energy storage device can include a battery bank. In some embodiments, the energy storage device can be a component of the first electric motor 430. In other embodiments, the energy storage device can be a separate component that is electrically coupled to the first electric motor 430.

Depending on the configuration of the synchronizer assembly (i.e., the synchronizer 464 and the synchronizer 462), the second electric motor 440 can be configured to crank (or transmit power to) the internal combustion engine 450 through rotation of the internal combustion engine shaft 452. Additionally, when the internal combustion engine gear 454 is in a fixed configuration and the second electric motor gear 433 is in a "free running" configuration, the internal combustion engine 450 can be configured to charge an energy storage device (not shown) associated with the second electric motor 440 through the rotation of the second electric motor shaft 442. The energy storage device can include a battery bank. In some embodiments, the energy storage device can be a component of the first electric motor 430. In other embodiments, the energy storage device can be a separate component that is electrically coupled to the first electric motor 430 and/or the second electric motor 440.

In some embodiments, the first electric motor 430 and/or the second electric motor 440 can be used to start the engine 450 when the vehicle 410 is in motion, similar to a push start or a bump start in a typical clutched manual transmission vehicle. For example, the powertrain system 400 can be configured such that the motion of the wheels 418, 419 and the drive shaft 412 causes the engine 450 to turn over (i.e., the crankshaft rotates and the pistons cycle). In some embodiments, the first electric motor 430 be used to start the engine 450 when the vehicle 410 accelerates from rest via a power path through the transmission 470. For example, the third synchronizer 466 or the fourth synchronizer 468 can be translated to shift the powertrain system 400 into first gear or second gear, respectively, and the second synchronizer 464 can be shifted along the internal combustion engine shaft 452 to the left and into locking engagement with the transmission input gear 481. The first synchronizer 462 can be engaged with the first electric motor gear 431. The first electric motor 430 can then be used to power the drive shaft 412 such that the vehicle 410 begins to move. As a result of the engagement between the drive shaft 412, the transmission 470, and the engine shaft 452, the internal combustion engine 450 can be turned over by the rotation of the internal combustion engine shaft 452. When the engine 450 is spinning at a sufficient speed to run, the electronic control unit 420 can initiate fuel injection and spark. In some embodiments, the engine 450 can include electronically controlled valves. In such embodiments, the valves can be in a first configuration when the engine 450 is "free wheeling" (e.g., when a crankshaft of the engine is rotating but the engine is not running) and in a second configuration when the engine is running. In some embodiments, during the "free wheeling" configuration, fuel is not injected into the engine 450 and/or a spark is not initiated such that the engine 450 is spinning but a combustion cycle does not occur.

In some embodiments, the first electric motor 430 can be used to rotate the drive shaft 412 to move the vehicle 310 and the engine 450 can be off. The engine 450 can be started while the vehicle 410 is moving forward by disengaging the first electric motor 430 from the wheels 418, 419 (i.e., shift the first synchronizer 462 out of engagement with the first electric motor gear 431) such that the vehicle 410 is coasting (i.e., the wheels 418, 419 continue to spin and cause the drive shaft 412 to rotate, but the drive shaft 412 is not under power from the first electric motor 430 or the engine 450). The first electric motor 430 and/or the second electric motor 440 can then be used to start the engine 450. For example, with the drive shaft 412 rotating as a result of being operatively coupled to the rotating wheels 418, 419 (and the transmission output shaft 476 rotating due to the engagement between the drive shaft gear 411 and the transmission output gear 482), the first synchronizer 462 can be shifted into engagement with the second electric motor gear 333 and the second synchronizer 464 can be shifted into engagement with the internal combustion engine gear 454 such that the electric motor 430 can rotate the engine shaft 452 via a power path including the electric motor shaft 432, the intermediate gear-set 472, the internal combustion engine gear 454, and the engine shaft 452. The rotation of the engine shaft 452 by the electric motor 430 can cause the engine 450 to be turned over. When the engine 450 is spinning at a sufficient speed to run, the electronic control unit 420 can intitiate fuel injection and spark. In some embodiments, the second electric motor 440 can be used as a starter motor to start the engine 450 while the first electric motor 430 powers the drive shaft.

The clutchless transmission 470 includes a transmission input shaft 474 and a transmission output shaft 476. A transmission input gear 481 is coupled to the transmission input shaft 474, and a transmission output gear 482 is fixedly coupled to the transmission output shaft 476. The transmission output gear 482 is operably coupled to, engaged with and/or meshed with the drive shaft gear 411. Because the drive shaft gear 411 is fixedly coupled to (i.e., cannot rotate relative to) the drive shaft 412 and the transmission output gear 482 is fixedly coupled to the transmission output shaft 476, rotation of the wheels 418, 419 and/or the drive shaft 412 produces rotation of the output shaft 476, and vice-versa.

The transmission input gear 481 can be moved between a "free running" configuration about the shaft 474 and a fixed configuration, in which the transmission input gear 481 does not rotate relative to the shaft 474. The configuration of the transmission input gear 481 is controlled by the synchronizer 464 of the synchronizer assembly. In this manner, as described below, the engine shaft 452 can be decoupled from the transmission 470 when the powertrain system 400 is in, for example, and "electric motor only" drive configuration, a "charging" configuration or the like. As described in more detail below, however, the engine power is continuously transmitted from the engine 450 and/or the engine shaft 452 to the transmission 470 (via the transmission input shaft 474) when the synchronizer assembly is actuated to shift between the mating gear-sets within the transmission 470. Said another way, the rotation speed of the input shaft 474 is dependent on a rotation speed of the engine shaft 452 when the synchronizer assembly is actuated to shift between the mating gear-sets within the transmission 470. Similarly stated, the engine 450 and/or the engine shaft 452 is operatively coupled to the transmission 470 and/or the transmission input shaft 474 by a linkage that is devoid of a clutch (e.g., a friction clutch or a torque converter). Similarly stated, the transmission 470 is a manual transmission that is coupled to the engine 450 via a linkage that is devoid of a clutch or a torque converter. Thus, the powertrain 400 is described as including a clutchless transmission 470.

The transmission input shaft 474 and the transmission output shaft 476 are operably coupled together by a number of gear-sets. The clutchless transmission 470 can include, for example, four gear-sets, as shown in FIG. 20. For example, the clutchless transmission 470 can include a first transmission gear-set 471 associated with first and fifth gear, a second transmission gear-set 473 associated with second and sixth gear, a third transmission gear-set 475 associated with third and seventh gear, and a fourth transmission gear-set 477 associated with fourth and eighth gear. Each gear-set includes an input gear fixedly coupled to the transmission input shaft 474 and an output gear rotatably coupled to the transmission output shaft 476. Alternatively, the system 400 and the clutchless transmission 470 can be configured to include any number of gear-sets arranged in any functional way to modulate power and/or speed when rotating the drive shaft 412.

The synchronizer assembly can include, for example, a first synchronizer 462, a second synchronizer 464, a third synchronizer 466, and a fourth synchronizer 468. As described above, the first synchronizer 462 is located on the electric motor shaft 132, and is capable of moving between engagement with the first electric motor gear 431 and engagement with the second electric motor gear 433. The second synchronizer 464 is located on the internal combustion engine shaft 452, and is capable of moving between engagement with the internal combustion engine gear 454 and the transmission input gear 481. The third synchronizer 466 is located on the transmission output shaft 476, and is capable of moving between the first transmission gear-set 471 and the third transmission gear-set 475. The fourth synchronizer 468 is located on the transmission output shaft 476, and is capable of moving between the second transmission gear-set 473 and the fourth transmission gear-set 477. Alternatively, the synchronizer assembly can be configured to include any number of synchronizers suitable to control any number of gear-sets arranged in the clutchless transmission 470.

The synchronizers are operably coupled to the electronic control unit 420 (and any associated actuators, not shown in FIG. 20) so that the electronic control unit 420 can selectively slide the synchronizers along their respective shafts to move a gear between the free running configuration and the fixed configuration. The synchronizers can be any suitable mechanism that matches the speed of a free-spinning gear to the speed of the rotating shaft about which the free spinning gear is rotated. In this manner, the synchronizer facilitates shifting into (or the selection of) the gear during a gear shift operation (e.g., within the transmission 470, the first electric motor shaft 432, the second electric motor shaft 442, and/or the engine shaft 452). In some embodiments, each synchronizer includes a conical-shaped collar that is coupled to and axially movable along the shaft. The synchronizer, however is coupled to the shaft such that the conical-shaped collar cannot rotate relative to the shaft (e.g., the synchronizer can be coupled to the shaft via a spline coupling). When a synchronizer is positioned on a shaft so that the synchronizer is not in coupled engagement with a target gear, the gear can rotate freely about the shaft (i.e., the gear is in a "free running" configuration). Thus, although the gear (and any gears meshed thereto) is rotating, no power is being transferred between the respective shafts. For example, when the first synchronizer 462 is positioned on the first electric motor shaft 432 so that it is not in coupled engagement with the first electric motor gear 431 or the second electric motor gear 433, the first electric motor shaft 432 can rotate, but does not rotate either the first electric motor gear 431 or the second electric motor gear 433. When a synchronizer is positioned on a shaft so that the synchronizer is in coupled engagement with a gear (i.e., placing the gear in a locked configuration), the previously freely rotating gear is rotationally fixed relative to the rotating shaft. For example, when the first synchronizer 462 is moved along the electric motor shaft 432 into coupled engagement with the first electric motor gear 431, the first electric motor gear 431 becomes rotationally fixed relative to the electric motor shaft 432. In this configuration, the electric motor shaft 432 is configured to rotate the electric motor gear 431, which rotates (or is rotated by) the drive shaft gear 411 and the drive shaft 412.

When the synchronizer is moved axially along the shaft into engagement with the target gear, the conical-shaped portion can gradually contact a mating conical opening of the target gear. In this manner, the friction between the synchronizer (which does not rotate relative to the shaft) and the target gear (which, until the synchronizer is fully engaged, rotates relative to the shaft) brings the shaft and the target gear to the same rotational speed. Said another way, the synchronizer "matches" the rotational speed of the shaft and the target gear to facilitate the selection of the target gear.

The electronic control unit 420 is configured to control the first electric motor 430, the second electric motor 440, the internal combustion engine 450, and the synchronizer assembly 460 to operate the system 400. The electronic control unit 420 is configured to use speed-matching so that changes in the gear configuration of the clutchless transmission 470 can be made without damaging the teeth of the gears. The electronic control unit 420 can be configured to have precise, closed-loop control over the speed of the internal combustion engine 450, the speed of the first electric motor 430, the speed of the second electric motor 440, and the position of the synchronizers of the synchronizer assembly. This configuration gives the electronic control unit control over the speed of all shafts and gears in the clutchless transmission 470. In some embodiments, the electronic control unit 420 (and any of the controllers described herein) can include one or more modules to perform the functions described herein. For example, in some embodiments, the electronic control unit 420 can be similar to the electronic control unit 120 described above.

As shown in FIG. 20, the transmission input shaft 474 can be connected to the internal combustion engine 450 at two different gear-ratios, reducing the number of gear-sets within the transmission 470. Depending on the position of the second synchronizer 464, the internal combustion engine 450 can either drive the transmission input shaft 474 directly or drive the transmission input shaft 474 via the intermediate gear-set (also referred to as a "speed-up" gear) 472. The intermediate gear-set 472 can include a first intermediate gear 479 and a second intermediate gear 480 fixedly coupled to an intermediate shaft 478. For example, if the second synchronizer 464 is shifted along the internal combustion engine shaft 442 to the left and into locking engagement with the transmission input gear 481, the internal combustion engine 450 is configured to directly rotate the transmission input shaft 474 and the transmission is configured to transition through gears one through four. In this second synchronizer 464 position, the intermediate gear-set 472 will be rotated by the transmission input gear 481, but it will be under no load because both the internal combustion engine gear 454 and the second electric motor gear 433 are freely rotatable around the internal combustion engine shaft 452 and the first electric motor shaft 432, respectively. Alternatively, if the second synchronizer 464 is shifted to the right and into locking engagement with internal combustion gear 454, the load from the internal combustion engine 450 will travel through the intermediate gear-set 472 and to the transmission input gear 481, and the transmission 470 is configured to transition through gears five through eight.

Selecting or "shifting" between gears within the clutchless powertrain system 400 is facilitated by the electronic control unit 420 that controls (or adjusts) any one of the engine speed, the speed of any of the shafts within the transmission 470 and/or the motor speed of the first electric motor 430 and the second electric motor 440 to match a speed of the target gear to a speed of a corresponding (or mating) gear or shaft when the synchronizer assembly is being shifted. In some embodiments, the electronic control unit 420 (or controller) can include a speed matching module that produces an engine control signal to adjust an engine speed to match a speed of a gear or shaft within the transmission 470 to a speed of a corresponding gear or shaft during shifting. Specifically, when it is necessary to mesh two gears moving at different angular speeds, the electronic control unit 420 can be configured to use the internal combustion engine 450, the first electric motor 430, or the second electric motor 440 to increase the speed of the slower spinning gear and/or shaft to match the speed of the faster spinning gear (or decrease the speed of the faster spinning gar and/or shaft to match the speed of the slower spinning gear). Once the two gears are spinning at the same speed, the electronic control unit 420 can produce a signal to shift an associated transmission synchronizer to mate the two gears. For example, when shifting between gear-sets within the transmission 470, the appropriate synchronizer (e.g., synchronizer 466) is shifted to match the speed of a free running gear (e.g., of gear-set 471) to the speed of the output shaft 476. Because the output shaft 476 is coupled the input shaft 474 by the gear-sets, and because the engine shaft 452 remains coupled to the input shaft 474 (either directly or via the intermediate gear-set 472), differences between the speed of the engine shaft 452 (i.e., the engine speed) and the transmission shafts are undesirable and limit the ability of the shifting to occur. In traditional manual transmissions, a clutch is used to temporarily disengage the engine shaft from the transmission shaft. In the powertrain system 400 described herein, the electronic control unit 420 can adjust or "match" the shaft speeds to facilitate the desired shifting while power is continuously being transmitted from the engine 450 to the transmission 470. This arrangement eliminates the need for a friction clutch and also eliminates the lag in acceleration that is traditionally associated with shifting gears because clutchless shifting allows torque and acceleration to be transmitted from the engine 450 to the transmission 470 (and, in turn, to the drive shaft 412) throughout the entire shifting process.

Additionally, the first electric motor 430 is configured to transmit power between the electric motor shaft 432 and the drive shaft 412 when a synchronizer is being shifted to engage and/or select one of the sets of mating gears (i.e. torque fill) to prevent acceleration lag. For example, when neither the third synchronizer 466 nor the fourth synchronizer 468 is in engagement with a set of mating gears, and the second electric motor 440 is performing speed-matching of the transmission input shaft 474 and the transmission output shaft 476, the power from the engine 450 is not transmitted from the transmission input shaft 474 to the transmission output shaft 476. As a result, the power from the engine 450 is not transmitted to the drive shaft 412.

During this shifting period, the first electric motor 430 can apply torque to the drive shaft 412 to prevent acceleration lag.

In some embodiments, the electronic control module 420 can include a feedback module (e.g., similar to the feedback module 122 described above) to receive input from sensors configured to monitor the torque and/or speed of the transmission input shaft 474 and the transmission output shaft 476. The electronic control module 420 and/or the feedback module can also be configured to monitor the torque of the first electric motor shaft 432, the second electric motor shaft 442, and the internal combustion engine shaft 452. The electronic control module 420 is configured to process the torque signals and other input, and produce and/or transmit signals to actuate the appropriate synchronizer combination in order to achieve a particular required function. For example, in some embodiments, the electronic control module 420 can include a speed matching module configured to produce an engine control signal based on the input received by the feedback module. The speed matching module can, for example, adjust an engine speed such that a speed of the engine shaft 452 and/or engine shaft gear 454 is matched to a speed of transmission input shaft 474 during a gear shift operation. Such engine control signals can be delivered to an engine control module, and can include signals to adjust the throttle position, fueling, timing or any other aspect of the engine performance that will adjust the engine speed. In other embodiments, the electronic control module 420 and/or the speed matching module are configured to produce a motor control signal to adjust a speed of a motor shaft such that a speed of the transmission output shaft gear 482 is matched to a speed of the transmission input shaft 474 during a gear shift operation.

For example, in order to begin moving the first wheel 418 and the second wheel 419 from a total stop, the first electric motor 430 will rotate the drive shaft 412 to rotate the axle 416. In some embodiments, the synchronizer assembly can be used to transmit power from the first electric motor 430 to crank (or start) the internal combustion engine 450. Alternatively, the synchronizer assembly can be used to transmit power from the second electric motor 440 to crank (or start) the internal combustion engine 450. In some embodiments, such as during a cold weather start, the synchronizer assembly can be used to transmit power from both the first electric motor 430 and the second electric motor 440 to crank (or start) the internal combustion engine 450. As the electronic control unit 420 speed-matches the internal combustion engine shaft 452 with the transmission input shaft 474 using the second electric motor 440, it will modulate the second synchronizer 464 to load the transmission input shaft 474 by friction until the torque in the transmission input shaft 474 and the internal combustion engine shaft 452 is matched. This modulation procedure is performed while one gear-set is preselected in the transmission output shaft 476. To disengage the gear-set, the electronic control unit 420 regulates fuel flow to the internal combustion engine 450 to unload the transmission input shaft 474 as the first electric motor 430 fills to provide torque to the drive shaft 412. Similar to the launching procedure, a modulated actuation of the synchronizer assembly 460 needs to be included in the software of the electronic control unit 420 to command disengagement once each shaft is unloaded.

Figure 21:
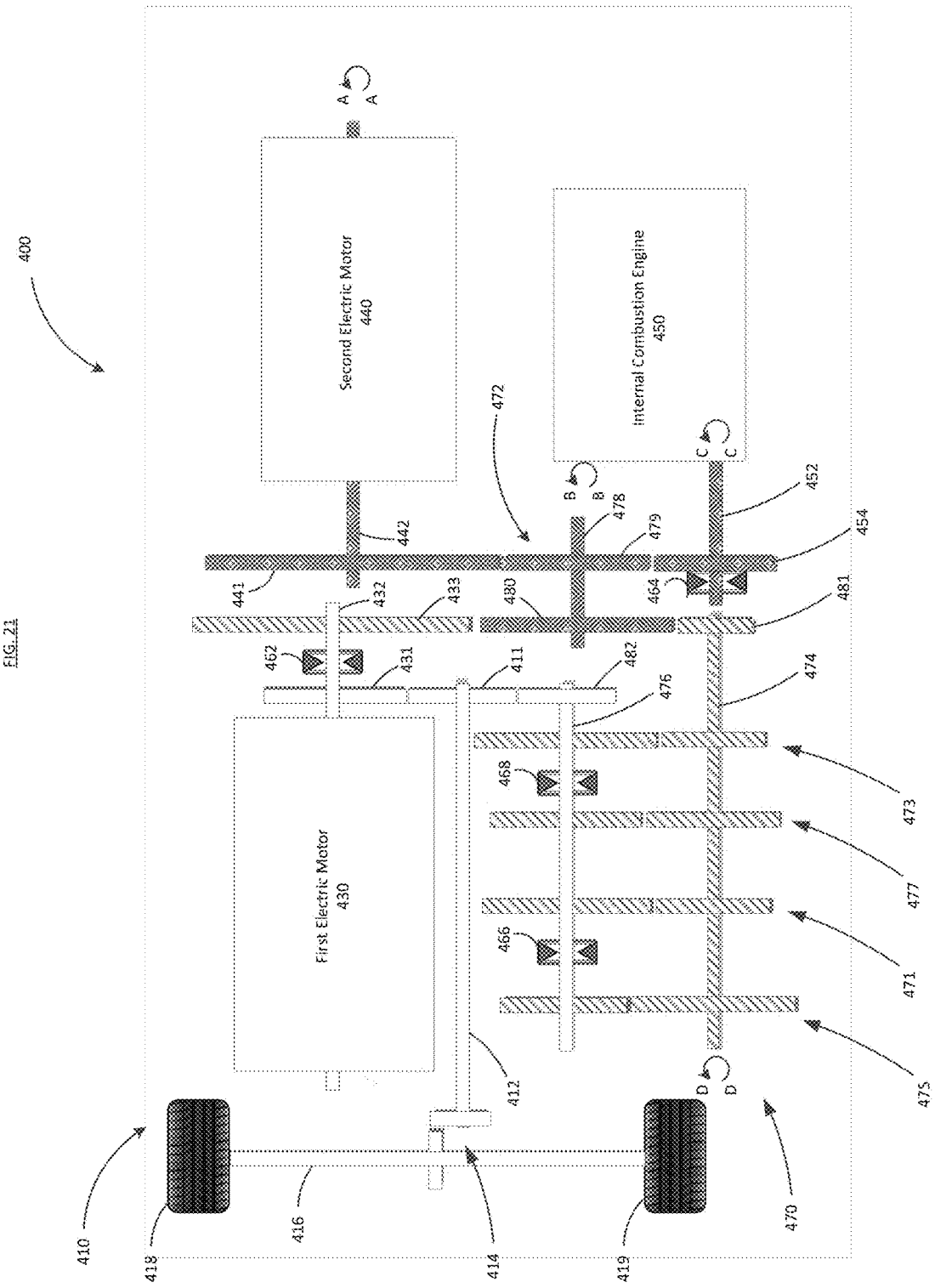
FIG. 21 is a schematic illustration of the powertrain system of FIG. 20 in an engine cranking configuration.

FIG. 21 is a partial view of system 400 with the electronic control unit 420 not shown. In FIGS. 21-27, components rotating under the control of the electric motor 430, the engine 450, and/or the wheels 418, 419, but that are not under load (i.e. not transferring power), are indicated by a hatched pattern. Alternatively, components rotating under the control of the electric motor 430, the engine 450, and/or the wheels 418, 419, but that are under load (i.e. transferring power), are indicated by a cross-hatched pattern. Components that are not rotating under the control of the electric motor 430, the engine 450, and/or the wheels 418, 419, or under any of the other components of the system 400, are shown with no pattern.

In the configuration of FIG. 21, the electronic control unit has 420 has shifted the second synchronizer 464 to the right along the internal combustion engine shaft 452 to lock the internal combustion engine shaft 452 into engagement with the internal combustion engine gear 454. Next, the electronic control unit 420 applies energy to the second electric motor 440 to actuate the second electric motor 430 and signal the second electric motor 430 to rotate the second electric motor shaft 442, as indicated by arrow AA. Due to the engagement between the third electric motor gear 441 and the first intermediate gear 479, the intermediate shaft 478 rotates, as indicated by arrow BB. Also, due to the engagement between the first intermediate gear 479 and the internal combustion engine gear 454, the internal combustion engine shaft 452 rotates, as indicated by arrow CC. As a result of this arrangement, as indicated by the cross-hatched pattern, the second electric motor 440 transmits power to the internal combustion engine 450 to start the internal combustion engine 450. Because the second synchronizer 464 is disengaged from the transmission input gear 481, no power is transmitted from the second electric motor 440 to the transmission input shaft 474. However, as a result of the engagement between the transmission input gear 481 and the second intermediate gear 480, the transmission input gear 481 and associated gear-sets rotate under no load, as indicated by arrow DD and the hatched pattern. Because the synchronizers 466 and 468 are disengaged from the gears on the transmission output shaft 476, no power or rotation is transmitted from the transmission input shaft 474 to the transmission output shaft 476. This is indicated by the lack of pattern of the transmission output shaft 476. The second electric motor gear 433 is also free running on the first electric motor shaft 432, as indicated by the hatched pattern, as a result of the engagement between the second electric motor gear 433 and the second intermediate gear 480.

Figure 22:
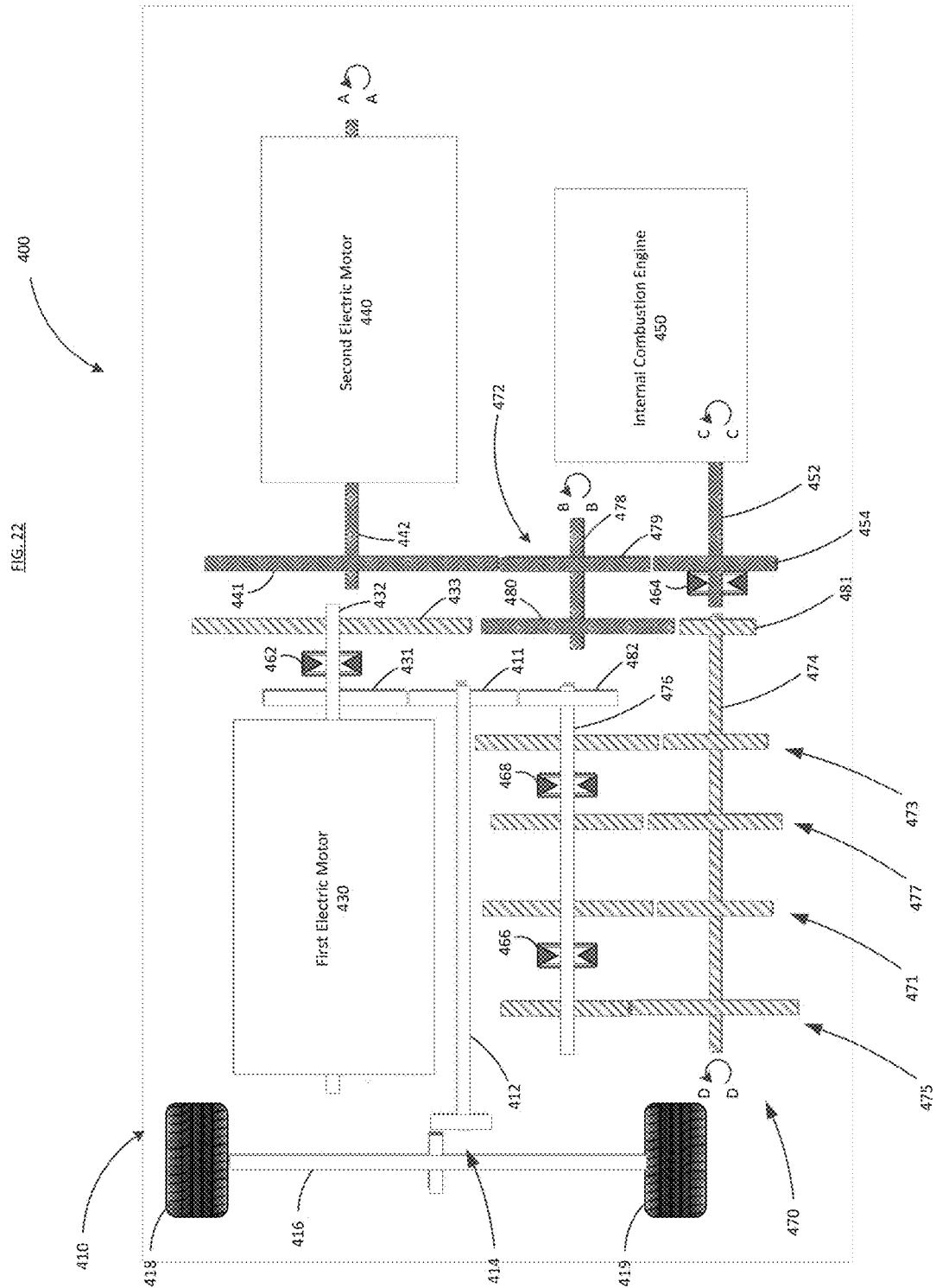
FIG. 22 is a schematic illustration of the powertrain system of FIG. 20 in a transitioning configuration.

In the configuration of FIG. 22, the electronic control unit 420 has removed the power from the second electric motor 440 and the internal combustion engine 450 is running.

Figure 23:
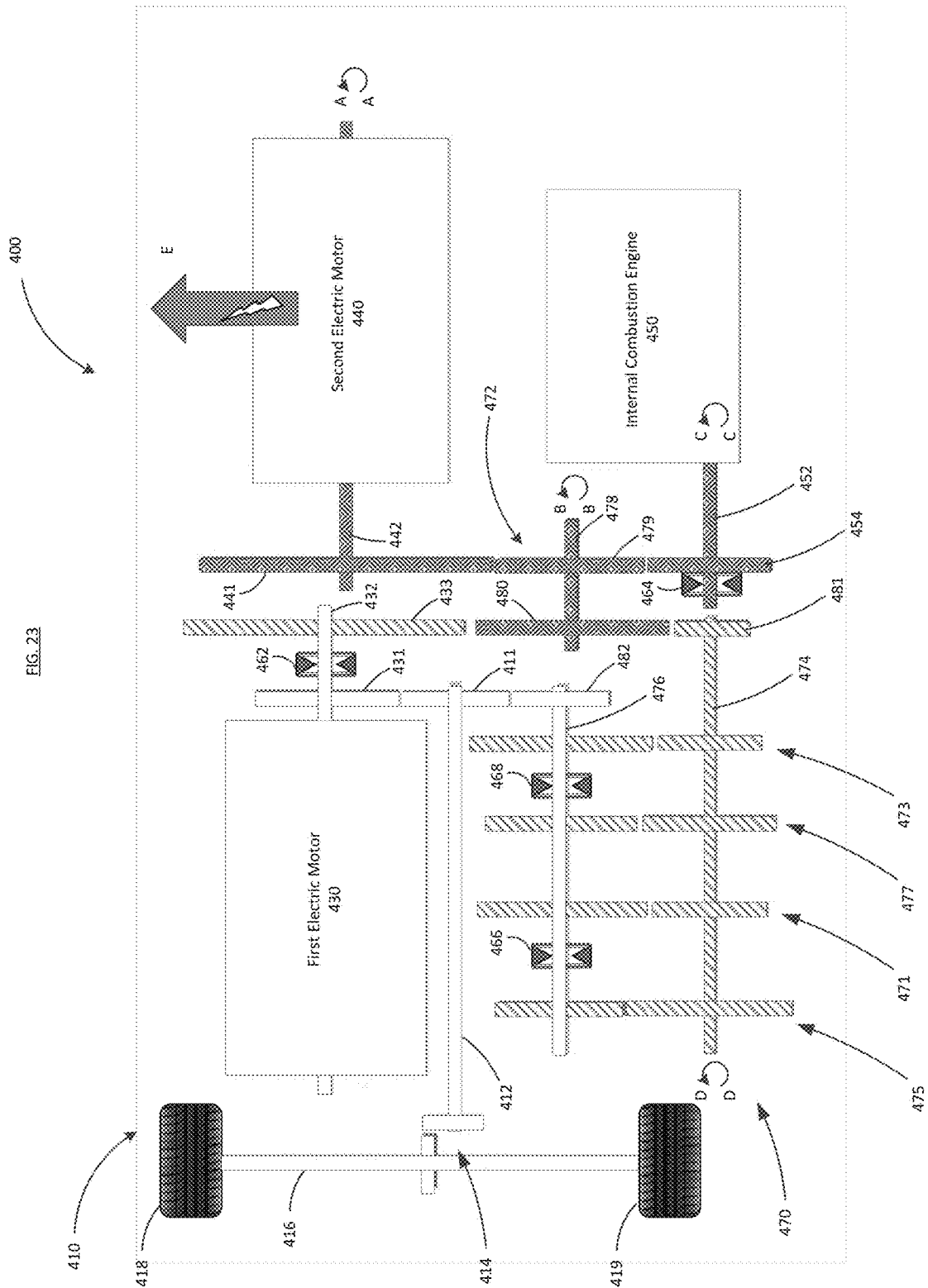
FIG. 23 is a schematic illustration of the powertrain system of FIG. 20 in a charging configuration.

In order to charge an energy storage device while the vehicle 410 is stationary, the system 400 can be configured in a "park and charge" mode. As shown in the configuration of FIG. 23, after using the second electric motor 440 to start the internal combustion engine 450, the electronic control unit 420 can regulate the speed of the internal combustion engine 450 to charge an energy storage device (e.g. a battery bank) associated with the second electric motor 440, as indicated by arrow E.

Figure 24:
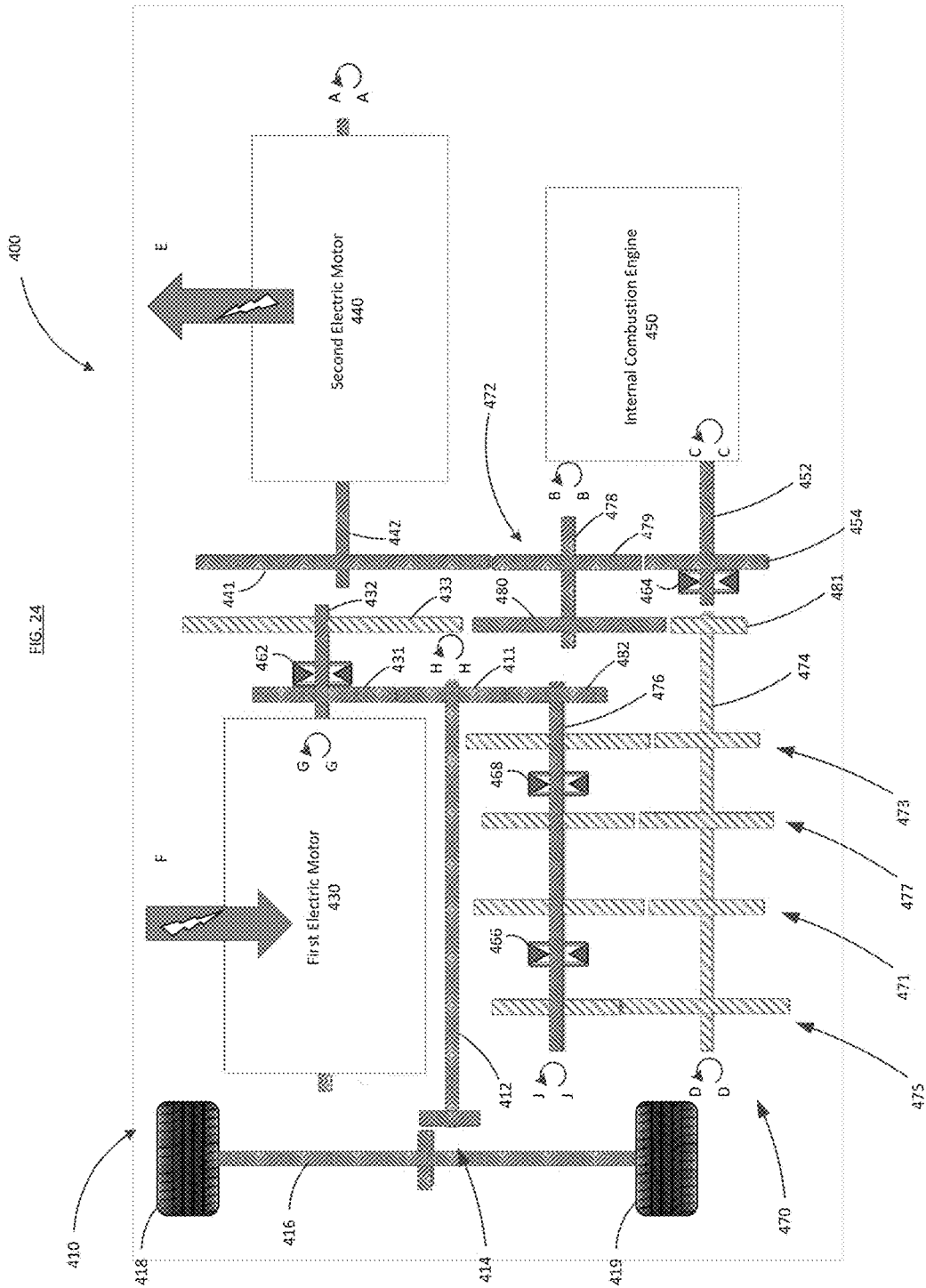
FIG. 24 is a schematic illustration of the powertrain system of FIG. 20 in a "drive and charge" configuration.

In order to charge an energy storage device while the vehicle 410 is moving, the system 400 can be configured in a "charge and drive" mode. As shown in the configuration of FIG. 24, once the system 400 is configured in a "park and charge" mode, such as in FIG. 23, the electronic control unit 420 can shift the first synchronizer 462 to the left along the first electric motor shaft 432 to lock the first electric motor shaft 432 into engagement with the first electric motor gear 431. Next, the electronic control unit 420 can apply power to the first electric motor 430, as indicated by arrow F, to actuate the first electric motor 430 to rotate the first electric motor shaft 432, as indicated by arrow GG. A speed matching module of the electronic control unit 420 can produce a speed control signal to adjust at least one of a speed of the engine shaft 452 or a speed of the second electric motor shaft 442 when the second synchronizer 464 is being shifted to engage the engine gear 454. Upon matching the speeds of the engine shaft 452 or the second electric motor shaft 442 with the engine gear 354, as indicated by the cross-hatched pattern, the first electric motor gear 431 and the drive shaft gear 411 rotate under the control of and/or are powered by the electric motor shaft 432, causing the drive shaft 412 to be rotated, as indicated by arrow HH. The rotation of the drive shaft 412 causes the differential 414 to rotate the axle 416. Due to the engagement between the drive shaft gear 411 and the transmission output gear 482, the transmission output gear 482 and the transmission output shaft 476 also rotate under control of the electric motor shaft 432, as indicated by arrow JJ. Because the synchronizers 466 and 468 are disengaged from the gears on the transmission output shaft 476, no power is transmitted from the transmission output shaft 476 to the transmission input shaft 474. This is indicated by the hatched pattern of the gear-sets and the transmission input shaft 474. In this manner, when in the "charge and drive" mode, the frictional losses within the transmission are minimized and the system 400 can charge the energy storage device while moving. The vehicle 410 can be moved in a forward or reverse direction depending on the rotational direction of the first electric motor shaft 432. Alternatively, the internal combustion engine 450 does not need to be running for the system 400 to perform low speed maneuvering powered by only the first electric motor 430.

Figure 25:
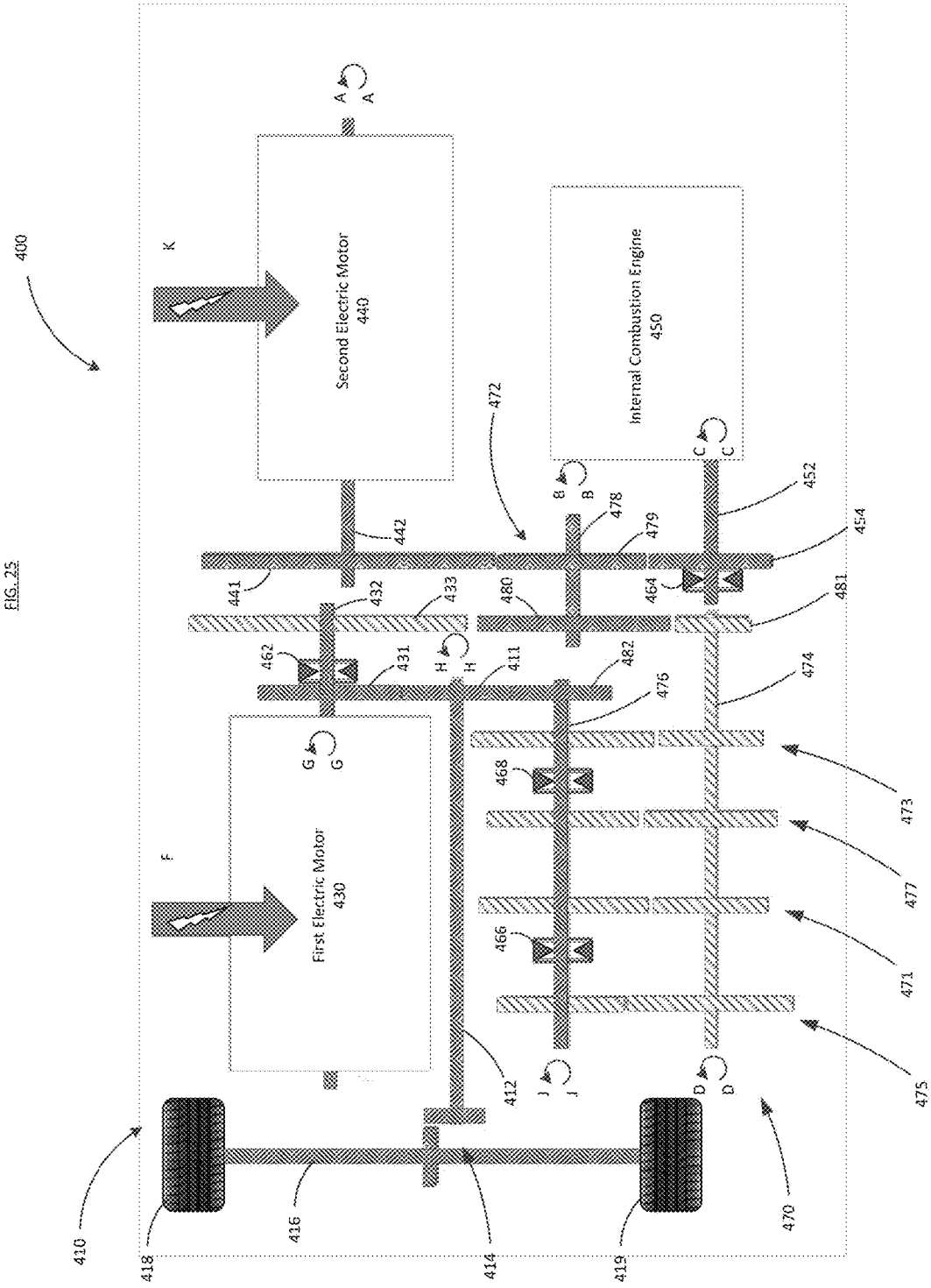
FIG. 25 is a schematic illustration of the powertrain system of FIG. 20 in a transitioning configuration.
Figure 26:
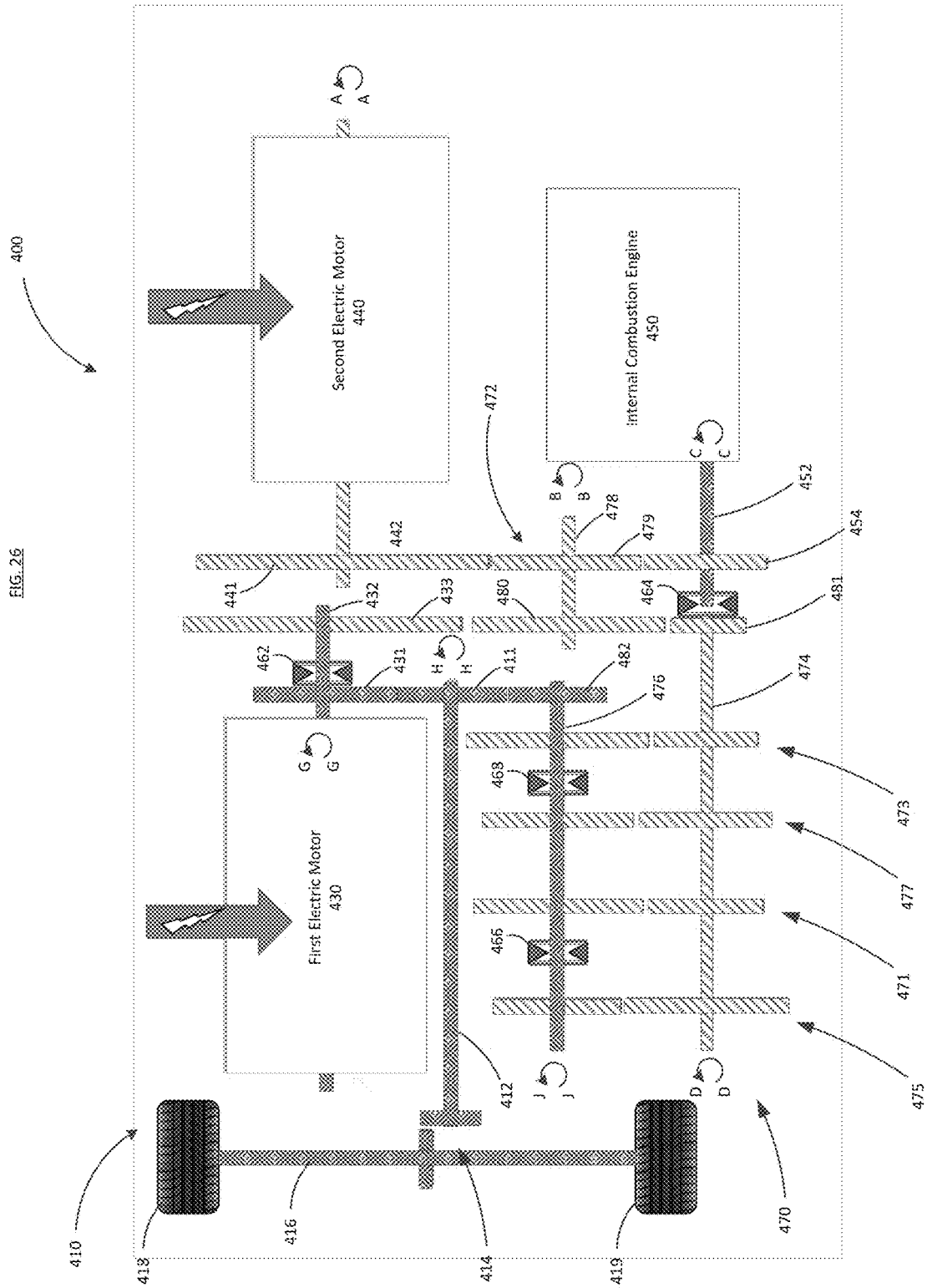
FIG. 26 is a schematic illustration of the powertrain system of FIG. 20 in a transitioning configuration.
Figure 27:
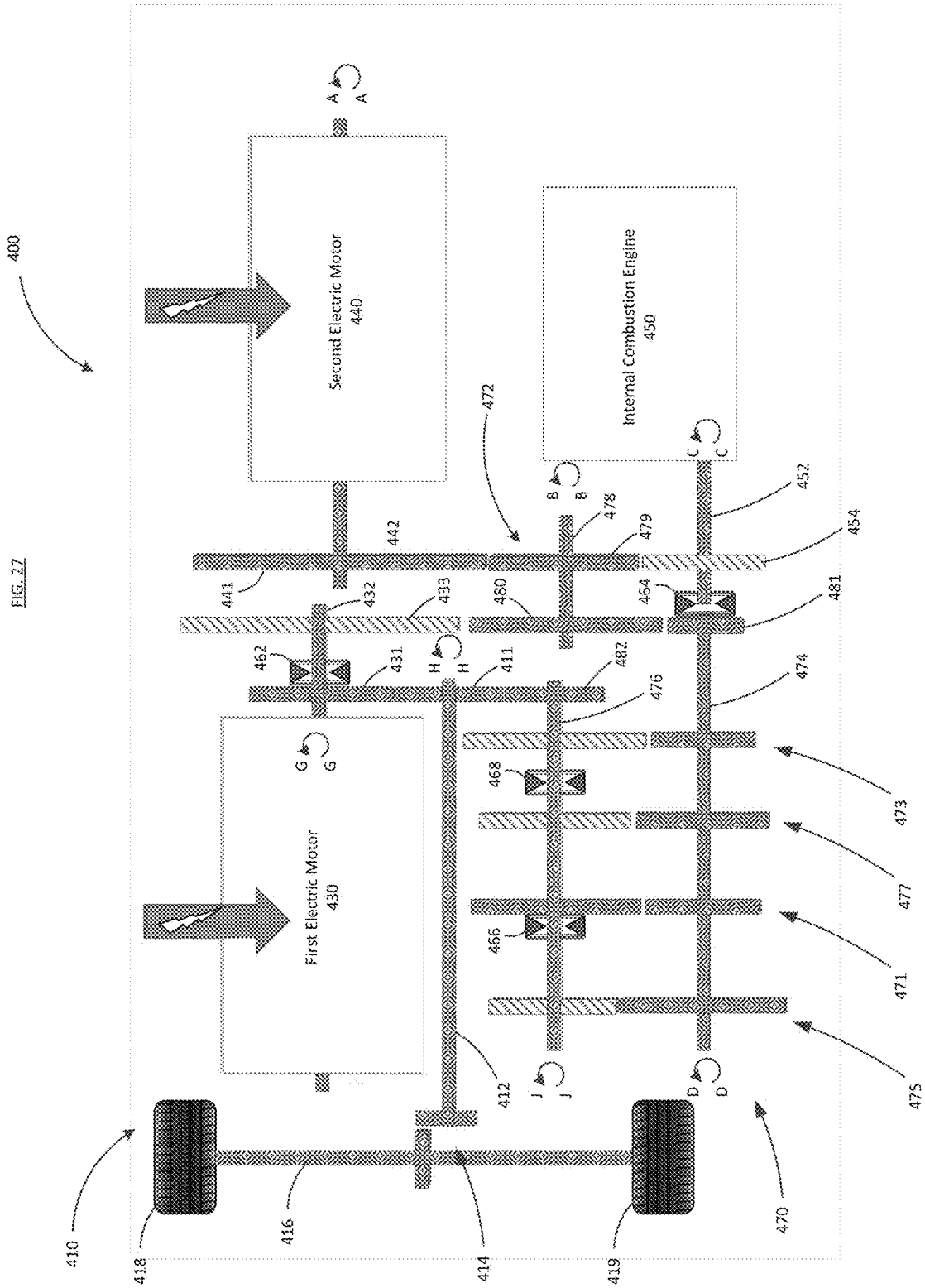
FIG. 27 is a schematic illustration of the powertrain system of FIG. 20 in an "all drive" configuration.

If an accelerator (now shown) of the vehicle 410 is depressed by the driver, requesting a speed higher than the optimum speed range of the first electric motor 430, the electric control unit 420 can apply power to the second electric motor 440, as shown by arrow K in FIG. 25, to remove torque from the second synchronizer 464. Next, the electronic control unit 420 disengages the second synchronizer 464 from the internal combustion engine gear 454, causing the internal combustion engine gear 454 to "free run" and the internal combustion engine shaft 452 to transmit no power to the internal combustion engine gear 454, as indicated by the hatched pattern in FIG. 26. Then, as shown in FIG. 26, the electric control unit 420 can shift the second synchronizer 464 to the left along the internal combustion engine shaft 452 toward locking engagement with the internal combustion engine shaft 452 and the transmission input gear 481. As shown in FIG. 27, once the second electric motor 440 has speed-matched the transmission input gear 481 to the internal combustion engine shaft 452, the second synchronizer 464 can shift into locking engagement with the internal combustion engine shaft 452 and the transmission input gear 481. The engagement between the second synchronizer 464 and the transmission input gear 481 causes the transmission input shaft 474 to rotate under the control of the internal combustion engine shaft 452. As indicated by the cross-hatched pattern, the internal combustion engine 450 transmits power to the transmission input shaft 474. The rotation of the transmission input shaft 474 causes the associated gear-sets 371, 373, 375, and 377 to rotate. FIG. 27 shows a configuration where the system 400 has been moved into a configuration corresponding with first gear.

To shift into first gear (i.e. transmit power through the first gear-set 471), the electronic control unit 420 performs speed matching between the first transmission gear-set 471 and the transmission output shaft 476. In other words, the electronic control unit 420 increases the speed (i.e., the RPMs) of the second electric motor 440 to increase the speed of the first transmission gear-set 471 (via the intermediate gear-set 472, the transmission input gear 481, and the transmission input shaft 474) until the speed of the first transmission gear-set 471 matches the speed of the transmission output shaft 476, which is under the control of the first electric motor 430. Once the first gear-set 471 and the transmission output shaft 476 are rotating at the same speed, the electronic control unit 420 shifts the third synchronizer 466 to the right along the transmission output shaft 476 to couple the output gear of the first transmission gear-set 471 in locking engagement with the transmission output shaft 476. As indicated by the cross-hatched shading shown in FIG. 27, upon coupling the first transmission gear-set 471 and the transmission output shaft 476 in locking engagement, the engine 450 transmits power through the first transmission gear-set 471, the transmission output shaft 476, and the transmission output gear 482, causing the drive shaft gear 411 to be rotated partially under the control of the engine 450, as shown by the cross-hatched pattern. The rotation of gear 411 rotates the drive shaft 412 and contributes to movement of the vehicle 410. Because the third synchronizer 466 is disengaged from the third gear-set 475 and the fourth synchronizer 468 is disengaged from the second gear-set 473 and the fourth gear-set 477, no power is transmitted from the transmission output shaft 476 to the transmission input shaft 474 via the second gear-set 473, the third gear-set 475, or the fourth gear-set 477, as indicated by the hatched pattern. This corresponds to an "all motor drive" configuration where the first electric motor 430, the second electric motor 440, and the engine 450 are all providing power to the drive shaft 412. This configuration corresponds with first gear. The system 400 can continue to accelerate by increasing fuel flow to the internal combustion engine 450 and/or by increasing the speeds of the first electric motor 430 or the second electric motor 440.

If the driver depresses the accelerator of the vehicle 410 to request a speed higher than the optimum speed range of the first transmission gear-set 471, the electronic control unit 420 is configured to use the synchronizer assembly and intermediate gear set 472 to transition between the gear-sets and the second electric motor 440 to perform speed matching of the transmission output shaft 476 and the transmission input shaft 474 similarly to system 300, as described with reference to FIGS. 7-17. Similarly as described with reference to system 300, the first electric motor 430 is configured to transmit power between the first electric motor shaft 432 and the drive shaft 412 when a synchronizer is being shifted to engage and/or select one of the sets of mating gears (i.e. torque fill) to prevent acceleration lag. For example, when neither the third synchronizer 466 nor the fourth synchronizer 468 is in engagement with a set of mating gears, the power from the engine 450 is not transmitted from the transmission input shaft 474 to the transmission output shaft 476. As a result, the power from the engine 450 is not transmitted to the drive shaft 412. During this shifting period, the electric motor 430 can apply torque to the drive shaft 412 to prevent acceleration lag. After the third synchronizer 466 or the fourth synchronizer 468 on the transmission output shaft 476 engages with a set of mating gears and power is transmitted from the engine 450 to the drive shaft 412, the electric motor 430 can continue to transmit additional power to the drive shaft 412. Alternatively, the electric motor 430 can disengage from the drive shaft 412 until the next gear shifting period.

In some embodiments, the first electric motor 430, the second electric motor 440, and the engine 450 can be disposed in the rear of the vehicle 410 such that the first electric motor 430, the second electric motor 440, and the engine 450 are operatively coupled to the rear axle (e.g., axle 416). Although the system 400 is shown as being rear wheel drive with the axle 416 being a rear axle, in some embodiments the axle 416 can be a front axle. In some embodiments, the system 400 can be all-wheel drive. For example, in some embodiments, both a front axle and a rear axle can be coupled to the drive shaft 412 such that both the front and rear axle are driven by the drive shaft 412. In some embodiments, the first electric motor 430 and the engine 450 can be disposed in the rear of the vehicle 410 such that the first electric motor 430 and the engine 450 can drive the rear axle and the second electric motor 440 can be disposed in the front of the vehicle 410 such that the second electric motor 440 can drive the front axle. In some embodiments, the system 400 can have two wheels, three wheels, or any suitable number of wheels.

Although certain specific modes for the system 400 and/or the system 200 have been described, in other embodiments, the systems described herein can facilitate any number of different operational modes for a vehicle. For example, in some embodiments, the system 400 can be configured to operate in a "turbo boost" mode to enhance the performance of the vehicle, for those vehicles that include a turbocharged engine. In the turbo boost mode, when the vehicle is being moved by the first electric motor 430, the engine 450 can be operably disconnected from the vehicle drive shaft 412 (e.g., during the vehicle acceleration from a full stop), but can be operably coupled to the second electric motor 440. Further, the controller (i.e., the electronic control unit 420) can send a signal to place the engine 450 under load, which is absorbed by the second electric motor 440 (i.e., to charge the battery of the vehicle). By placing the engine under load, the exhaust gas produced will contain sufficient energy to accelerate (or "spool up") a turbine of a turbocharger of the turbocharged engine. Thus, when the system is transitioned into an "engine drive" configuration, the engine turbocharger is already producing work to compress inlet air, and thus there is no "turbo lag" during vehicle acceleration. In some embodiments, rather than using the engine 450 to rotate the second electric motor shaft 442 to charge an energy storage device (e.g. a battery bank) associated with the second electric motor 440 while pre-spooling the turbocharger, the excess energy produced by the engine 450 when placed under load by the controller can be released from the system 400 as heat, can be used to spin up a flywheel, can be transmitted into a fluid, or can be used in any other suitable way.

Additionally, in some embodiments, the controller can accelerate the engine during an "electric motor only" configuration not only to accelerate a turbocharger, but also to produce a signature engine sound. In this manner, the driver will have the audible sensation of traditional engine acceleration while the vehicle is being accelerated by an electric motor. In some embodiments, the feature of producing a signature engine sound can be associated with a particular mode of the vehicle (e.g, a performance mode or a sport mode). Said another way, a driver can select a mode in which the vehicle will produce an engine sound while an electric motor accelerates the vehicle for the benefit of driver experience at the expense of vehicle fuel efficiency. For example, in some embodiments, a controller (e.g., any of the electronic control units described herein) can cause an engine to run in an idle state for the purpose of producing the sound associated with the engine, even if no load is being placed on the engine (i.e., the engine is not being used for power generation) and/or the vehicle is being accelerated solely or partially by an electric motor. In some embodiments, one or more sounds produced by the engine in this configuration can be similar to the sounds produced by a typical clutched manual transmission when a driver fully depresses the clutch pedal and then depresses the gas pedal. In some embodiments, a controller (e.g., any of the electronic control units described herein) can cause an engine speed to increase (i.e., rev) and decrease following a pattern of a typical vehicle acceleration with typical gear shifts. For example, the controller can cause the engine to run in an idle state, producing a first engine sound. The controller can then cause the engine speed to increase as the vehicle accelerates, producing a second engine sound, and then to quickly decrease during periods of gear shifting, producing a third engine sound, even if the engine is not under load (i.e. the engine is not being used for power generation) and the vehicle is being accelerated solely or partially by an electric motor. In some embodiments, the controller can cause the engine speed to briefly slow down such that an engine sound associated with gear shifting is produced at predetermined vehicle speeds (e.g., according to a predetermined pattern or at predetermined sensed vehicle speeds, such as determined by a rotational speed sensor on the drive shaft) even if a gear shift is not necessary. For example, the controller can cause the engine speed to briefly decrease when the vehicle reaches and/or accelerates through 30 miles per hour, even if the transmission and the electric motor are configured to accelerate the vehicle from 0 miles per hour to 60 miles per hour without shifting gears.

If a load is placed on an engine, the engine will produce a sound more similar to the sound of an engine accelerating a vehicle than if the engine is not under load. In some embodiments, a controller (e.g., any of the electronic control units described herein) and/or the layout of a vehicle system associated with an engine can cause the engine to be placed under load while the vehicle is at rest and/or while an electric motor accelerates the vehicle. For example, the engine can be used to charge a second electric motor while a first electric motor is used to accelerate the vehicle (e.g., similar to the "charge and drive" configuration of system 400 shown in FIG. 24). In some embodiments, while the system is in the charge and drive configuration, the controller can cause the engine speed to increase (i.e., rev) and decrease following a pattern of a typical vehicle acceleration. For example, the controller can cause the engine to run in an idle state, producing a first engine sound. The controller can then cause the engine speed to increase as the vehicle accelerates, producing a second engine sound, and then to quickly decrease during periods of gear shifting, producing a third engine sound, while the engine is under load (e.g., due to charging the second electric motor) but not accelerating the vehicle, and the vehicle is being accelerated solely or partially by an electric motor. Additionally, the production of engine sounds using an engine that is not being used for vehicle acceleration can be performed by a system including a clutchless transmission, a clutched transmission, an automatic transmission, and/or any other suitable system.

In some embodiments, the electronic control unit 120, or any of the electronic control units described herein, can be configured to control the electric motor 130, or any of the electric motors described herein, to briefly output an increased amount of power after the powertrain system, such as the powertrain system 100, shifts into a higher gear. As a result, a vehicle including the powertrain system, such as the vehicle 110, can experience a "lurch" or quick acceleration similar to the feeling of increased power after shifting gears in some manual transmission vehicles, automated manual transmission vehicles, and double clutch transmission vehicles. As a result, drive experience may be improved. In some embodiments, a "lurch" can be produced automatically and/or mechanically when a new gear set is engaged. For example, a synchronizer can include dog teeth configured to engage a target gear when the speed of the target gear and the speed of a shaft associated with the synchronizer are similar but do not match. For example, a speed sensor or a blocker ring with a higher tolerance for speed differences can be used to achieve this engagement. As a result, at the moment that the dog teeth and the target gear engage, the driver of the vehicle may experience a short duration "lurch" sensation.

In some embodiments, the electronic control unit 120, or any of the electronic control units described herein, can have approximately 1.5 seconds to start the engine 150, or any of the engines described herein, and speed match the gears before the electric motor 130, or any of the electric motors described herein, starts to reach the upper end of its optimal power band based on the torque graph for a 120 kW electric motor. In some embodiments, the electronic control unit 120, or any of the electronic control units described herein, can start the engine 150, or any of the engines described herein, and speed match the gears in approximately 0.5 seconds, less than 0.5 seconds, and/or between 0.5 and 1.5 seconds. In some embodiments, the electronic control unit 120, or any of the electronic control units described herein, can be configured to start the engine 150, or any of the engines described herein, and speed match the gears as quickly as possible. Such embodiments would have a slower lag in the sound produced by the engine when the engine is placed under load to accelerate the vehicle compared to a vehicle in which an electric motor takes more time to speed match the gears. Said another way, compared to a typical engine-only vehicle, the driver experience will be more similar with respect to engine sounds the more quickly that the electronic control unit can start the engine and speed match the gears. In some embodiments, the engine 150 can be bump started, similar as described above with respect to engines 350 and 450, such that the duration of time between starting the engine and speed matching the gears is decreased. In some embodiments, the electronic control unit 120, or any of the electronic control units described herein, can be configured to start the engine 150, or any of the engines described herein, and speed match the gears at a slower pace such that an electric motor is responsible for more of the vehicle acceleration and/or speed matching and the operation of the vehicle is more fuel efficient.

In some embodiments, the electric motor 330, or any of the electric motors described herein, can be overdriven (i.e., caused to produce power beyond the rated current specification) for short periods of time. For example, if the system 300 is shifting between two gears and the electric motor 330 is being used for torque filling, the electric motor 330 can be run at a high power production level for a short period of time (e.g. a tenth of a second) without damaging the electric motor 330 because the electric motor 330 can be allowed to cool between shifting operations. Thus, the electric motor 330 can be used to maintain and/or accelerate a transmission output gear (e.g., the transmission output gear 382) and/or a drive shaft (i.e., the drive shaft 312) at a particular speed or particular acceleration rate, respectively, without damaging the electric motor 330.

Although the systems described herein are described as controlling the positions of synchronizers based on speed sensors associated with an electronic control unit, such as, for example, the electronic control unit 120 or the electronic control unit 320, in some embodiments, rather than being shifted based on sensors, the synchronizers included with a system, such as any of the systems described herein, can operate automatically as a result of the mechanical structure of the synchronizers. Said another way, a synchronizer used in any of the systems described herein can be mechanically structured to automatically shift along a shaft and engage a target gear when the shaft and the target gear reach a sufficiently similar or substantially identical rotational speed. For example, a synchronizer can be disposed on a transmission shaft near a target gear. An actuator and the synchronizer can be configured and disposed such that the actuator applies a constant force on the synchronizer along the shaft in the direction of the target gear. The synchronizer can include a blocker ring (or any other suitable element that mechanically prevents engagement until the shaft and target gear speeds are matched) and/or one or more conical-shaped collars (or any other suitable frictional element associated with the synchronizer), each of which is coupled to and axially movable along the shaft. As the synchronizer is pushed by the actuator axially along the shaft toward engagement with the target gear, the blocker ring can prevent engagement between the synchronizer and the target gear until the shaft and the target gear have reached a sufficiently similar or substantially identical rotational speed. Said another way, the blocker ring prevents teeth associated with the synchronizer from grinding with teeth associated with the target gear. To reach a sufficiently similar or substantially identical rotational speed, the conical-shaped collar can gradually contact a mating conical opening of the target gear. In this manner, the friction between the synchronizer (which does not rotate relative to the shaft) and the target gear (which, until the synchronizer is fully engaged, rotates relative to the shaft) brings the shaft and the target gear to the same rotational speed. Said another way, the synchronizer "matches" the rotational speed of the shaft and the target gear to facilitate the selection of the target gear. When the rotational speeds are sufficiently similar or substantially identical, the blocker ring can allow for engagement between the synchronizer and the target gear such that the synchronizer is automatically pushed into engagement with the target gear. Although described as including both a blocker ring and one or more conical-shaped collars, in some embodiments the synchronizer can include only a blocker ring or one or more conical-shaped collars. For example, in an implementation with only a blocker ring, the speed matching can be entirely performed by an electric motor such that the blocker ring moves to allow for engagement between dog teeth of the synchronizer and the target gear when the speeds match. In an implementation with only one ore more conical-shaped collars, the conical-shaped collars can be used for frictional speed matching such that engagement occurs when sensors confirm that the target gear and the shaft speeds match. In some embodiments, neither a blocker ring nor a conical-shaped collar can be included. Sensors can be used to determine when the speeds are matched such that actuators can be controlled to shift the synchronizers into engagement with a target gear. In some embodiments, a synchronizer including a blocker ring can be used in combination with an electronic speed sensor such that when the electronic speed sensor determines that the speed of a shaft and a target gear match, the synchronizer can be shifted into engagement with the target gear and the blocker ring can automatically move out of a blocking configuration.

In some embodiments, the synchronizer can disengage from the target gear automatically. For example, an actuator can apply a constant force along the shaft away from the target gear. When the torque or "load" across the synchronizer is sufficiently reduced and/or has a magnitude of zero, the synchronizer can be disengaged from the selected gear automatically due to the constant force from the actuator having a larger magnitude than the force that pulls the synchronizer towards an engagement position when there is torque across the dog teeth. In this manner, the dog teeth (or other suitable engaging structures between the synchronizer and the engaged gear) can be "unloaded" to allow disengagement. In some embodiments, the torque can be sufficiently reduced or reduced to zero by increasing the torque on the output side of the synchronizer, such as with an electric motor (e.g. electric motor 230). In some embodiments, the torque can be sufficiently reduced or reduced to zero by reducing power to an engine or motor, such as, for example, engine 250 or electric motor 230. For example, a driver could release the throttle such that the engine 250 begins to act as a break through, for example, friction, rather than provide power to the vehicle 210. As a result, the torque on the synchronizer could switch from positive to negative, reducing the force exerted by the dog teeth to maintain the synchronizer in engagement with the target gear. Thus, the actuator can automatically shift the synchronizer out of engagement with the target gear.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools.

Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, any of the electric motors described herein can be electrically coupled to any of other electric motors or engines described herein in a "limp home" mode in the event of a partial system failure.

Any of the systems described herein can have any suitable electric power supply that can be "charged" in accordance with any of the methods described herein. Such power supplies can include any suitable batteries, capacitors or the like.

Where schematics and/or embodiments described above indicate certain components arranged in certain orientations or positions, the arrangement of components may be modified. Similarly, where methods and/or events described above indicate certain events and/or procedures occurring in certain order, the ordering of certain events and/or procedures may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

The invention claimed is:

1. An apparatus, comprising:
a drive shaft including a drive gear, the drive shaft configured to transmit power to a wheel of a vehicle;
a transmission including an input shaft, an output shaft and an intermediate gear, the input shaft including a transmission input gear and a plurality of input shaft gears, the output shaft including a transmission output gear and a plurality of output shaft gears, the input shaft and the output shaft being aligned such that the input shaft gears mesh with the output shaft gears, the output shaft including a first shifting element to selectively engage an output shaft gear from the plurality of output shaft gears to adjust a ratio between an input shaft speed and an output shaft speed, the transmission output gear operably coupled to the drive gear such that power is transmitted between the transmission output gear and the drive gear when the output shaft gear is engaged, the transmission input gear operably coupled to an engine shaft such that a rotation speed of the input shaft is dependent on a rotation speed of the engine shaft when the first shifting element is being shifted; and
a motor shaft configured to be coupled to a motor, the motor shaft having a first motor gear and a second motor gear, the first motor gear operably coupled to the drive gear, the second motor gear operably coupled to the intermediate gear, the motor shaft including a second shifting element to selectively engage the first motor gear and the second motor gear, the first motor gear configured to transmit power between the motor shaft and the drive shaft when the second shifting element engages the first motor gear, the intermediate gear configured to transmit power between the motor shaft and the engine shaft when the second shifting element engages the second motor gear;

wherein:

the first shifting element is a first synchronizer; and the second shifting element is a second synchronizer.

2. The apparatus of claim 1, wherein the first motor gear is configured to transmit power between the motor shaft and the drive shaft when the first shifting element is being shifted.

3. The apparatus of claim 1, wherein the transmission input gear is operably coupled to the engine shaft by a linkage devoid of a friction clutch.

4. The apparatus of claim 1, wherein:

the transmission is a manual transmission; and the transmission input gear is operably coupled to the engine shaft by a linkage devoid of any one of a friction clutch or a torque converter.

5. The apparatus of claim 1, wherein the transmission input gear is operably coupled to the engine shaft by a linkage devoid of a clutch, the apparatus further comprising:

a controller including a speed matching module including circuitry to produce an engine control signal to adjust a speed of the engine shaft such that a speed of the output shaft gear is matched to a speed of a corresponding input shaft gear from the plurality of input shaft gears when the first shifting element is being shifted.

6. The apparatus of claim 1, wherein the transmission input gear is operably coupled to the engine shaft by a linkage devoid of a clutch, the apparatus further comprising:

a controller including a speed matching module including circuitry to produce a motor control signal to adjust a speed of the motor shaft such that a speed of the output shaft gear is matched to a speed of a corresponding input shaft gear from the plurality of input shaft gears when the first shifting element is being shifted.

7. The apparatus of claim 1, wherein the transmission input gear is operably coupled to the engine shaft by a linkage devoid of a clutch, the engine shaft including a third shifting element to selectively disengage the transmission input gear to interrupt power transmission between the engine output shaft and the input shaft of the transmission, the apparatus further comprising:

a controller including a synchronizer module including first circuitry to produce a synchronizer control signal associated with a motor drive configuration, the third shifting element disengaged from the transmission input gear and the first motor gear transmitting power from the motor shaft to the drive shaft when in the motor drive configuration, wherein the third shifting element is a third synchronizer.

8. The apparatus of claim 7, wherein the controller includes a feedback module including second circuitry to receive a vehicle speed signal associated with a wheel speed, wherein the synchronizer module produces the synchronizer control signal when the wheel speed is zero.

9. The apparatus of claim 1, further comprising:

the engine shaft including an engine gear and a third shifting element, the engine gear operably coupled to the intermediate gear, the third shifting element to selectively engage the engine gear and the transmission input gear, the engine gear configured to transmit power between the engine shaft and the motor shaft via the intermediate gear when the third shifting element engages the engine gear and when the second shifting element engages the second motor gear, the engine shaft configured to transmit power to the input shaft of the transmission when the third shifting element engages the transmission input gear, wherein the third shifting element is a third synchronizer.

10. The apparatus of claim 9, further comprising:

a controller including a speed matching module including circuitry to produce a speed control signal to adjust at least one of a speed of the engine shaft or a speed of the motor shaft when the third shifting element is being shifted to engage the engine gear.

11. The apparatus of claim 1, wherein the motor is a first motor, the motor shaft is a first motor shaft, the intermediate gear is a first intermediate gear of an intermediate gear set, the apparatus further comprising:

a second motor shaft configured to be coupled to a second motor, the second motor shaft having a third motor gear operably coupled to a second intermediate gear of the intermediate gear set.

12. An apparatus, comprising:

a drive shaft including a drive gear, the drive shaft configured to transmit power to a wheel of a vehicle;

a transmission including an input shaft, an output shaft and an intermediate gear, the input shaft including a transmission input gear and a plurality of input shaft gears, the output shaft including a transmission output gear and a plurality of output shaft gears, the input shaft and the output shaft being aligned such that the input shaft gears mesh with the output shaft gears, the output shaft including a first shifting element to selectively engage an output shaft gear from the plurality of output shaft gears to adjust a ratio between an input shaft speed and an output shaft speed, the transmission output gear operably coupled to the drive gear such that power is transmitted between the transmission output gear and the drive gear when the output shaft gear is engaged, the transmission input gear operably coupled to an engine shaft by a linkage devoid of a friction clutch; and a motor shaft configured to be coupled to a motor, the motor shaft having a first motor gear and a second motor gear, the first motor gear operably coupled to the drive gear, the second motor gear operably coupled to the intermediate gear, the motor shaft including a second shifting element to selectively engage the first motor gear and the second motor gear, the first motor gear configured to transmit power between the motor shaft and the drive shaft when the second shifting element engages the first motor gear, the intermediate gear configured to transmit power between the motor shaft and the engine shaft when the second shifting element engages the second motor gear, wherein:

the first shifting element is a first synchronizer; and the second shifting element is a second synchronizer.

13. The apparatus of claim 12, wherein the first motor gear is configured to transmit power between the motor shaft and the drive shaft when the first shifting element is being shifted.

14. An apparatus, comprising:

a drive shaft including a drive gear, the drive shaft configured to transmit power to a wheel of a vehicle;

a transmission including an input shaft, an output shaft and an intermediate gear set, the input shaft including a transmission input gear and a plurality of input shaft gears, the output shaft including a transmission output gear and a plurality of output shaft gears, the input shaft and the output shaft being aligned such that the input shaft gears mesh with the output shaft gears, the output shaft including a first shifting element to selectively engage an output shaft gear from the plurality of output shaft gears to adjust a ratio between an input shaft speed and an output shaft speed, the transmission output gear operably coupled to the drive gear such that power is transmitted between the transmission output gear and the drive gear when the output shaft gear is engaged, the transmission input gear operably coupled to an engine shaft;

a first motor shaft configured to be coupled to a first motor, the first motor shaft having a first motor gear and a second motor gear, the first motor gear operably coupled to the drive gear, the second motor gear operably coupled to a first intermediate gear of the intermediate gear set, the first motor shaft including a second shifting element to selectively engage the first motor gear and the second motor gear, the first motor gear configured to transmit power between the first motor shaft and the drive shaft when the second shifting element engages the first motor gear, the intermediate gear set configured to transmit power between the first motor shaft and the engine shaft when the second shifting element engages the second motor gear; and a second motor shaft configured to be coupled to a second motor, the second motor shaft having a third motor gear operably coupled to a second intermediate gear of the intermediate gear set, the intermediate gear set configured to transmit power between the second motor shaft and at least one of the engine shaft or the first motor shaft, wherein:
the first shifting element is a first synchronizer; and
the second shifting element is a second synchronizer.

15. The apparatus of claim 14, wherein the transmission input gear is operably coupled to the engine shaft by a linkage devoid of a clutch such that power is continuously transmitted between the engine shaft and the input shaft when the first shifting element is being shifted to engage the output shaft gear.

16. The apparatus of claim 14, wherein:
the transmission is a manual transmission; and
the transmission input gear is operably coupled to the engine shaft by a linkage devoid of any one of a clutch or a torque converter.

17. The apparatus of claim 14, wherein the transmission input gear is operably coupled to the engine shaft by a linkage devoid of a clutch, the apparatus further comprising:
a controller including a speed matching module including circuitry to produce an engine control signal to adjust a speed of the engine shaft such that a speed of the output shaft gear is matched to a speed of a corresponding input shaft gear from the plurality of input shaft gears when the first shifting element is being shifted.

18. The apparatus of claim 14, wherein the transmission input gear is operably coupled to the engine shaft by a linkage devoid of a clutch, the apparatus further comprising:
a controller including a speed matching module including circuitry to produce a motor control signal to adjust a speed of the motor shaft such that a speed of the output shaft gear is matched to a speed of a corresponding input shaft gear from the plurality of input shaft gears when the first shifting element is being shifted.

19. The apparatus of 14, further comprising:
the engine shaft including an engine gear and a third shifting element, the engine gear operably coupled to the second intermediate gear of the intermediate gear set, the third shifting element to selectively engage the engine gear and the transmission input gear, the engine gear configured to transmit power between the engine shaft and the second motor shaft via the second intermediate gear when the third shifting element engages the engine gear, the engine shaft configured to transmit power to the input shaft of the transmission when the third shifting element engages the transmission input gear, wherein the third shifting element is a third synchronizer.

20. The apparatus of claim 19, further comprising:
a controller including a speed matching module including circuitry to produce a speed control signal to adjust a speed of at least one of the engine shaft or the second motor shaft when the third shifting element is being shifted to engage the engine gear.

21. An apparatus, comprising:
a controller configured to be operably coupled to a motor, an engine, and a transmission, the transmission including an input shaft, an output shaft, and an intermediate gear, the input shaft including a transmission input gear and a plurality of input shaft gears, the output shaft including a transmission output gear and a plurality of output shaft gears, the input shaft and the output shaft being aligned such that the input shaft gears mesh with the output shaft gears, the output shaft including a first shifting element to selectively engage an output shaft gear from the plurality of output shaft gears to adjust a ratio between an input shaft speed and an output shaft speed, the transmission output gear operably coupled to a drive shaft to transmit power therebetween when the first shifting element is engaged with the output shaft gear, the motor including a motor shaft having a first motor gear and a second motor gear, the first motor gear operably coupled to the drive shaft, the second motor gear operably coupled to the intermediate gear, the motor shaft including a second shifting element to selectively engage the first motor gear and the second motor gear, the first motor gear configured to transmit power between the motor shaft and the drive shaft when the second shifting element engages the first motor gear, the intermediate gear configured to transmit power between the motor shaft and the engine shaft when the second shifting element engages the second motor gear, the controller implemented in at least one of a memory or a processor, the controller including a speed matching module including circuitry to produce a control signal to adjust at least one of a speed of the engine shaft or a speed of the motor shaft when the first shifting element is being shifted, wherein:
the first shifting element is a first synchronizer; and
the second shifting element is a second synchronizer.

22. The apparatus of claim 21, wherein the circuitry of the speed matching module produces the control signal to adjust the speed of the engine shaft such that a speed of the output shaft gear is matched to a speed of a corresponding input shaft gear from the plurality of input shaft gears when the first shifting element is being shifted.

23. The apparatus of claim 21, wherein:
the engine shaft includes an engine gear and a third shifting element, the engine gear operably coupled to the intermediate gear, the third shifting element to selectively engage the engine gear and the transmission input gear, the engine gear configured to transmit power between the engine shaft and the motor shaft via the intermediate gear when the third shifting element engages the engine gear and when the second shifting element engages the second motor gear;

the control signal is a first control signal, and the circuitry of the speed matching module produces a second control signal to adjust at least one of the speed of the engine shaft or the speed of the motor shaft such that the speed of the motor shaft is matched to the speed of the engine shaft when the third shifting element is being shifted to engage the engine gear, wherein the third shifting element is a third synchronizer.

24. The apparatus of claim 21, wherein the controller includes a synchronizer module including second circuitry to transmit a first shifting element control signal and a second shifting element control signal to the transmission, the first shifting element control signal associated with shifting of the first shifting element to engage the output shaft gear, the second shifting element control signal associated with shifting of the second shifting element to engage one of the first motor gear or the second motor gear.

25. The apparatus of claim 21, wherein, when the second shifting element engages the first motor gear and the engine is not operatively coupled to the output shaft of the transmission, the controller is configured to cause the engine to produce an engine sound.

26. The apparatus of claim 25, wherein the engine sound is a first engine sound, and, when the second shifting element engages the first motor gear and the engine is not operatively coupled to the output shaft of the transmission, the controller is configured to increase the load on the engine such that the engine produces a second engine sound when the controller runs the motor at a predetermined speed.

27. The apparatus of claim 25, wherein the controller is configured to increase the load on the engine by causing the engine to charge an energy storage device.

28. The apparatus of claim 25, wherein the controller is configured to increase the load on the engine, causing the engine to spool a turbocharger.

29. A method, comprising:

shifting a motor synchronizer to engage a motor gear coupled to a motor shaft such that the motor gear transmits power between the motor shaft and a drive shaft, the drive shaft configured to transmit power to a wheel of a vehicle, the shifting the motor synchronizer performed when an engine synchronizer is disengaged from a transmission input gear to interrupt engine power transmission between an engine output shaft and an input shaft of a transmission, the input shaft including a plurality of input shaft gears meshed with a plurality of output shaft gears;

shifting the engine synchronizer to engage the transmission input gear to transmit engine power from the engine output shaft to the input shaft of the transmission;

adjusting a speed of the engine shaft to match a speed of an output shaft gear from the plurality of output shaft gears to a speed of a corresponding input shaft gear from the plurality of input shaft gears, the adjusting performed while engine power is continuously transmitted from the engine shaft to the input shaft; and shifting, after the adjusting and while engine power is continuously transmitted from the engine shaft to the input shaft, a transmission synchronizer to engage the output shaft gear such that engine power is transferred via the output shaft gear and the output shaft to the drive shaft.

30. The method of claim 29, wherein the shifting the motor synchronizer is performed when the wheel is stationary.

31. The method of claim 29, wherein the transmission input gear is operably coupled to the engine shaft by a linkage devoid of a clutch.

32. The apparatus of claim 29, wherein:

the transmission is a manual transmission; and the transmission input gear is operably coupled to the engine shaft by a linkage devoid of any one of a clutch or a torque converter.

33. A non-transitory processor readable medium storing code representing instructions to be executed by a processor, the code comprising code to cause the processor to:

transmit a first shifting element control signal to cause a motor synchronizer to engage a motor gear coupled to a motor shaft such that the motor gear transmits power between the motor shaft and a drive shaft, the drive shaft configured to transmit power to a wheel of a vehicle, the processor configured to transmit the first shifting element control signal when an engine synchronizer is disengaged from a transmission input gear to interrupt engine power transmission between an engine output shaft and an input shaft of a transmission, the input shaft including a plurality of input shaft gears meshed with a plurality of output shaft gears;

transmit a second shifting element control signal to cause the engine synchronizer to engage the transmission input gear to transmit engine power from the engine output shaft to the input shaft of the transmission;

transmit a speed matching signal to match a speed of an output shaft gear from the plurality of output shaft gears to a speed of a corresponding input shaft gear from the plurality of input shaft gears, the speed being matched while engine power is continuously transmitted from the engine shaft to the input shaft; and transmit a third shifting element control signal, after the transmission of the speed matching signal and while engine power is continuously transmitted from the engine shaft to the input shaft, to cause a transmission synchronizer to engage the output shaft gear such that engine power is transferred via the output shaft gear and the output shaft to the drive shaft.

* * * * *